US011921479B2

(12) United States Patent
Valin et al.

(10) Patent No.: US 11,921,479 B2
(45) Date of Patent: Mar. 5, 2024

(54) AERIAL SOLAR AGRICULTURAL IRRIGATION, ENERGY GENERATION, HYDRO CONSERVATION WITH BENEFICIARY SHARING FOR RELIEVING POVERTY, PROTECTING ANIMALS, WILDLIFE AND THE ENVIRONMENT AUTONOMOUS APPARATUS

(71) Applicants: David Valin, Winnemucca, NV (US); Emine Yonca Valin, Winnemucca, NV (US)

(72) Inventors: David Valin, Winnemucca, NV (US); Emine Yonca Valin, Winnemucca, NV (US)

(*) Notice: Subject to any disclaimer, the term of this patent is extended or adjusted under 35 U.S.C. 154(b) by 0 days.

(21) Appl. No.: 17/171,098

(22) Filed: Feb. 9, 2021

(65) Prior Publication Data
US 2021/0294287 A1 Sep. 23, 2021

Related U.S. Application Data

(63) Continuation-in-part of application No. 16/395,175, filed on Apr. 25, 2019, now Pat. No. 11,500,346, and
(Continued)

(51) Int. Cl.
*G05B 19/042* (2006.01)

(52) U.S. Cl.
CPC .... *G05B 19/042* (2013.01); *G05B 2219/2619* (2013.01); *G05B 2219/2625* (2013.01)

(58) Field of Classification Search
CPC .......... G05B 19/042; G05B 2219/2619; G05B 2219/2625; G05B 2219/2639; H01G 11/10; H01L 35/00; Y02A 40/966; Y02B 10/10; Y02B 10/20; Y02E 10/47; Y02E 10/52; Y02E 10/60; Y02E 10/72; Y02E 70/30; Y02P 80/10; Y02P 80/20; F24S 23/77; F24S 23/79; F24S 30/45; F24S 90/00; F24S 23/72; G06Q 20/0655; G06Q 20/085; G06Q 20/308; G06Q 20/405; G06Q 30/0279;
(Continued)

(56) References Cited

U.S. PATENT DOCUMENTS

| 2015/0186904 A1* | 7/2015 | Guha | G06Q 50/06 |
| | | | 705/7.26 |
| 2017/0215261 A1* | 7/2017 | Potucek | H05B 47/19 |
| 2018/0295796 A1* | 10/2018 | Woytowitz | A01G 25/02 |

* cited by examiner

*Primary Examiner* — Michael C Zarroli

(57) ABSTRACT

The presented agricultural apparatus was developed for peoples in undeveloped countries, peoples affected by the changing climates to reduce water usage and reduce electricity usage, bringing more water retention in the soils used for growing food all year round, for heating and cooling purposes of food and peoples living areas. The presented apparatus is used with a generation of electricity apparatus that utilizes a plurality of solar photo voltaic panels in a rack mounting structure utilizing various apparatus as a means for increasing water irrigation, reduce water usages, and reduce electricity usage costs and supply at a specific spatial point area. The apparatus was developed as a means to help people in rural un developed areas as well as cities and industrial growing areas. Also included in the apparatus system is a means for an autonomous Virtual Currency related split payments apparatus for a mining aspect of rewarded distributions to poverty, animal, wildlife and environment beneficiaries.

20 Claims, 24 Drawing Sheets

Related U.S. Application Data a continuation-in-part of application No. 15/721,849, filed on Sep. 30, 2017, now Pat. No. 10,581,269.

(60) Provisional application No. 62/972,055, filed on Feb. 9, 2020.

(58) Field of Classification Search
CPC ........ G06Q 50/06; G07F 15/08; H02K 7/183; H02K 9/19; H02K 9/225; H02K 11/21; H02K 11/25; H02K 11/26; H02K 11/27; H02S 10/10; H02S 20/10; H02S 20/23; H02S 20/30; H02S 20/32; H02S 40/22; H02S 40/44

See application file for complete search history.

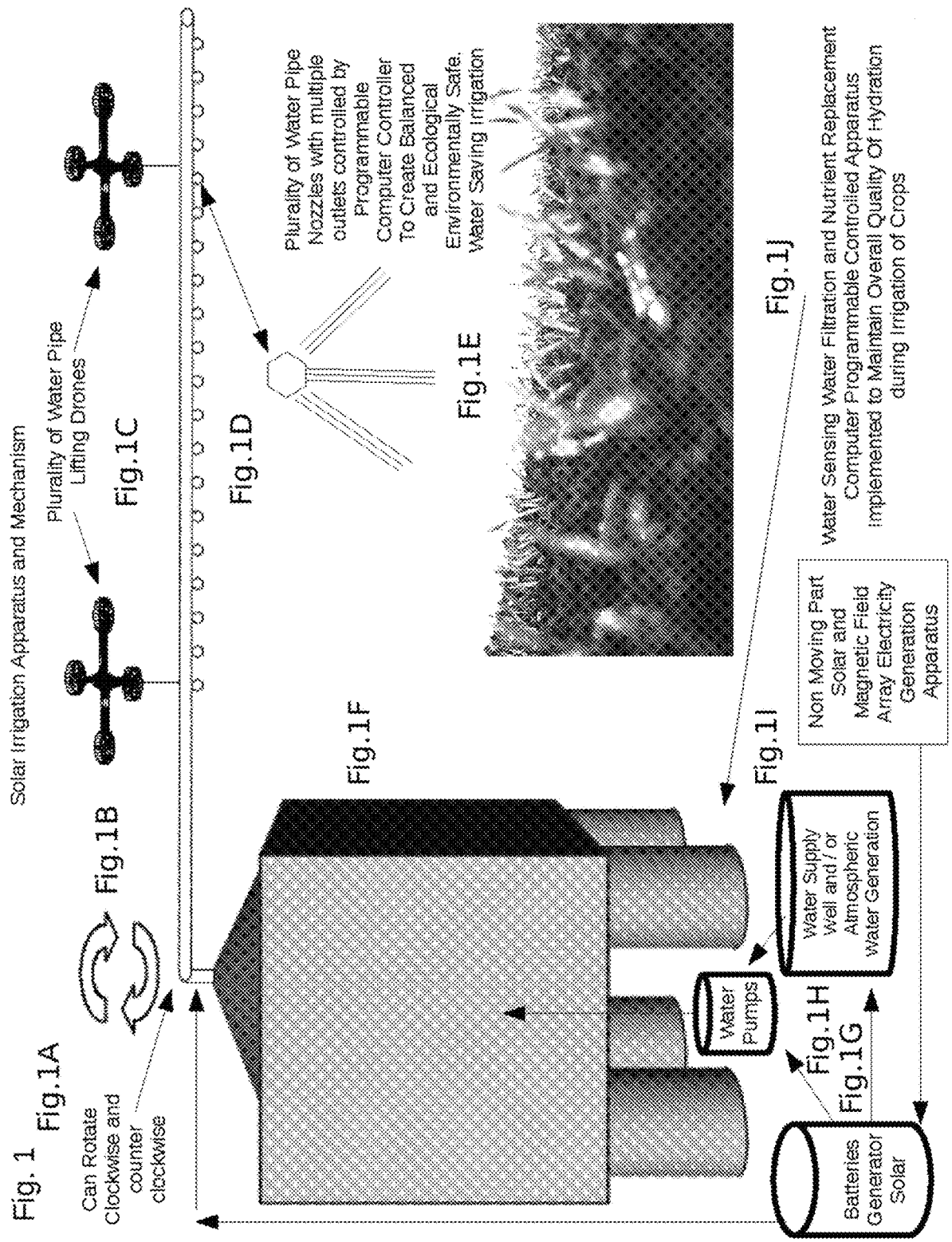

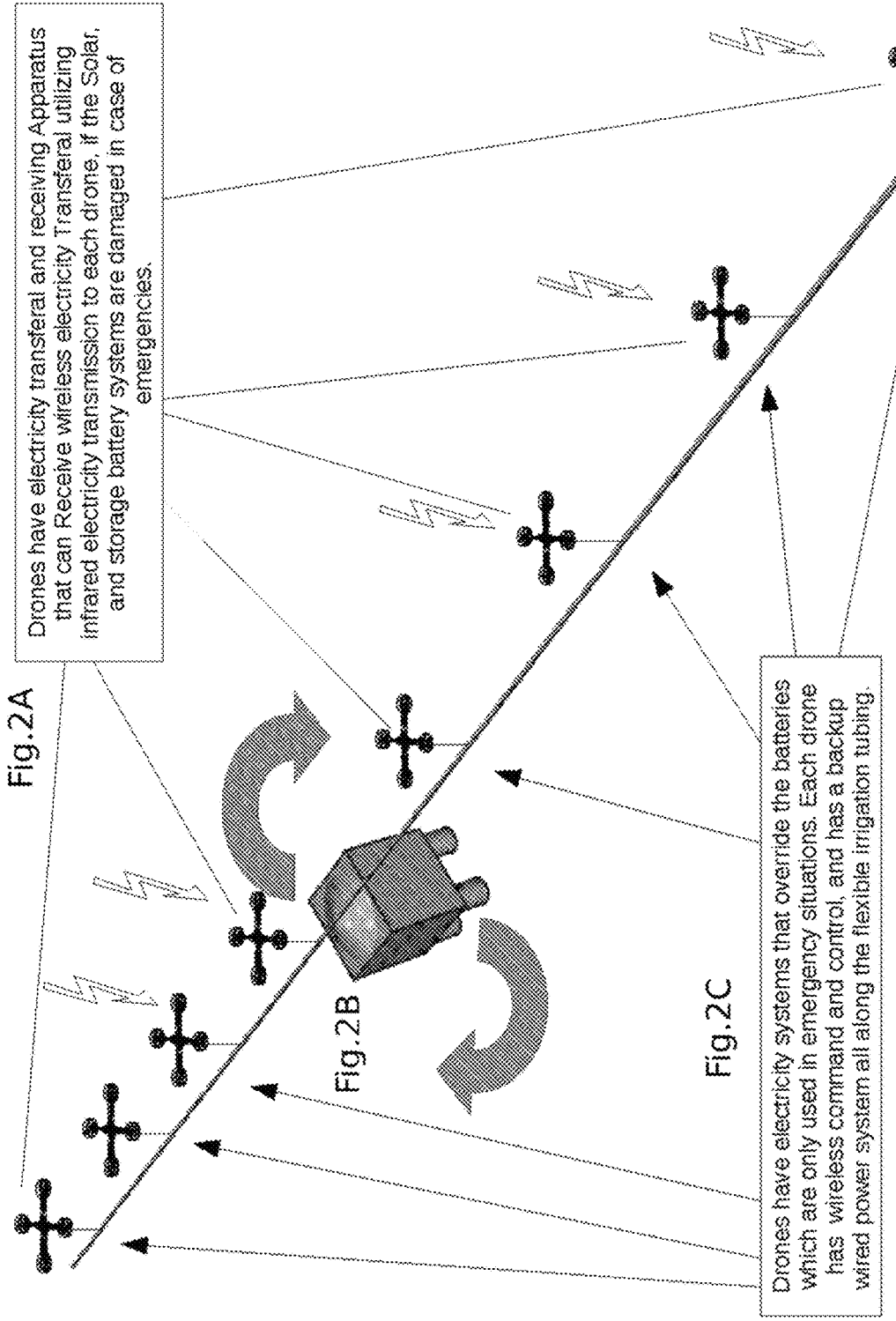

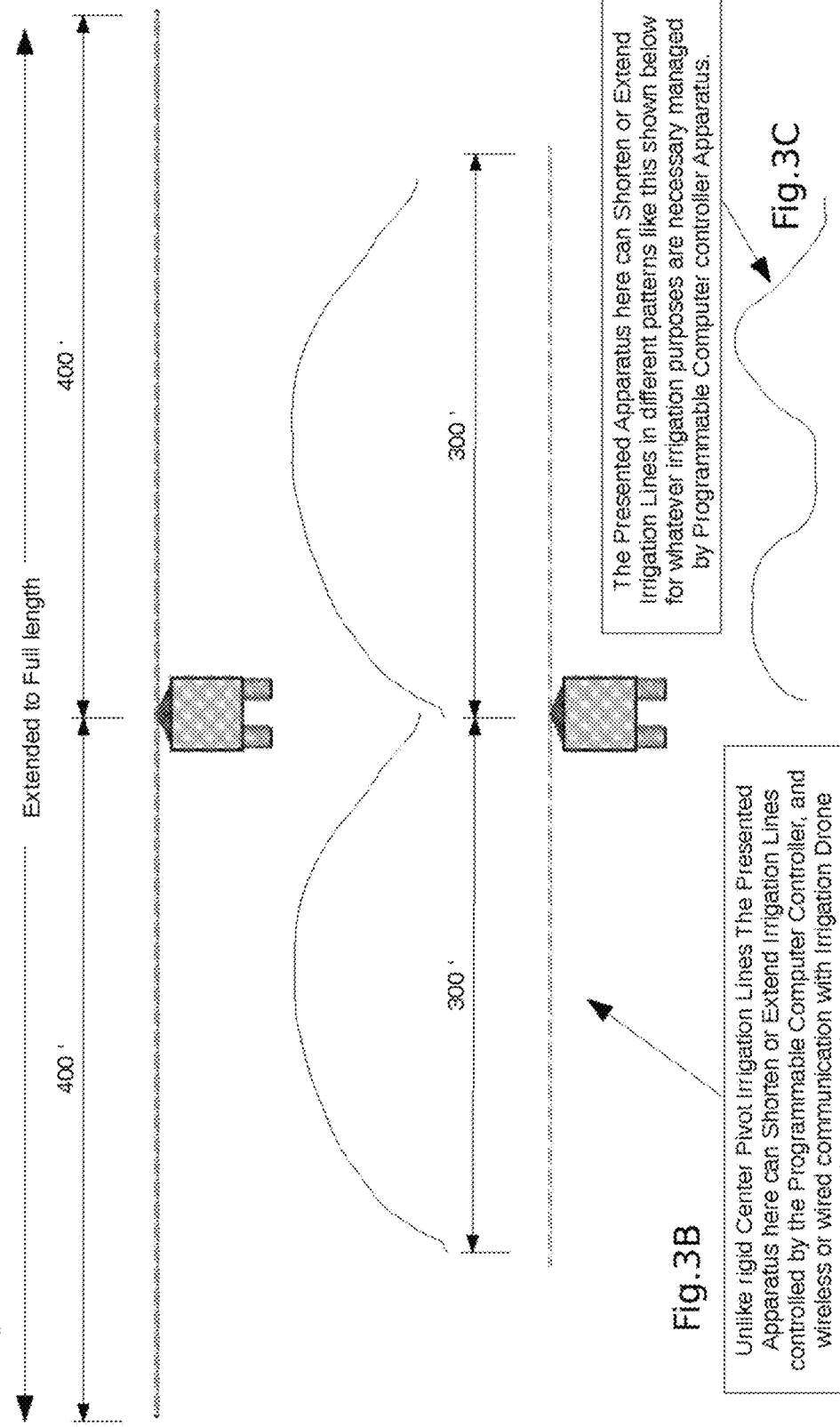

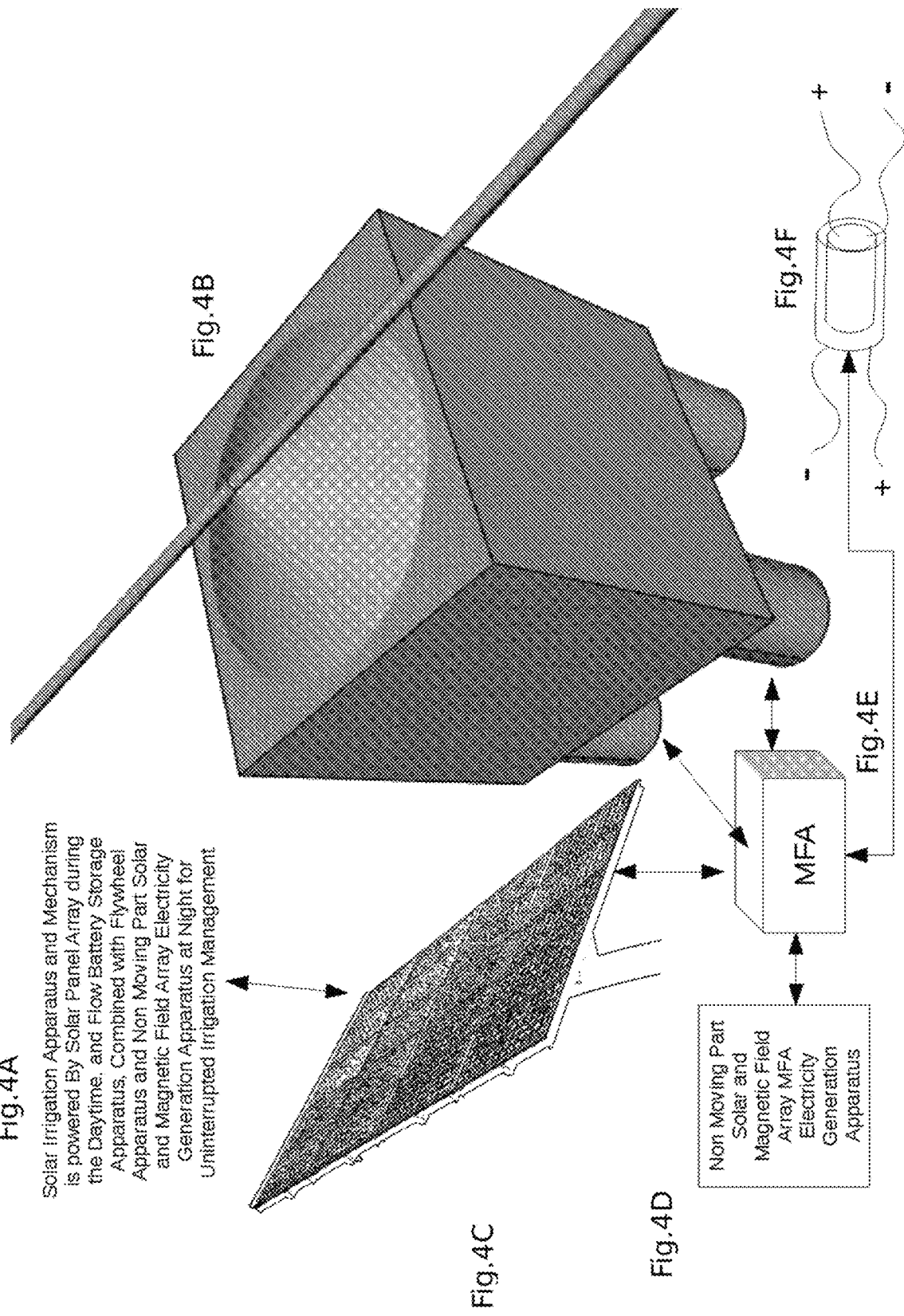

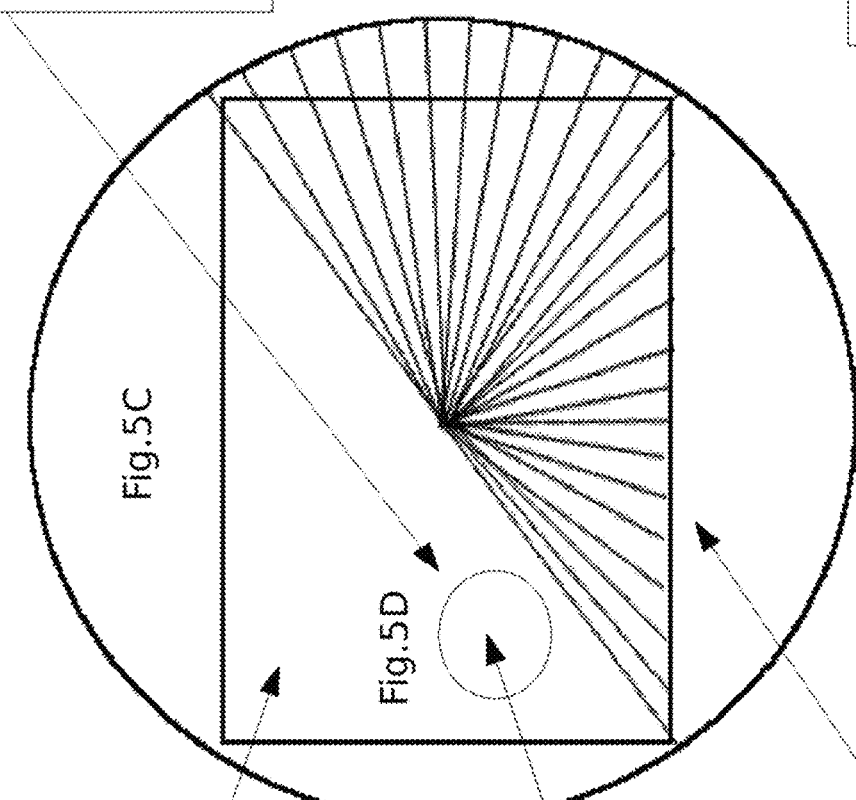

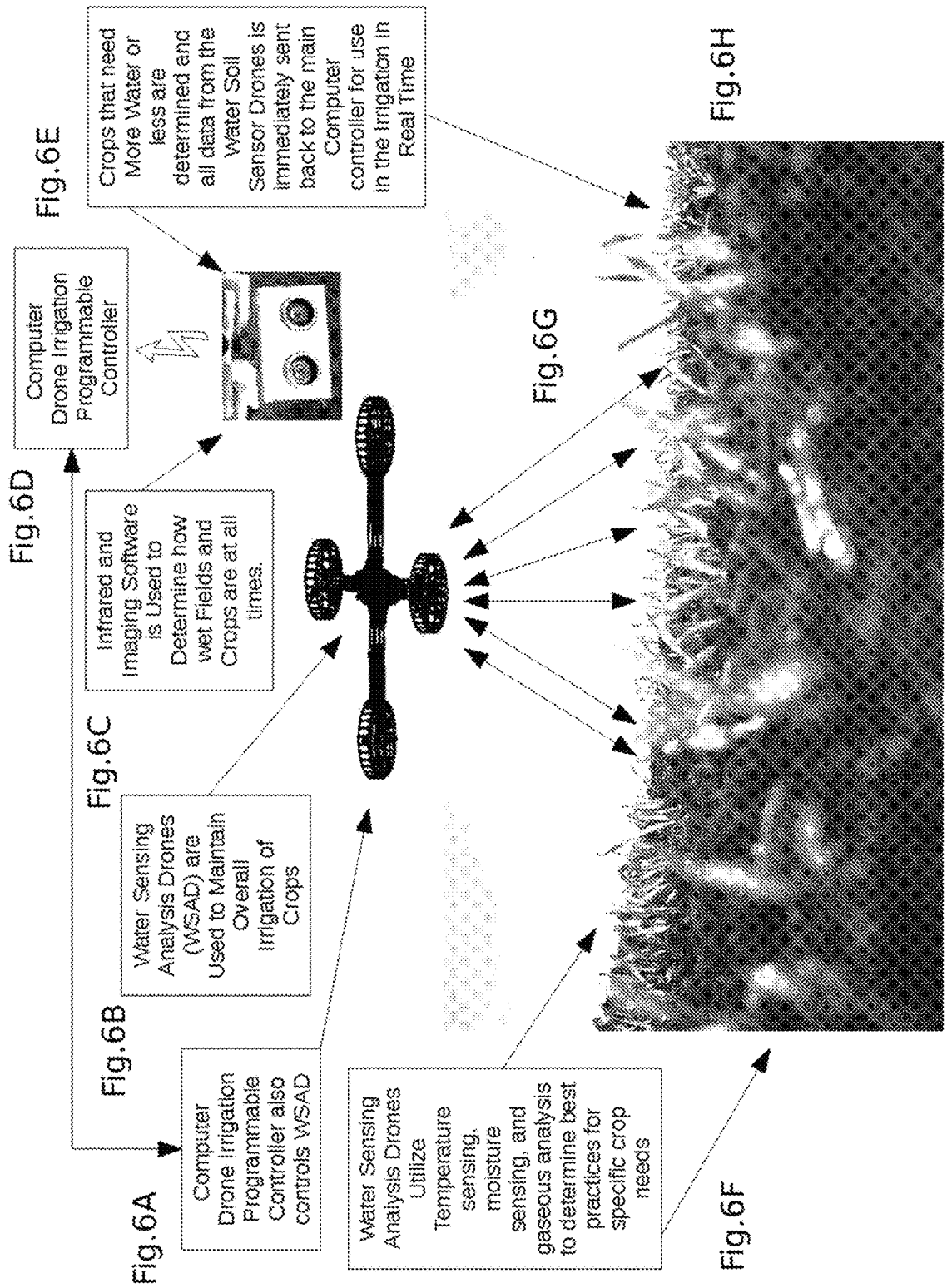

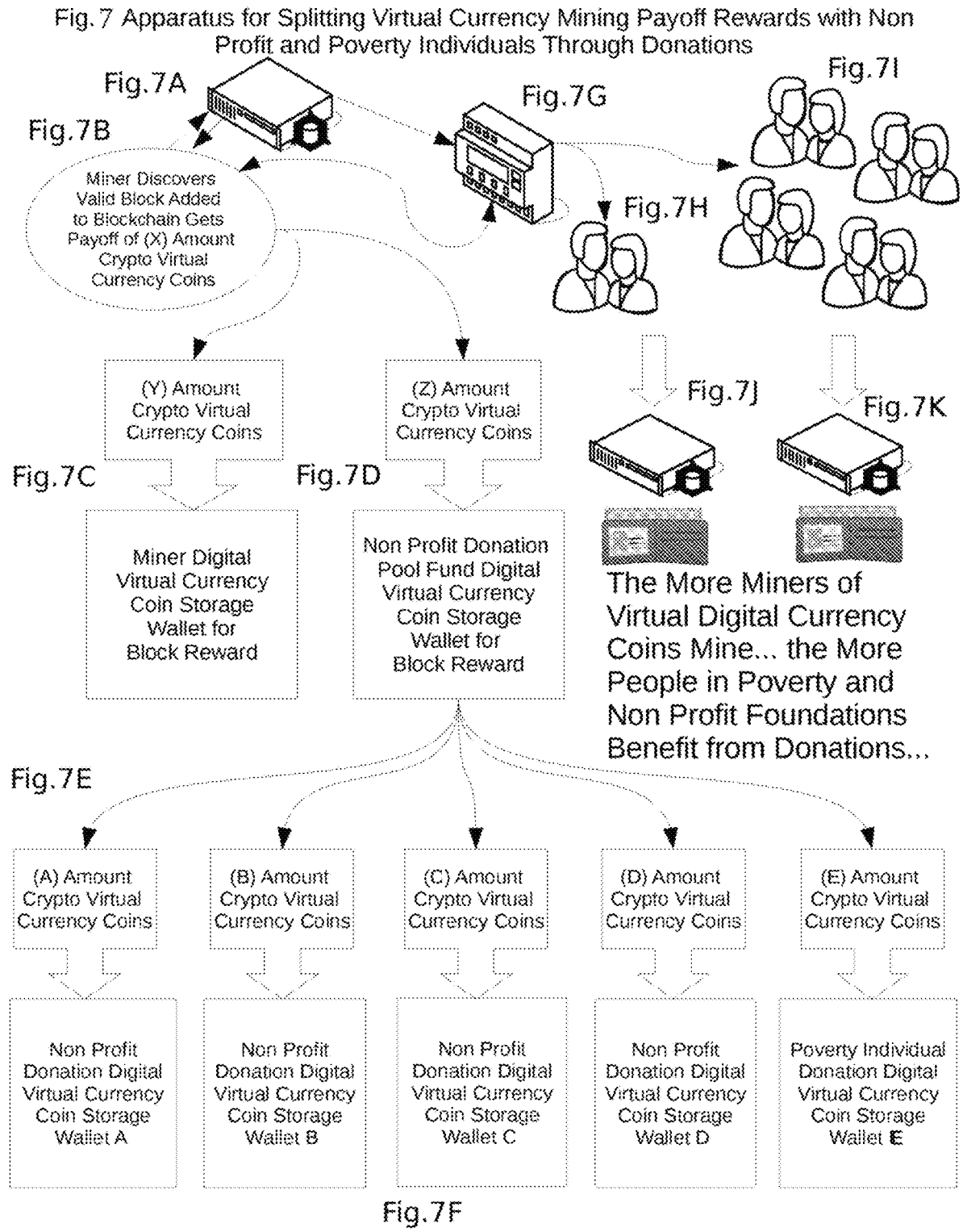

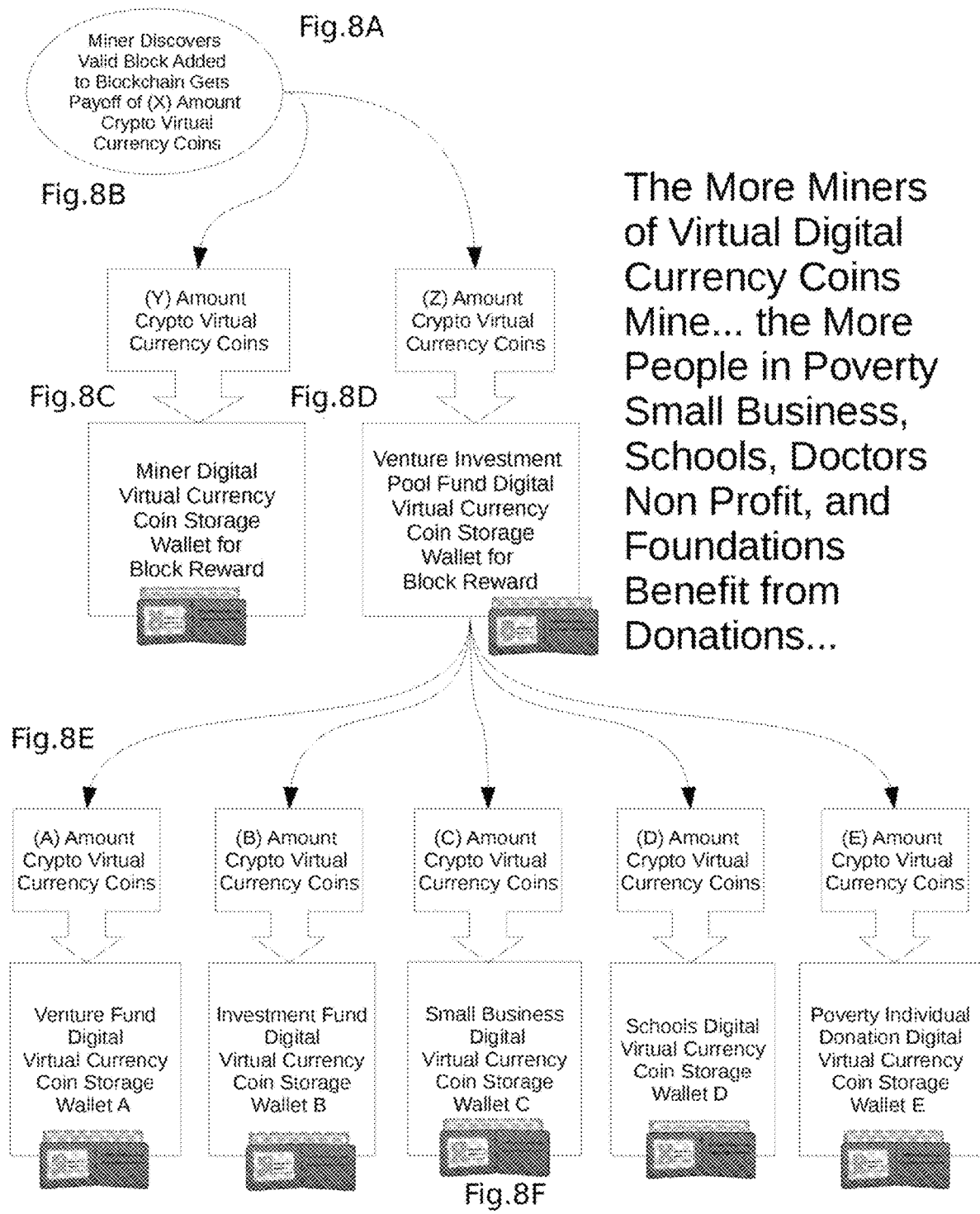

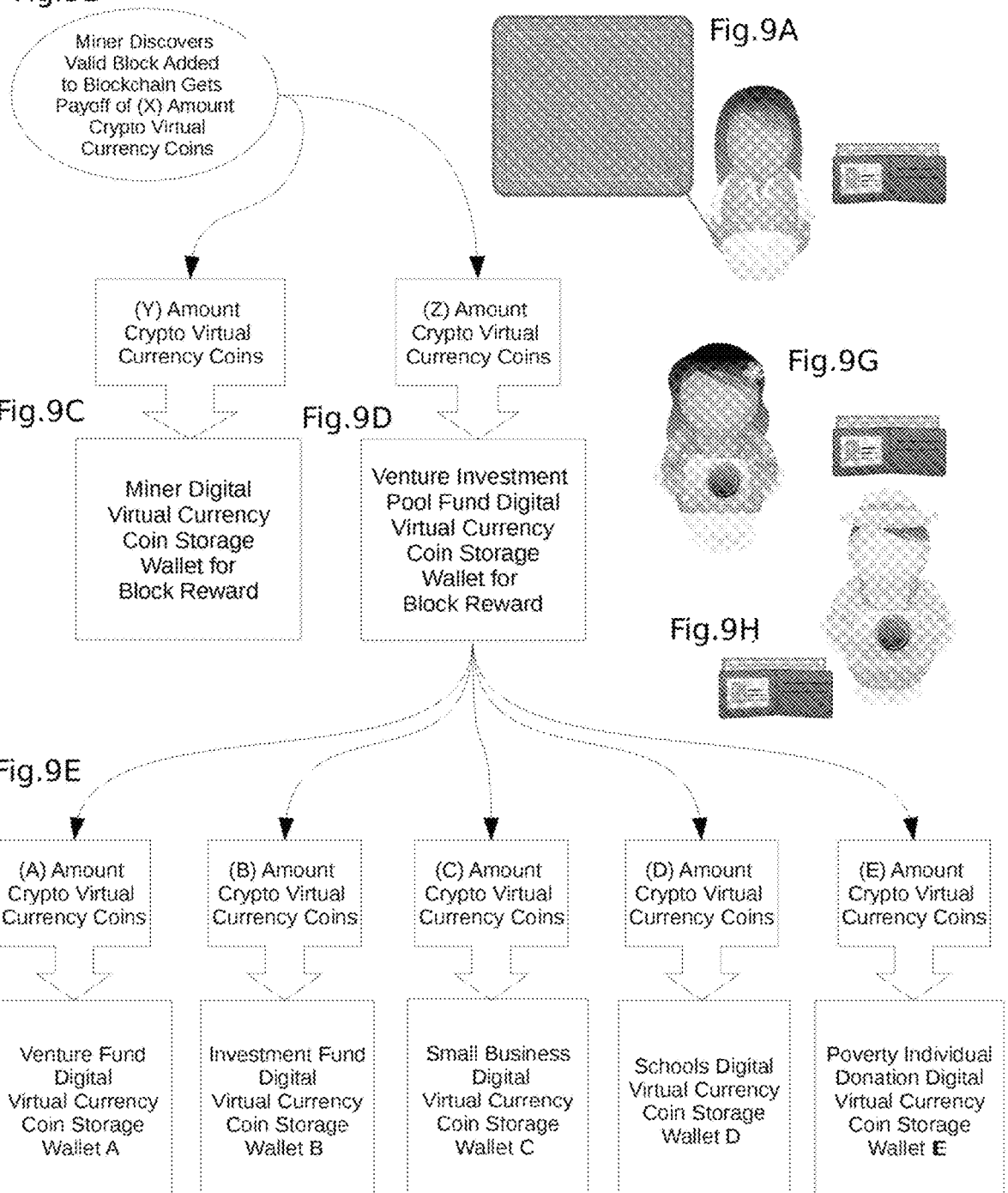

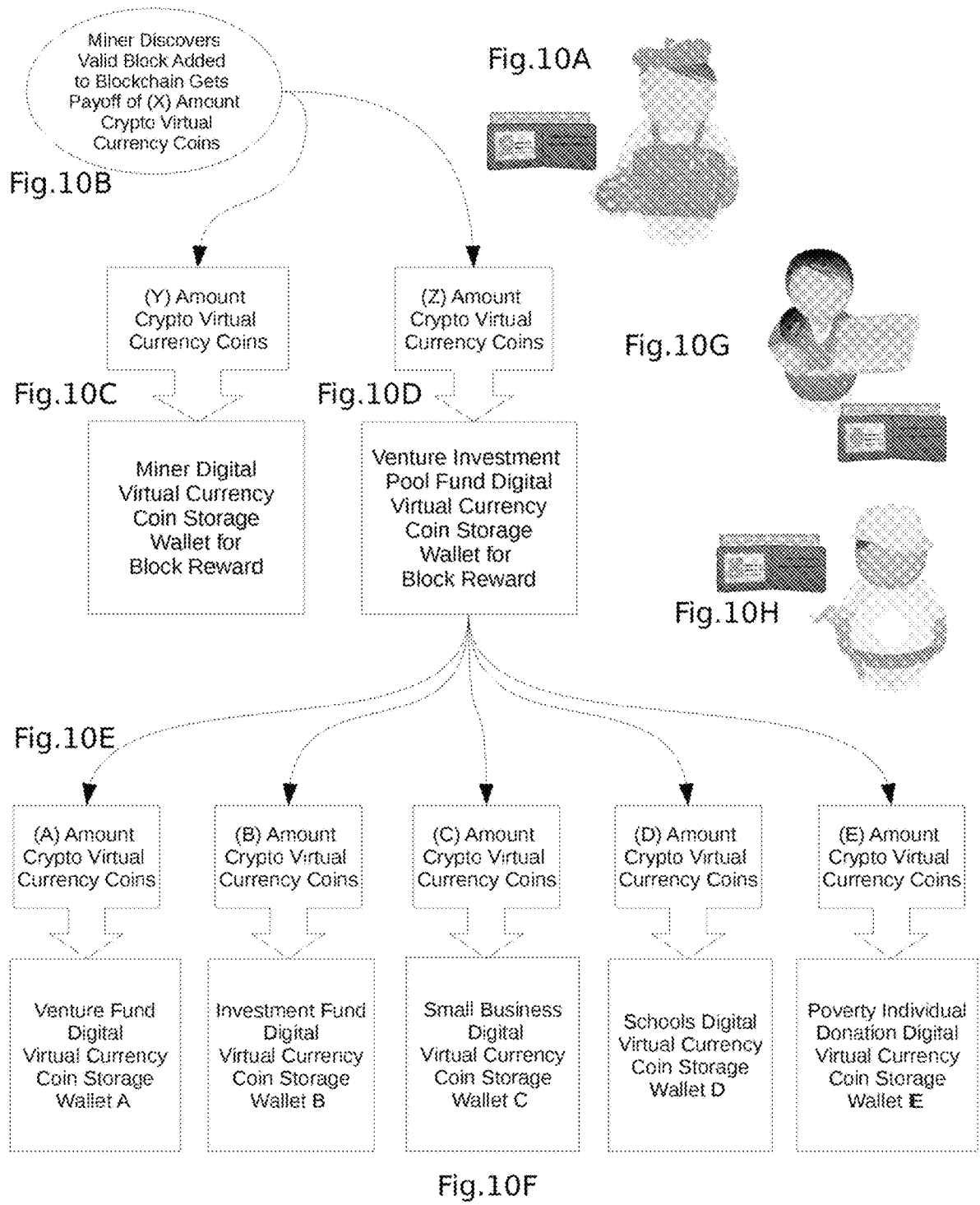

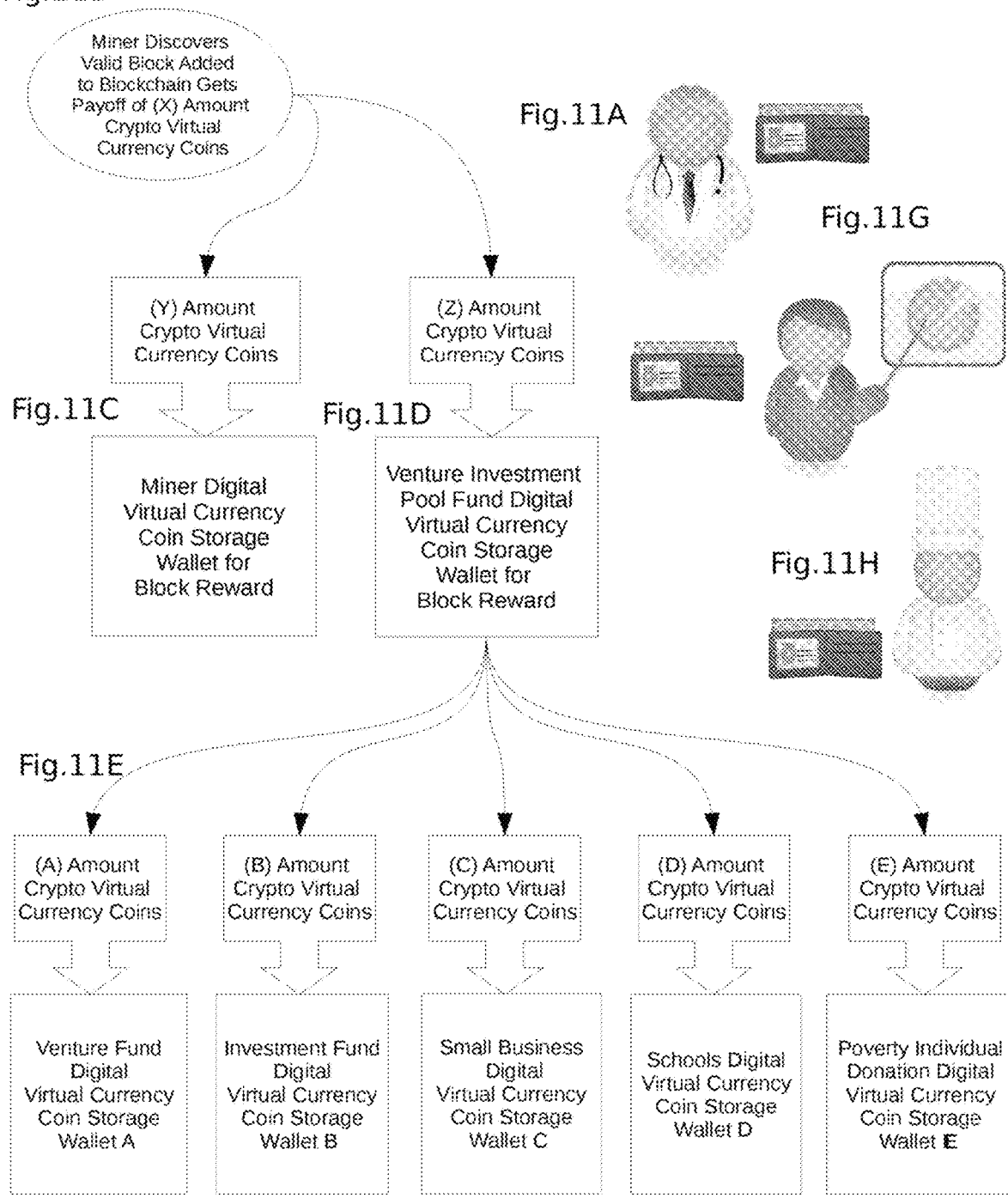

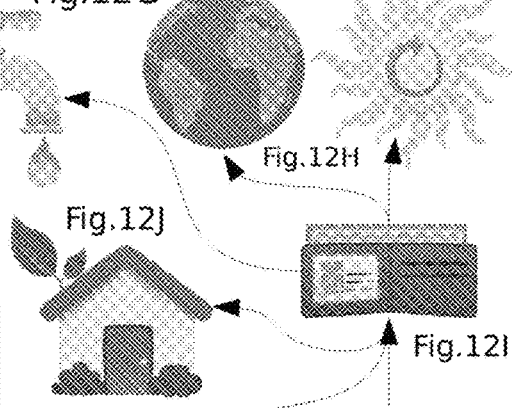
Fig.12 Apparatus for Splitting Virtual Currency Mining Payoff Rewards with Non Profit Environment and Poverty Individuals Through Donations

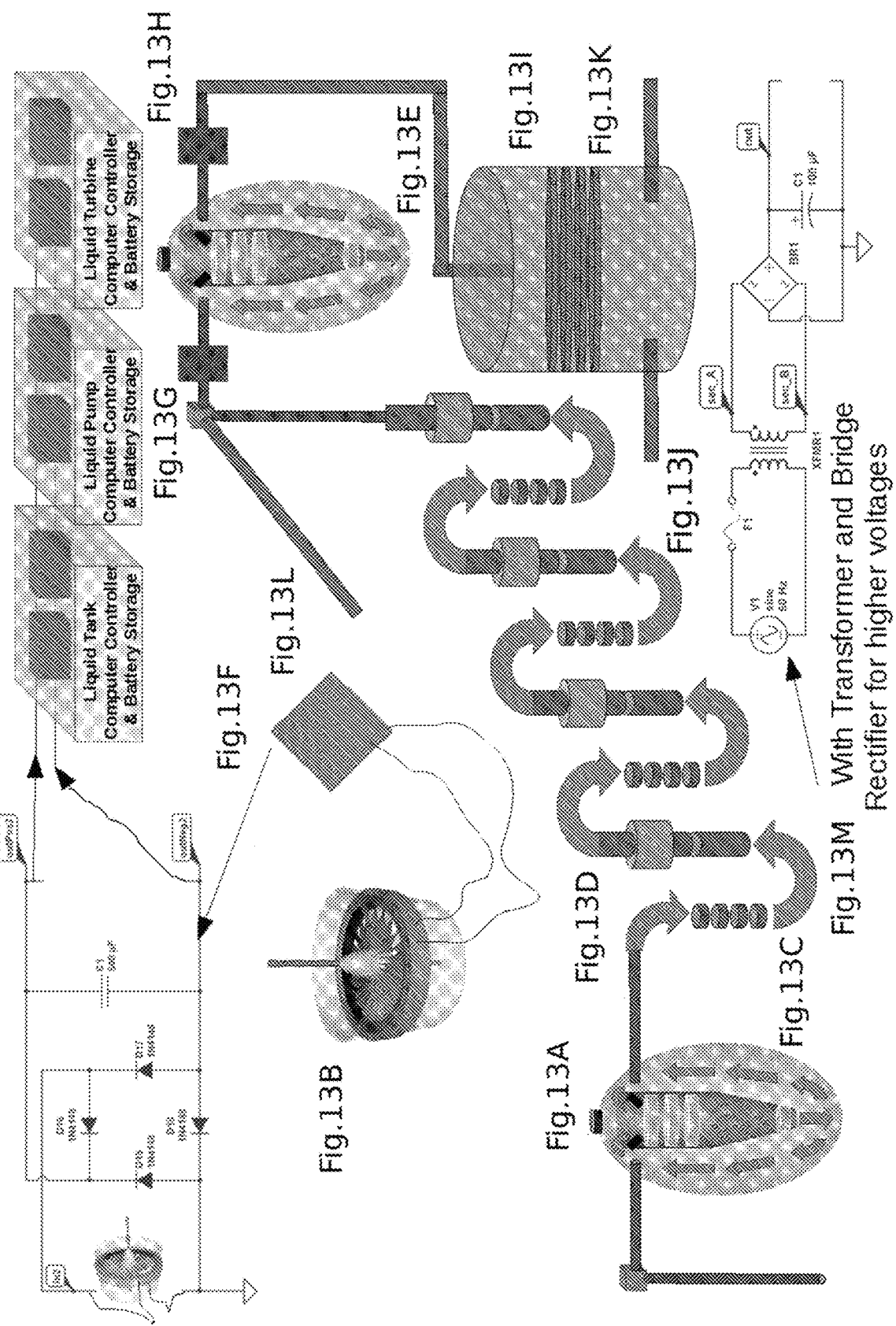

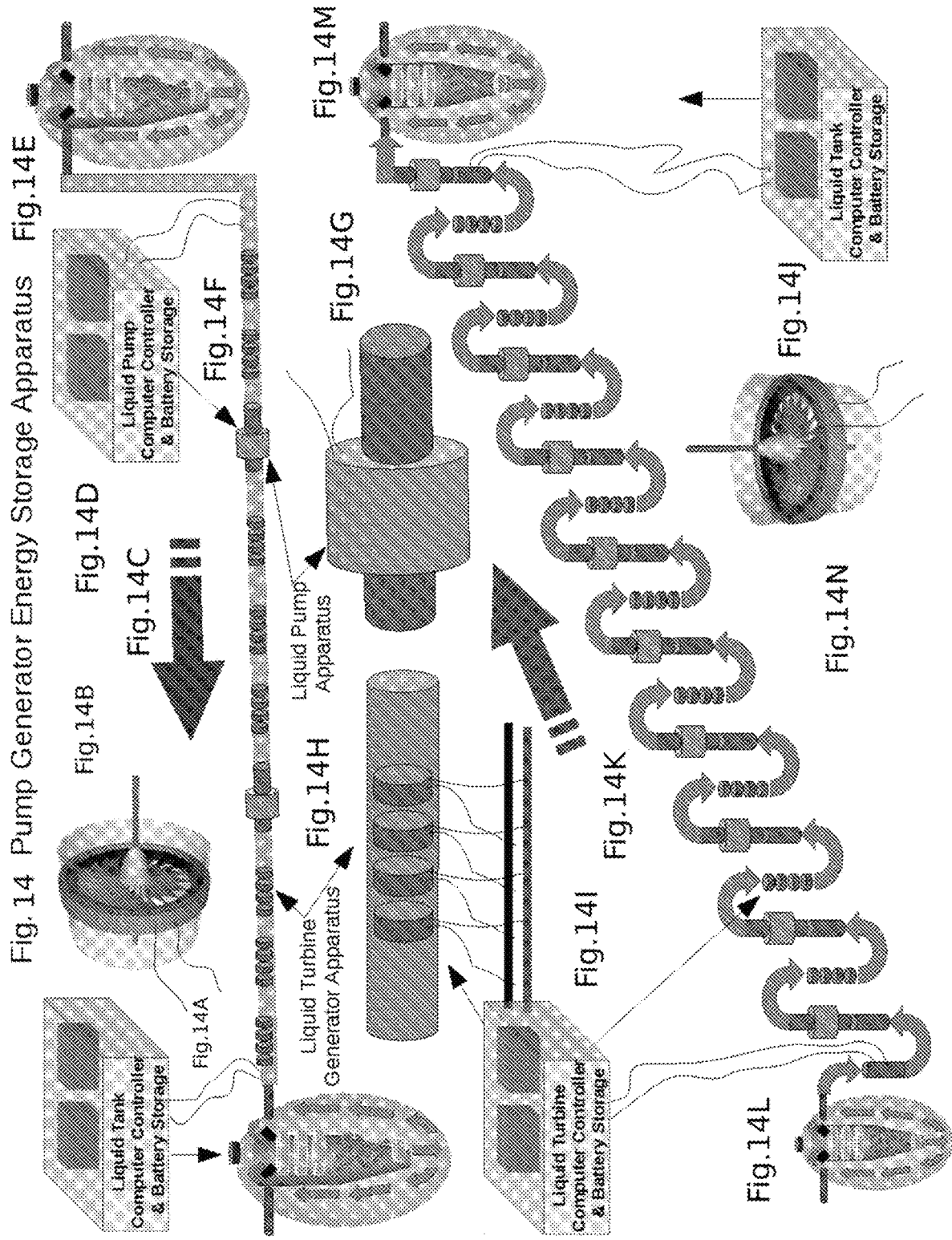

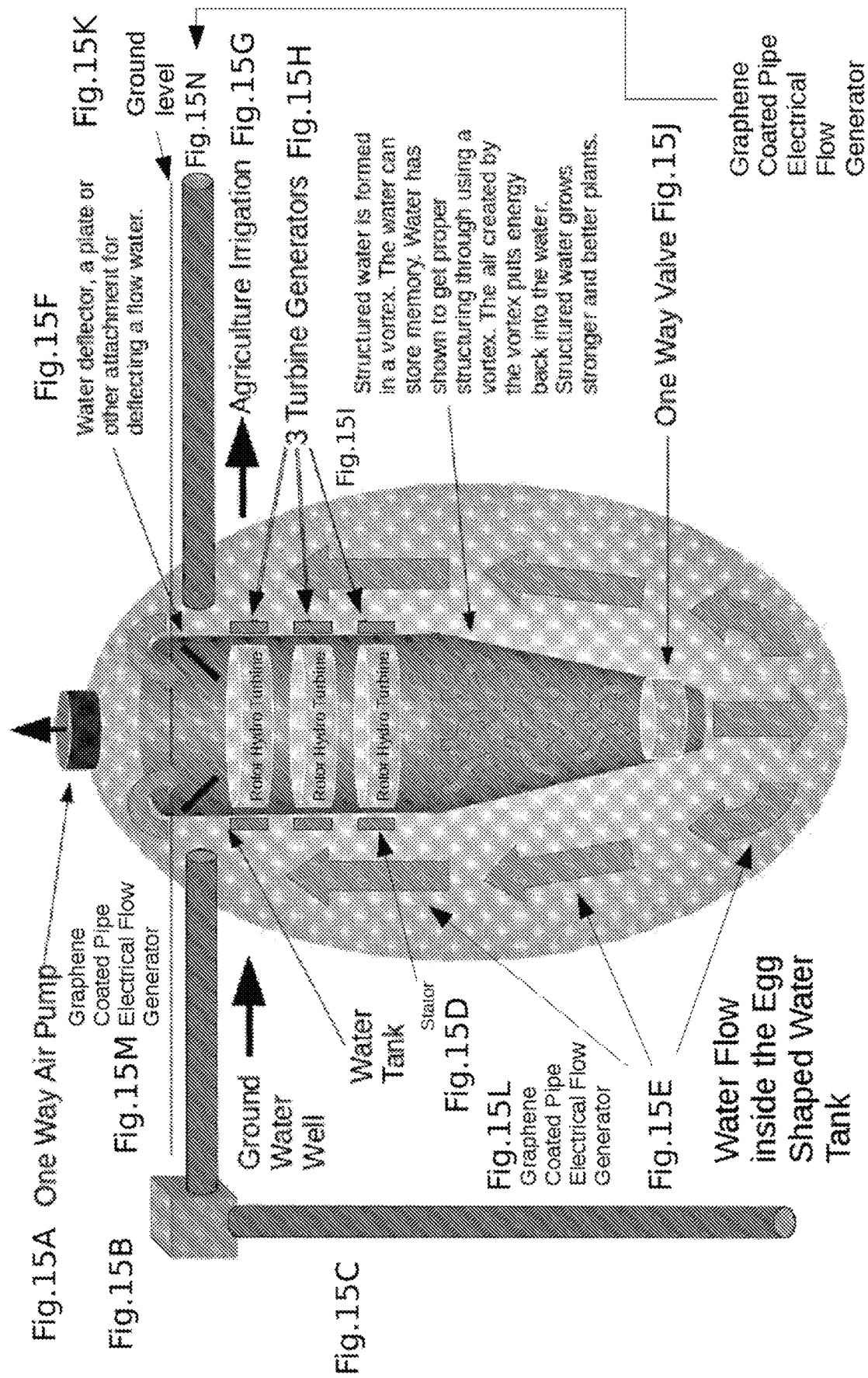

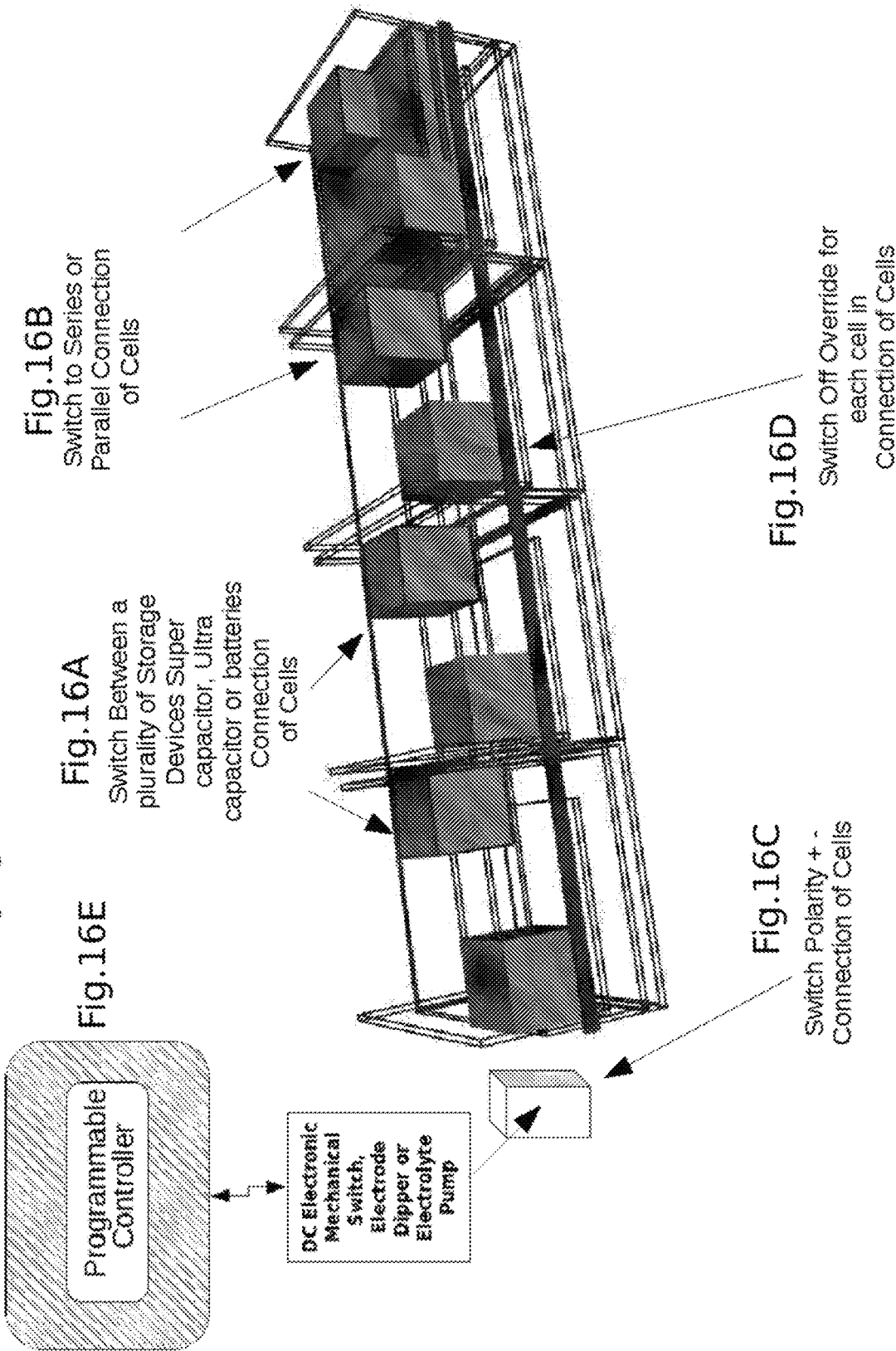
Fig. 16 Switching System for Shutoff of Cells, Modifying Polarity and Changing Circuit from Parallel to Series Connection

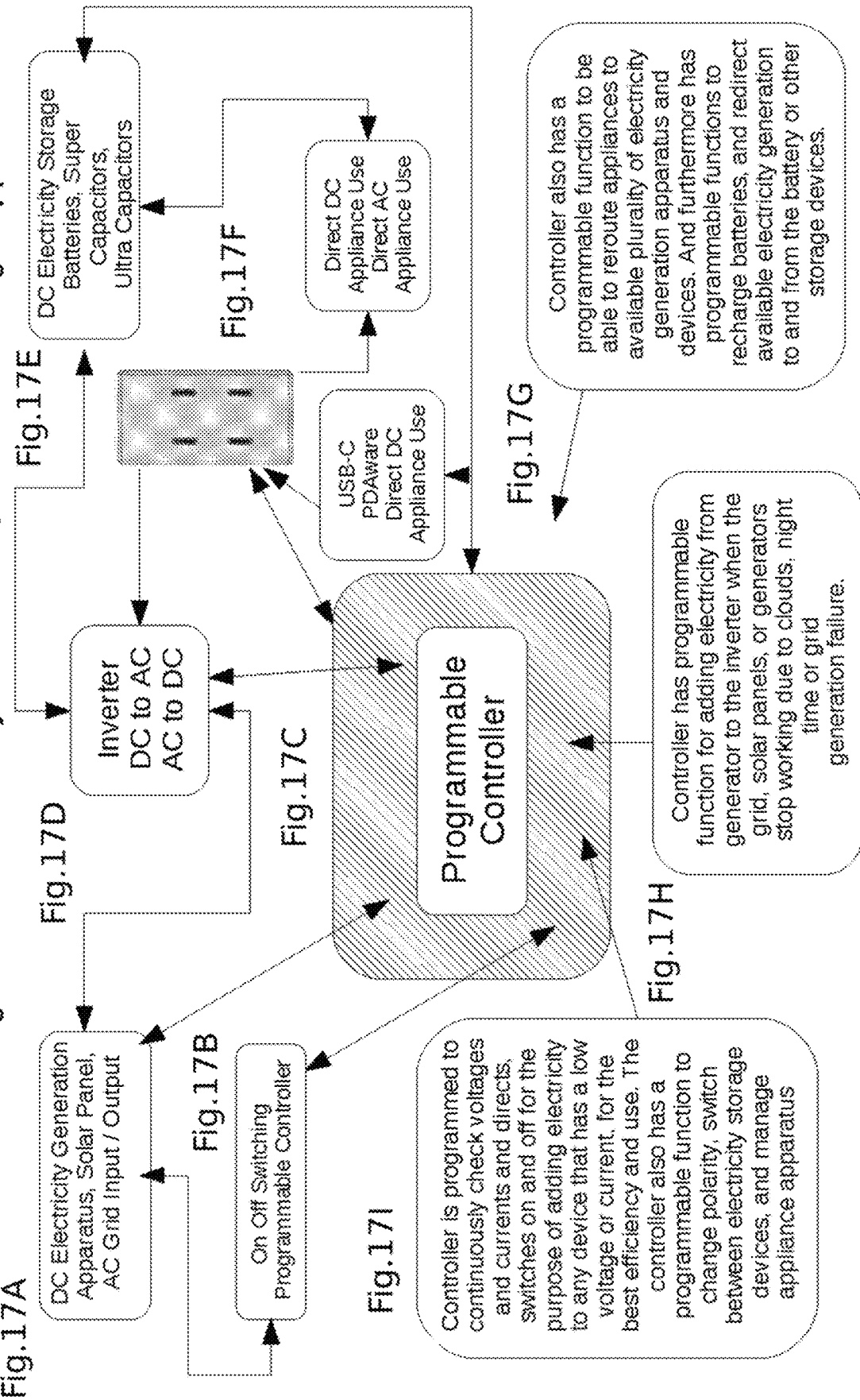
Fig. 17 Switching System for Shutoff and Programmable Software Controlled Management of Electricity Generation, Use and Storage Apparatus

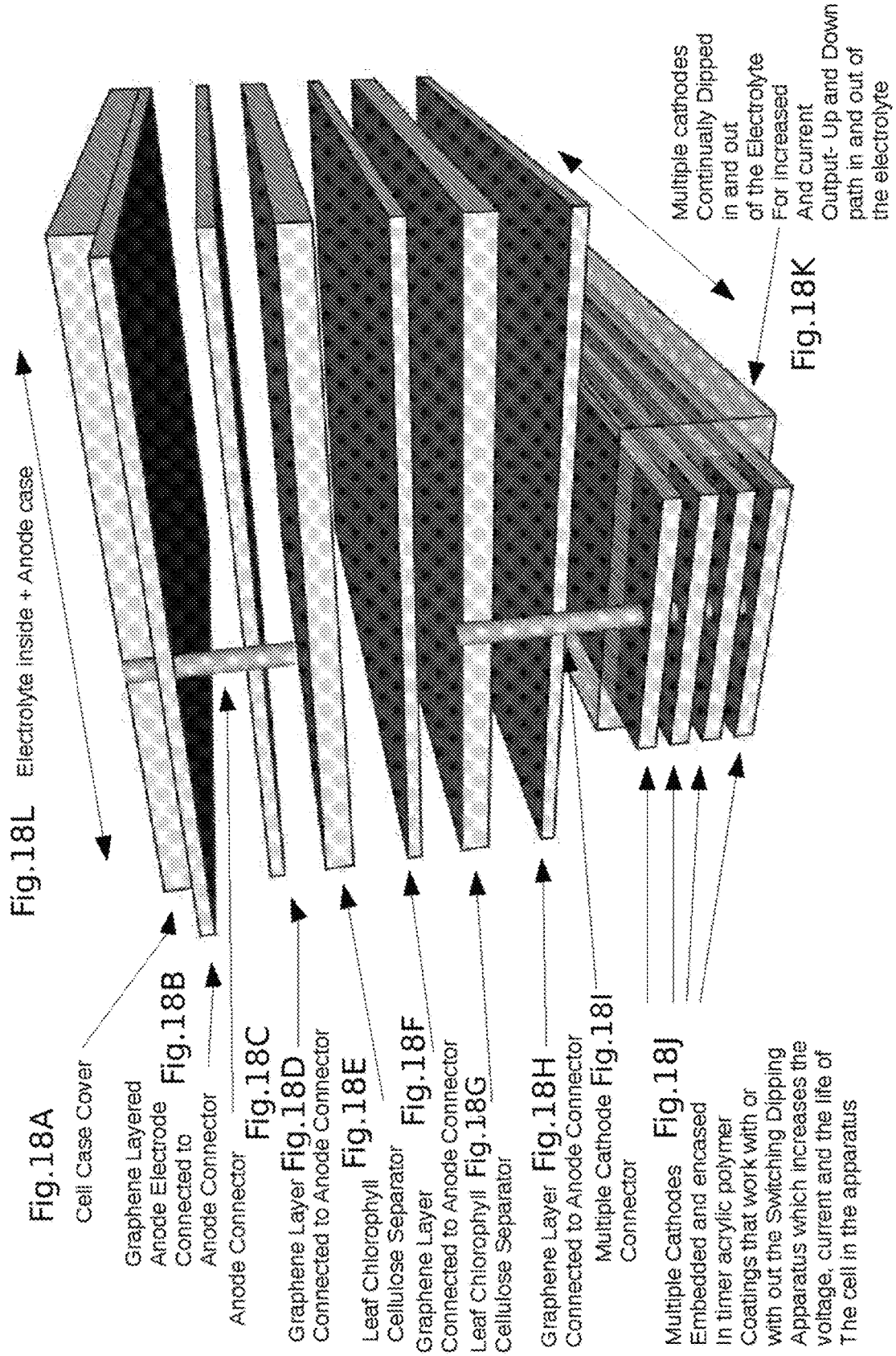

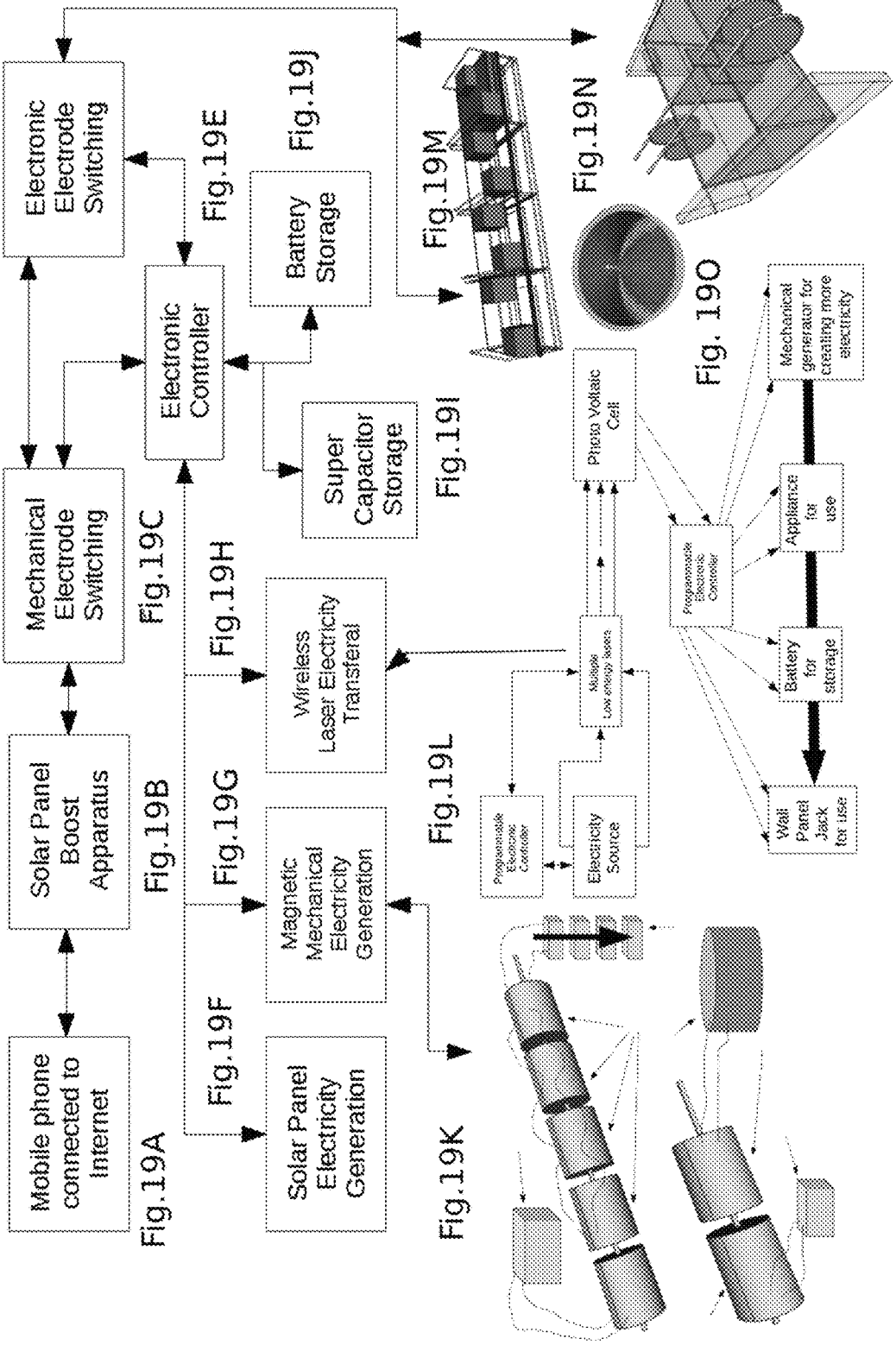

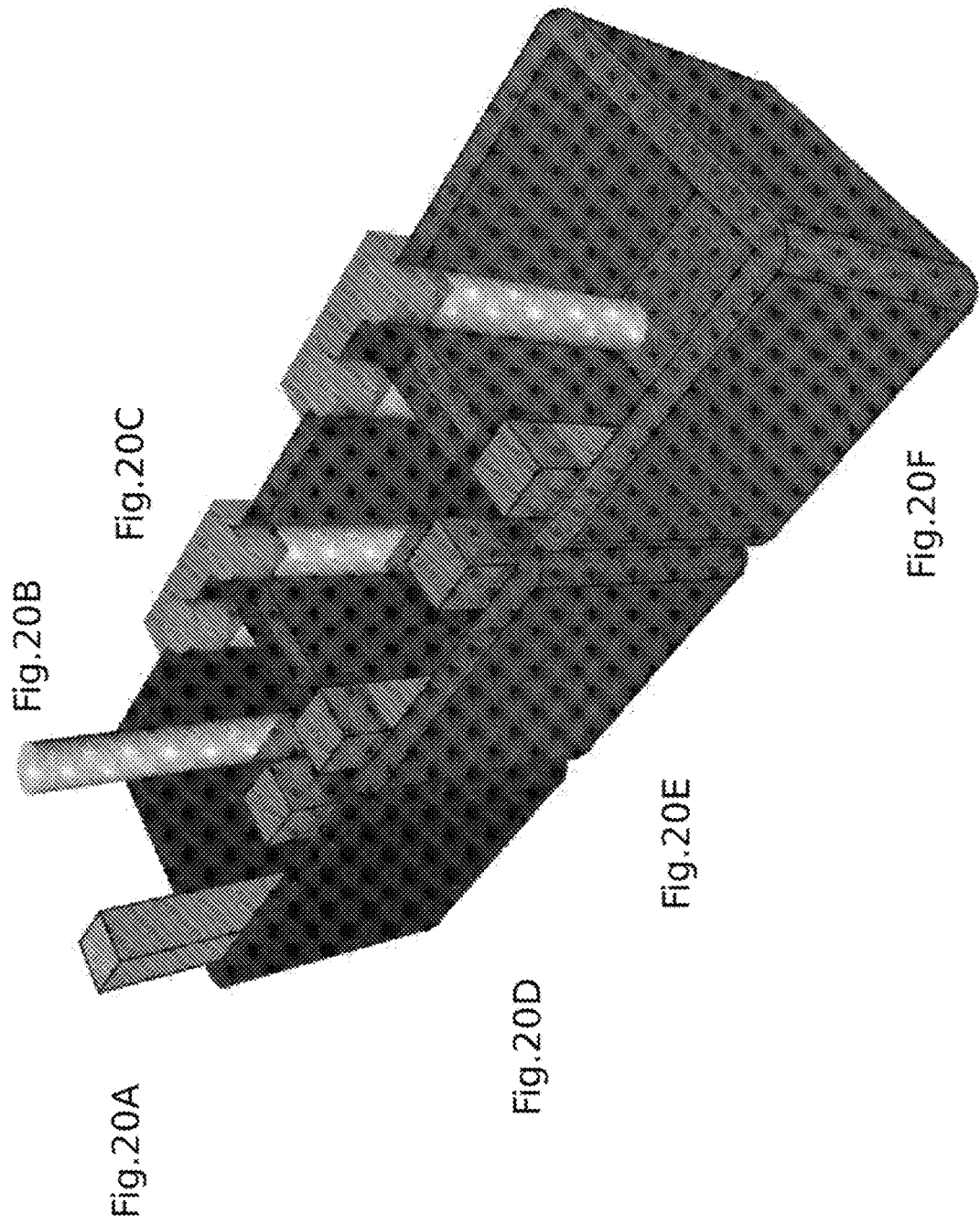
Fig. 20 Apparatus for Multiple Cell Electricity Generation

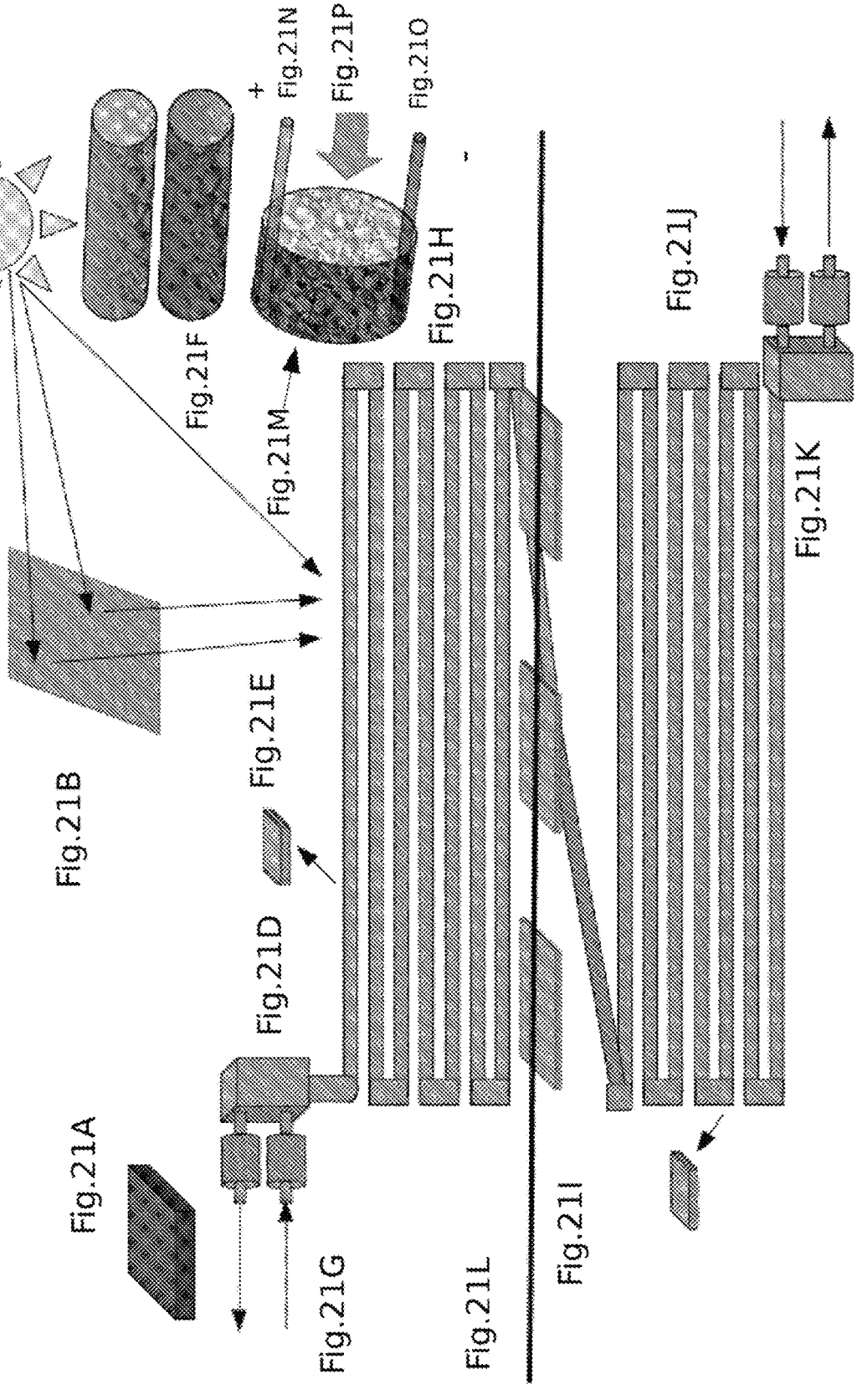
Fig. 21 Apparatus for Air Heating and Cooling with Electricity Generation between a plurality of Solar PV Modules in an above ground and below ground System

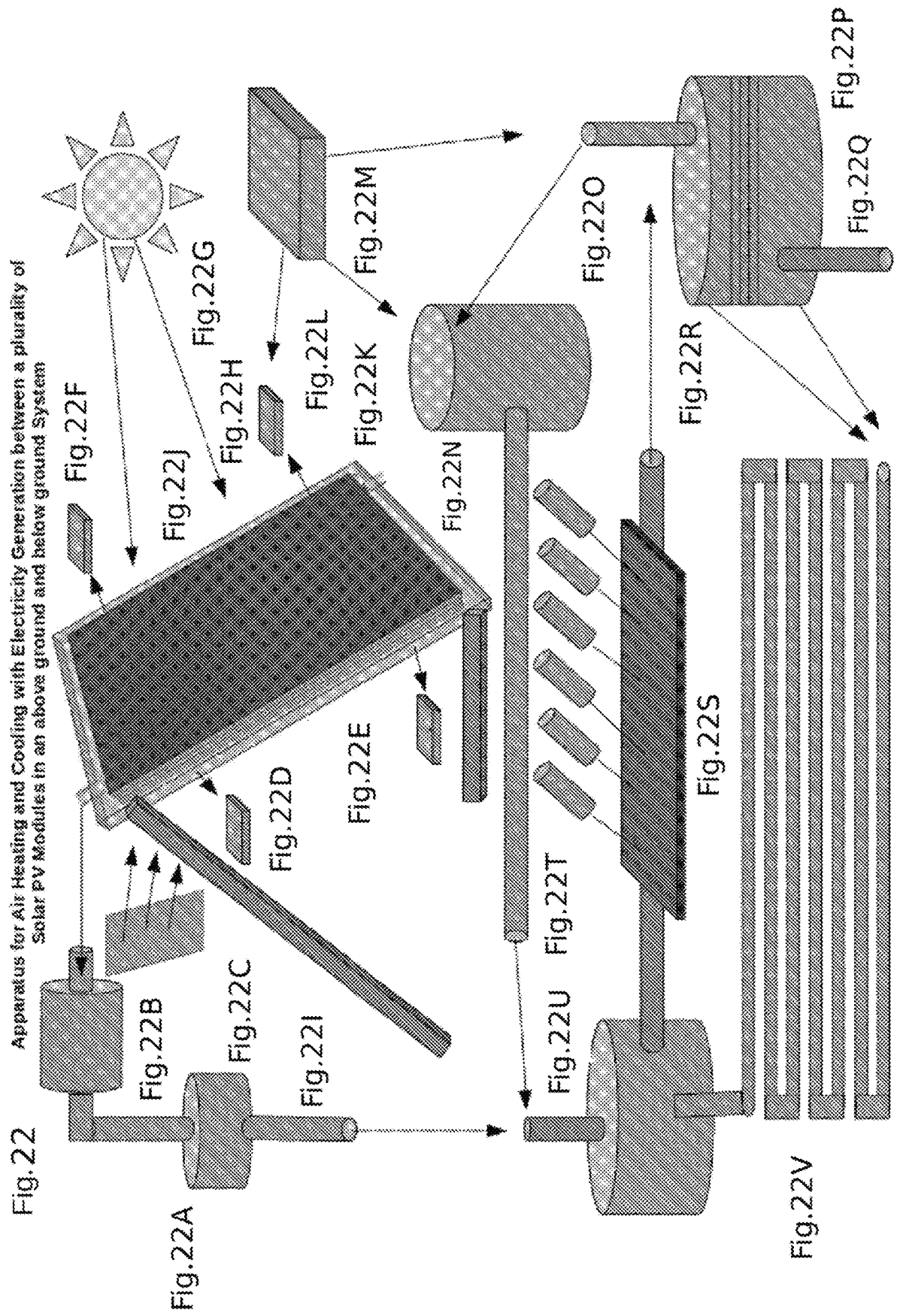

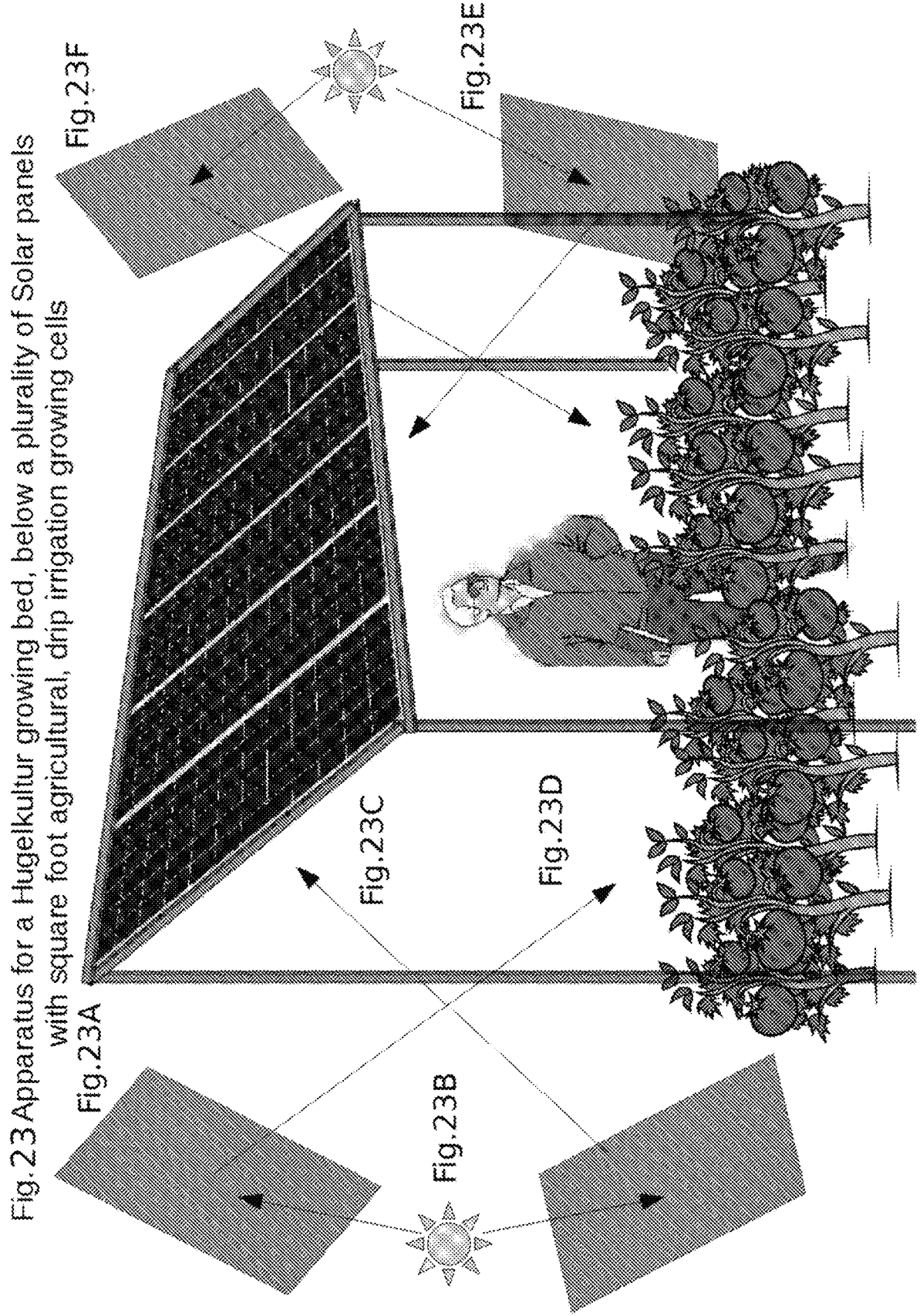
Fig. 23 Apparatus for a Hugelkultur growing bed, below a plurality of Solar panels with square foot agricultural, drip irrigation growing cells

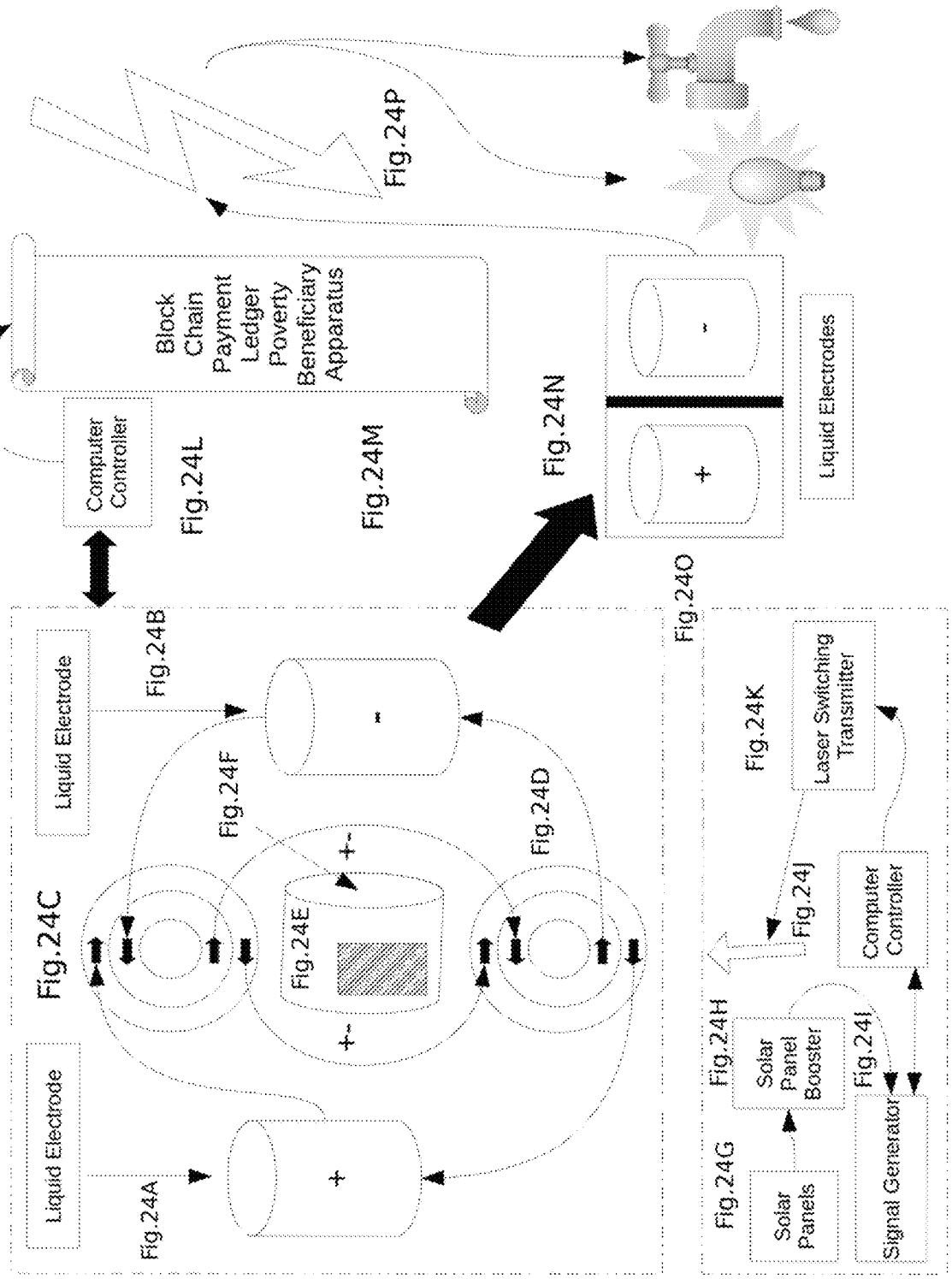

AERIAL SOLAR AGRICULTURAL IRRIGATION, ENERGY GENERATION, HYDRO CONSERVATION WITH BENEFICIARY SHARING FOR RELIEVING POVERTY, PROTECTING ANIMALS, WILDLIFE AND THE ENVIRONMENT AUTONOMOUS APPARATUS

CROSS REFERENCE TO RELATED APPLICATIONS

This application claims priority from and is a continuation in part of U.S. patent application Ser. No. 16/395,175, entitled "Energy Generation, Solar Panel Racking Switching Pumping Apparatus Mechanism and System", filed on 2019 Apr. 25, which is incorporated by reference in its entirety for all purposes as if fully set forth herein.

This application claims priority from and is a continuation in part of U.S. Pat. No. 10,581,269 and application Ser. No. 15/721,849, entitled "Alternative Energy Booster Apparatus", filed on 2017 Sep. 30, which is incorporated by reference in its entirety for all purposes as if fully set forth herein. This application is a continuation of U.S. application Ser. No. 16/395,175/"parent", filed on 2019 Apr. 25, which claims the benefit of U.S. Provisional Application No. 62/972,055, filed on 2020 Feb. 9.

BACKGROUND OF THE INVENTION

Field of the Invention

The present apparatus invention is directed to an apparatus for Irrigation utilizing a plurality of solar voltaic panels and water tank in a rack mounting structure utilizing a for reducing water usage and decreasing electricity to grow better crops in a specific spatial point area.

Description of the Related Art

The current state of the art of the presented invention here as related to Agricultural Irrigation is related to where the controlled application of water for agricultural purposes through man made systems are used to supply water requirements not satisfied by rainfall. Current state of the art systems utilize CENTER-PIVOT systems where water is applied at a uniform rate by progressive increase of nozzle size from the pivot to the end of the line. The depth of water applied is determined by the rate of travel of the system. Another System that has been widely used for many years is the FLOOD OR FURROW irrigation system, where the entire surface of the soil is covered by pooled water. The system is called flood irrigation where water is pumped or brought to the fields and is allowed to flow along the ground among the crops. This method is simple and cheap, and is widely used by societies in less developed parts of the world as well as in the U.S. Another System widely used is the SPRAY OR SPRINKLER system where water is applied by means of perforated pipes or nozzles operated under pressure so as to form a spray pattern. Still Another Agricultural Irrigation system is known as SUB IRRIGATION where it utilizes a buried perforated or porous pipe system that discharges directly into the root zone. And still yet further another Irrigation widely used is the SURGE FLOODING irrigation system where traditional flooding is involved by just releasing water onto a field. In using surge flooding, water is released at prearranged intervals, which reduces unwanted runoff. ISSUES are many with all of these systems, Flood irrigation uses gravity to transport water, and, since water flows downhill, it will miss a part of the field that is on a hill, even a small hill. Farmers use expensive leveling equipment, some of which is guided by a laser beam, to scrape a field flat before planting. That allows water to flow evenly throughout the fields. This scraping of the agricultural fields destroys the biomass and top soil of the growing environment.

BRIEF SUMMARY OF THE INVENTION

In one embodiment of the presented apparatus and invention we have a piping generation system with a plurality of small hydroelectric turbines that create multiple sources of electricity in the DC area. In another embodiment we have an egg shaped container and water tank that creates a structured water result of all the water flowing through it creating electricity as it flows through the system. In still another embodiment of the present invention and apparatus here we have a water storage tank that filters water through the plurality of graphene filters that instantly makes water drinkable, and grows most any kind of plant. In another embodiment of the presented invention and apparatus we have the ability implemented for all the DC electricity to be created from brush less generator turbines that produce AC output current, by utilizing a transformer with bridge rectifier's to gain higher voltages for use outside of the system. In still another embodiment of the presented apparatus invention we have pumps that pump water through the pipes continuously from the lower elevations to higher elevations creating electricity all the way through the cycle. In still another embodiment of the presented invention apparatus we have three types of a plurality of controllers for controlling the liquid tank levels and filtration along with the structuring system. There is also a liquid pump computer controller and battery storage programmable controller. And also the liquid turbine programmable computer controller and battery storage apparatus. In still another embodiment of the presented apparatus invention we have a hydroelectric structured water generator apparatus where all the piping systems have graphene coated pipe anodes built into the pipes along with magnesium cathode built into the pipes for the purpose of generating electricity from pure water flow through pipes. In another embodiment of the presented invention here we disclose an apparatus and process for mining crypto coins, virtual currencies, related to splitting payments in the mining aspect for reward distributions. In another embodiment of the presented invention we disclose utilizing a programmable computer controller apparatus utilizing a series of PLC programmable logic controllers controlling operations and actions of a machine or device, for the purpose of processing a block chain block reward and discovering available blocks that are validated by a pure networking block chain mining by miner. These blocks are validated by a pure networking block chain mining by utilizing mining rigs for mining crypto coins such as Bitcoin and ALT currencies coins. Currently when a block is discovered a plurality of crypto coins is immediately deposited into the miners electronic wallet. In an embodiment of the presented invention a process is performed by a programmable computer controller apparatus utilizing programmable logic controllers for the purpose of executing code to split up the block reward into multiple wallets for the purpose of creating pool funds that can be used by nonprofits, people in poverty, and profit organizations involved in environmental and wildlife programs. In still another embodiment of the invention we have wallets created for the purpose of advertising, promotion nonprofit and profit fundraising in the processes of the presented invention. In still another embodiment of the presented invention we have a process utilizing a plurality of emails, electronic books, social network advertising bots for encouraging participation and were the online activities for every vote for every submission of ideas to a contest and for every contest recommendation and for every advertisement, and for every placement in social networks, where players will receive an air drop of substantial free crypto coins for their proof of work demonstrated, and further comprising the matching of the winning prizes of a contest, and still further comprising the doubling or plurality of doubling the price, with an equal a larger amount of crypto coins awarded by the apparatus, presented here utilizing emails, electronic books, file sharing, advertising, aggregation apparatus, for the purpose of advertising, promotion, nonprofit and profit fundraising as part of the presented apparatus and processes. In another embodiment of the presented invention where the process included an application for people in poverty to upload and show proof of work to a single or plurality of electronic computer devices, or a single or plurality of mobile phone devices. Proof of work can be demonstrated in the telling of stories, taking and sending pictures and videos, analyzing world ideas, giving their opinions on issues, creating ideas, creating solutions to problems, asking for advice, asking for help, asking for funding, submitting questions for others to answer, submitting helpful advice, all for the purpose of earning crypto coins, and further for the purpose of exchanging crypto coins for useful things, and still further for the purpose of exchanging crypto coins for fiat currencies, and even still further for the purpose of advertising, promotion, and fundraising as an integral part of the presented apparatus and processes. In still further another embodiment of the presented apparatus and processes invention we have the providing the option to the splitting up of the mining block discovered rewards into a plurality of digital wallets, and also comprising the option of splitting up the mining block rewards transaction fees into a plurality of digital wallets. In another embodiment of the presented invention we have the ability for electronic apparatus combined with the software timer apparatus using PLC controllers for consolidating long hashing block chain into shorter hashing links. This is done for the purpose of reducing the processing time of block chains and discovery of blocks by miners, and the verification and validation of block chains and payment systems. And further comprises from the presented invention a storage area on peer network nodes for storing old block chain, and further comprising reducing difficulty rate of mining related to timer consolidation events. In another embodiment of the present invention we have where the apparatus and processes comprises where a crypto currency is created with an unknown limit of coins for mining and further where the open mining community does not know how many blocks can ever be mined. And further comprises were a Virtual crypto coin can have an infinite amount of coins mind only limited by the resources available for mining the crypto coin at the time of mining. In this embodiment we have the ability for where the older mind virtual crypto currency coins mind have a much higher value than the newer mine coins. And further comprises where the block chain can be used to define the dates of each created block of coins for validation a gain or financial system that would be used for trading crypto coins, buying and selling crypto coins, holding crypto coins, payoffs related to crypto coins, bartering of crypto coins, and tangible evaluations such as fair value, fair deal, fair share, fair price, and fair placement.

Still further comprising word choice and positioning of the first block discovered in mining of virtual block chain crypto coins can be moved by the creator/founder/or the organization of the coin to a different position in the block chain ledger for the purpose of, strengthening the game play, changing the game play at specific intervals in time, enhancing the lifespan quality of the payment system in the game play, changing the value of payment systems infrastructure, at any time, or specified dates and times, all part of the presented apparatus and processes in the invention presented here. In another embodiment of the present invention we have where the apparatus and processes can include a Computer Object De-encryption, Encryption File Algorithm "CODEFA" mechanism server for validation proof of ownership of crypto coins and further comprising using a human key which is facial recognition combined with other bio metrics including human sensing bio-metrics for validation proof of ownership a virtual currency crypto block chain ledger coins. In another embodiment of the presented invention apparatus and processes we have where we add a mobile kilowatt hour Bank battery storage unit that can take electricity anywhere utilizing a block chain proof of ownership of the electricity. In another embodiment of the presented invention we have the apparatus and process for a low energy wall panel apparatus connected to a wireless electricity transferal system process and apparatus with block chain proof of ownership added to the apparatus and processes. In another embodiment of the presented invention processes and apparatus we have fair value, fair share, fair deal, fair price, fair placement, and fractional request modules for linking crypto coins and block chain technology presented in the invention apparatus and process disclosed here. For the purpose of expanding the block chain into artificial intelligence, digital semantic agents, bots for accomplishing goodwill tasks for humanity, animals, wildlife, and the environment. And in still another embodiment of the presented invention processes and apparatus presented here in disclosed we have provided a distributed block chain to independently verify the chain of ownership of any shared peace created from real or tangible properties transformed into a fraction of the original property, or a derivative of the original crypto coin. This aspect comprises providing a distributed block chain live tracking to independently verify the transactions of buying, selling, trading, bartering, with fair value or market value amounts set of any shared peace created from real or intangible properties transformed into a fraction of the original property in the represented in the block chain ledger of a network system. We also have where the process and apparatus comprises providing a distributed block chain recording of any activities related to changing, transforming, altering valuations, or destruction of any shared peace created from real or intangible properties transformed into a fraction of the original property block chain, ledger chain property stored in peer to peer electronic wallets and in the system network. We also provide in the invention apparatus and processes here providing a shared fractional payment platform, with a digital semantic agent bought, for automatically creating, color band currencies from divided pieces of block chains, which become a separate new block chain or fork, and attaching a rating to the divided pieces, for help in determining value by the apparatus and process. In another embodiment of this aspect of the presented invention, apparatus and process we have added where the conversion of pieces and the currencies of the time of registration, is also linked to color man request for participation, monetary values attached requested time dividing pieces, and providing a negotiation digital semantic agent bought for working with people in negotiations on requested newly created properties that are listed in the newly created digital block chain soft fork, or hard fork for creating a totally new derivative of the block chain coin, that has aspects of the old block chain intangible asset, affecting the newly created derivative product. As far as the mining of Bitcoin miners use special software to solve math problems and are issued a certain number of Bitcoin's in exchange. This provides a very good way to issue new coins into the exchanges and also creates a powerful incentive for more people in the open community to start mining for themselves. As long as Bitcoin miners keep mining they help the Bitcoin network safe and secure mining is an important and integral part of Bitcoin that ensures fairness for keeping the Bitcoin network stable, safe and secure. The original code and algorithm used by Satoshi Nakamoto the creator of Bitcoin is today a bit different than the needs we have today. It still provides a very strong crypto coin mining algorithm but there are some great adjustments that can provide for humanity, animals, wildlife and the environment in a very strong way. Most all mining is a greed based game theory method process and system. It works very well but the people that are mining are humans and there can be adjustments to the algorithm that can make life on earth much better for people. The field of the invention presented here is related to creating a win-win game that everyone can play. The ultimate field of the invention presented here is where half the people on the earth that live in poverty have the ability to play also. In our world today we can often forget about those people that are less fortunate than half the people on the earth. But the issue is that when you have half the people in the earth living in poverty it does affect all of the fortunate people that do not live in poverty in some way, shape or form. The changing climates are very good example of a planet that has half the people living in poverty. At least 4.3 million people mainly women and children die every year from using trees to cook their food, and warm their homes. They also use trees to burn to make room for growing animals to eat. Millions of acres of land are levels just for the purpose of growing food for animals that later on get eaten by humans. There is a better way and all of this leads to technology changing the way things are done. Bitcoin is a phenomenon that gives us all the ability to vote with our wallets. Many people, or half the people on earth have the ability to utilize crowdfunding and crowd sourcing technology combined with the Bitcoin system to make the world a better place especially for half the people that live on the earth. The related art to the invention disclosed and presented here can be described as payment, proof of work, crypto coin apparatus, processes and systems. The invention presented here is related to payment systems and data center server farm systems that are used in the mining of crypto currencies, coins, tokens, Bitcoin, an alternative currencies. Additional related art can be summarized as how to reduce poverty in the world, reduce the suffering and misery of animals involved in animal agriculture, reduce the amount of carbon footprint that half the people in poverty would bring forward to the world if they adopted the same system as the other half of the world is not in poverty. Additional related art is related to the effects of huge amounts of people 3.5 billion to be exact that affect wildlife, plants and trees, forest, water supplies, rivers streams and potable water supplies, along with sanitation and how all the systems function involving payment systems around the world. Can payment systems actually affect the quality of life on the earth for people, animals, wildlife and the environment? Yes, in a related way there is a big affect on people not having money to live their lives in a less toxic way. Bitcoin in itself and its algorithm has many potential capabilities to make life better for people, animals, wildlife and the environment on the earth. This can be done while making fortunes for anyone who wants to get involved in this new paradigm. The invention presented here has the ability to make the world a better place. The invention presented here has the ability to reduce electricity used in the mining process of Bitcoin. Invention presented here has the ability to change the game to where everyone can play, benefit, get payoffs, and have a better existence while at the same time being more gentle on the resources of the planet Earth.

In still another embodiment of the currently presented invention the object of this invention is to provide an apparatus that gets placed between the alternative energy generator device, the use appliance and/or battery storage device for the purpose of increasing electricity generated, to make more energy available. The process objective of this invention is to be able to increase the current and capacity of the electricity, utilizing software controlled switches, controlled by digital controllers, reacting to a plurality of sensors including voltage and current sensors.

EXAMPLE: In one embodiment of the present invention, a generator is provided that switches between 3 paths when the software programmed sensors determine that the electricity voltage or current has dropped due to clouds, darkness or depletion as related to Solar Panel Photo Voltaic generation, Mechanical Generation and Storage of electricity in device such as a battery.

The 4 pathways for energy generation and storage in the presented invention switched are as follows:
 1. To the Inverter for converting DC to usable AC current.
 2. To the Electricity Storage device (Battery, Super capacitor etc.).
 3. Directly to DC Appliances by way of USB—Type C Power Delivery connectors in a Wall Plate for powering low energy appliances directly from alternative energy devices, and storage devices.
 4. From Cell to Cell for the purpose of increasing current and voltage.

EXAMPLE: In another embodiment of the present invention, a switch is provided for the purpose of changing the polarity of circuits whenever the need arises. In the present invention batteries provided currents polarity can be reversed to create DC pulses with similar frequency patterns of AC current, for the purpose of boosting DC currents and voltages.

EXAMPLE: In another embodiment of the present invention, an electronic switching system, as well as a mechanical switching system is provided for the purpose of changing on/off from multiple capacitors, multiple cells or storage devices, utilizing a programmable controller to provide sustainable, stable and dependable current from cells, capacitors, batteries and electronic modules. By having this function as a core component of the apparatus presented here the organic cells are given time to recover during heavy electricity use loads.

EXAMPLE: In another embodiment of the present invention, a computer programmable switch is provided for the purpose of changing circuits with a focus on utilizing sensing information from each single cell, making every cell a "Smart Cell" with a central programmable controller that electronically, mechanically has the ability to be managed, switched on or off, over ridden in case of failure, and polarity changeable utilized to determine whether the circuit should be a DC series or parallel circuit. And that the switch can change from parallel to series connections in all combinations of cells utilized in the apparatus disclosed here for the purpose of increasing energy generated in the apparatus.

EXAMPLE: In another embodiment of the present invention, a computer programmable switch is provided, with a plurality of mechanical dipping switches for the purpose of electronic mechanical dipping of electrodes to capture the highest moment of potential energy. When measured with a meter a Battery shows the settled voltage immediately, when the alternative energy boost cell presented in this invention is measured it goes first to a higher voltage for a brief time then drops to lower voltage every time the cell is measured. The presented invention switching system captures the peak voltage and current, and stores or uses it from a plurality of cells.

EXAMPLE: In another embodiment of the present invention, a computer programmable switch is provided for the purpose of changing circuits to a temporary backup power storage system with Super Capacitors. Backup Power is a common requirement for a wide range of applications whenever the main power source is suddenly unavailable. In the past, these types of high reliability systems used batteries to provide an uninterrupted power source whenever the main supply of power was inadequate or unavailable. However, many issues accompany battery storage, including long charge times, limited battery lifetime and cycle life, safety and reliability concerns, and large physical size. With the new availability of high value electric double layer capacitors, better known as super capacitors, alternate energy techniques in the disclosed apparatus are employed which eliminate many of these issues. Using Batteries combined with Capacitors in the disclosed apparatus reduces costs, toxic non organic environmental damages, and provides a redundant storage solution readily available for use. Systems relying on batteries for storage power require that a fully charged battery is available at all times with suitable capacity to keep appliances, heating, cooling, or important business machinery working seamlessly. Typically, systems employing battery storage enter a low power standby state whenever the main power fails, and only the critical volatile systems remain powered. Since power failure duration is impossible to predict, such systems require over sized, heavy and expensive batteries to avoid the possibility of appliances not working during a lengthy outage. Capacitor based storage systems use a different methodology. Unlike battery based systems which provide continuous power during the entire storage time, capacitor based systems require only short-term storage power in order to transfer electricity operation for a minimum necessary amount of time. There are several advantages to this approach. First of all, the numerous issues associated with batteries can be avoided altogether. There is also no longer a need to oversize the energy storage elements for a worst case storage duration. While the storage power requirements of a capacitor based system are typically much higher than those of a battery based system, the storage energy requirements are generally much lower. Since the cost and size of a storage solution is usually dominated by the storage element, capacitor solutions are often smaller and cheaper. With the emergence of small, relatively inexpensive super capacitors capable of storing numerous Joules of energy, the number of storage applications that can be satisfied with capacitors instead of batteries has grown considerably. The presented apparatus utilizes both Batteries and Super Capacitor configurations combined and managed by a programmable electronic controller for managing charging and energy withdrawal. The storage capacitor needs to be charged, and ideally this is done in a fast, efficient manner. Since proper storage and use is not possible unless an adequate number of Joules are stored on the storage capacitor, many applications require that charging is completed by the time the system boots up and is ready for operation. Hence, high charge currents are generally desirable, and since super capacitors typically have a max operating voltage of 2.7V, it is common and often necessary for several to be stacked in series. In such cases, provision must be made for balancing and protecting the capacitors as they charge to prevent damage and lifetime degradation due to over voltage. In the current apparatus disclosed we use the LTC3350, a capacitor charger and storage controller IC designed specifically to address capacitor storage applications. The LTC3350 includes all of the features necessary to provide a complete, standalone storage controller for applications needing capacitor based energy storage. The device can charge, balance and protect a plurality of up to four capacitors in series. Input power fail threshold, capacitor charge voltage and regulated minimum storage voltage can all be programmed with external resistors. In addition, the device contains a very accurate 14-bit internal measurement ADC which monitors input, output and capacitor voltage and current. The internal measurement system also monitors parameters associated with the storage capacitors themselves including capacitor stack voltage, capacitance and stack ESR (Equivalent Series Resistance). All system parameters and fault status that can be read back over a two wire I2C bus, and alarm levels can be set to alert the operators of the system to a sudden change in any of these measured parameters. The controller integrated circuit controls provides a dependable High Current Super Capacitor Charger and Energy Storage Supply management system. Charging a super cap is similar to charging a battery except for a couple of key points. The first is that a completely discharged capacitor can be charged at full current for the whole charge cycle, whereas a battery needs to be trickle charged until the battery reaches a specified minimum voltage. A second point is that no termination timer is required for capacitors. Once the final "float" voltage is reached, no additional charge can be stored by the capacitor and charging must stop. If two or more super caps are charged in series, any mismatch in capacitance from cell to cell will result different rates of voltage increase across each capacitor as the stack is charged. Additional safety features need to be in place to assure that none of the capacitors exceeds its maximum voltage rating during the charging cycle. In addition, a balancing system must be used to assure that once the stack is charged, all of the cells are forced to the same voltage and do not drift apart over time due to self-discharge differences. Such cell to cell balancing ensures maximum capacitor lifetime. The charging circuitry in the LTC3350 consists of a high current, synchronous buck controller with a resistor programmable max charge current and max stack voltage. Since the charger is powered from the same supply that is powering the load, the LTC3350 also contains a separate programmable input current limit which automatically reduces charge current to the capacitors under heavy VOUT load conditions. Internal, low current balancers force all cells to within 10 mV of each other up to a max voltage of SV per cell. Internal protection shunts will automatically reduce charging current and shunt the remaining charge current around any capacitor that has reached the 2.7V default or a user-programmed max cell voltage. In addition, the stack charge voltage has the option of being reduced under software control in order to optimize capacitor lifetime for a given storage energy requirement. Once the storage capacitor stack is charged, the system is now able to provide storage power. Charge mode and storage mode are determined by the voltage on the PFI (Power Fail Input) pin. If the VIN voltage drops such that the PFI comparator trips low, the part immediately enters storage mode (see FIG. 3). VOUT will drop as VIN drops, and once the VOUT voltage falls below the capacitor stack voltage, the OUTFET ideal diode conducts to prevent VOUT from falling further. Once VOUT falls to a voltage programmed by a resistor divider on the OUTFB pin, the capacitor charger operates in the opposite direction as a synchronous boost storage DC/DC converter using the VCAP stack as its input source and VOUT as its regulated output. The boost storage converter will continue to run until it can no longer support the VOUT load conditions and the voltage on VOUT falls below the 4.5 V UVLO point. This allows virtually all of the usable energy in the super cap stack to be transferred to the load during storage since the boost will continue to run when the stack voltage is well below 4.5 V. A typical storage scenario in this example, a stack of four series capacitors is charged to 10 V, and during storage mode VOUT is regulated to a minimum of 8V until all energy is depleted from the storage capacitors. "Health" Monitoring Assures Reliability and Optimizes Performance In high reliability systems requiring short-term storage power, adequate energy must be stored and available in order to perform critical functions immediately following a main power failure. It is essential that the storage energy source is able to deliver the necessary storage power. Super capacitors are an excellent choice for such applications due to their extremely high capacitance per unit volume and very low ESR. However, like batteries, their performance will degrade over time. Capacitor lifetime is commonly (and some what arbitrarily) defined as the time required for capacitance to drop by 30% and/or ESR to increase by 100%. As shown in FIG. 4, capacitor degradation is accelerated by either high operating voltages or elevated temperatures. Since both capacitance and capacitor ESR are critical for ensuring that the system can perform reliable backup, it is important that the system is able to monitor and report the "health" of the storage capacitors as they age. The LTC3350 automatically monitors both stack capacitance and stack ESR at a time frequency chosen by the user once the capacitor stack is fully charged. The component in the apparatus employs a precision current source, precision timing circuit and its internal 14-bit ADC to accurately monitor the stack capacitance. A precise, programmed current is pulled from the top of capacitor stack while the charger is forced off. The time required for the capacitor stack to drop by 200 mV is precisely measured, and the stack capacitance is calculated from these parameters. Once the capacitance test is completed, the ESR test is done by measuring the stack voltage with and without the high current charger running to re charge the stack. Using the charger to perform this test eliminates the need for an external high power test load. The instantaneous increase in stack voltage once the charger is enabled corresponds to the measured charge current stack ESR. The most recent values for capacitance and cap ESR may be read back at any time over 2C in temperature. Once the stack capacitance and ESR values are known, it is straightforward to compute the minimum stack voltage necessary to assure a reliable storage for a given application. Since most storage systems are designed with built-in margin, it is often safe to reduce the stack voltage from its nominal value, thereby maximizing the lifetime of the capacitors. This is easily accomplished through software control of the LTC3350 VCAP feedback DAC voltage. Making effective use of super caps often requires series-connected cells, which in turn require protection and balancing circuits. While the cycle life and lifetime in general of a super capacitor may far exceed that of a competing battery technology, small changes in cap voltage and temperature may lead to dramatic changes in the capabilities of the system over time. For this reason, "health" monitoring is often a required feature in any capacitor-based storage system. This is the exact reason the apparatus presented utilizes the LTC3350 integrated circuit controller, aim to address issues like these that pertain specifically to super capacitor storage applications, and provide the simplest means possible for developing a reliable, flexible, high performance storage solution. In still a further embodiment of the presented invention and apparatus for multiple cell electricity generation in parallel and series with battery storage and electricity generation utilizing a switching and pumping apparatus system. Also we have all organic materials used for electricity generation and transferal from cell to cell. In another embodiment of the presented apparatus we have three different kinds of cells with three different kinds of densities and power factors. Our first cell generates electricity in a very rapid high voltage manner, that flows to a second cell that adds current and pressure to the electricity line, and finally a final cell that has high power density for storing the energy created by the other two cells creating a much higher current flow. This apparatus invention provides a line flow system between solar panels and battery storage systems. The cell flows are controlled by switches that are controlled by a programmable computer controller to make sure just the right amount of electricity is generated and pass to the battery system at high peak periods of energy needs and during the nighttime. This apparatus smooths out the alternative energy generation systems, and battery storage systems for a much better useful life span and sustainable energy production all day long. Hybrid Apparatus for air heating and cooling with electricity generation between a plurality of Solar Photo Voltaic modules in an above ground and below ground apparatus The present invention is directed to an apparatus for air heating and cooling with electricity generation from the air between a plurality of Solar Photo Voltaic Panel modules in an above ground and a below ground apparatus.

According to many renewable energy experts, small hybrid electrical systems that combined different alternative energy photo voltaic and other systems technologies offers several advantages over only a single system. By having multiple systems there is less chance of the system breaking down completely. Distributed networks and electrical systems are more dependable and produce more energy and electricity for the use in systems. A hybrid apparatus for air heating and cooling with also electricity generation is a perfect apparatus for undeveloped countries. These undeveloped countries do not electrical systems yet and organic hybrid systems will benefit all mankind. In the current state-of the-art solar panels get hot and get cold in the air that's heated or cooled is not used for any purpose. In the current state-of-the-art is well-known that heating and cooling can be used for advantages in agriculture and electricity generation. In another embodiment of the present invention air pumps connected to tubing are used to move air either hot or cold two different areas of the apparatus for the purposes of growing food cooling water cooling air or warming up food or plants and cooling plants and food in an agricultural system and apparatus. In another embodiment of the present invention the difference between hot air and cold air is used in the apparatus to generate additional electricity. In still another embodiment of the present invention and underground and above ground tubing system with pumps is used to heat and cool water and to generate electricity. Still another embodiment of the present invention the use of warm air is utilized to melt snow and frozen precipitation on the surface of solar photo voltaic panels. In still another embodiment of the present invention warm air can be transported to growing areas below solar panel installations. In still another embodiment of the present invention graphene sheets can be used to create cooling after being exposed to laser light. Air flowing over these sheets and tubings of graphene can be cooled or heated. In still another embodiment of the presented invention an infrared receiver LED array of LEDs is used to convert infrared light and heat into additional electricity that can be stored and used in the system. In still even another embodiment of the present invention a special plurality of growing cells is provided below solar panels for growing all year round with temperature control performed by computer controllers. In another embodiment of the present invention multiple solar panels are able to be used in the same space as a single solar panel utilizing reflecting mirrors that can track optimal solar reflectance for growing food and generating electricity from solar panels aiming the opposite direction of the sun. One objective of the present invention is to give the ability to be able to have solar energy generation combined with growing food that can be used in undeveloped countries or developed countries in any climate all year long. Another objective is to be able to use less space in large areas of land with less restrictive pathways for animals and wildlife so that they can flow and go freely not obstructed by walls of solar panels. In still another objective is the ability for farmers and agricultural pickers to be able to harvest easily crops grown under the solar panel energy generation apparatus. And in still yet another objective of the current presented invention there is components developed so that crops can be grown providing oxygen and vital nutrients into the soil creating a healthy soil in what would be an industrial area. And in yet another objective of the current presented invention drought management can be managed more effectively by the apparatus presented with computer-controlled micro-drip water lines for maximum agricultural growing food plants for human consumption. Hugelkultur are no dig raised beds for the difference they hold moisture, bill fertility, maximize service volume in our great spaces for growing fruit, vegetables and herbs. This form of growing keeps the soil live and provides organic minerals in a much better way to food grown in agriculture. Apparatus for generating electricity from a plurality of Solar Photo Voltaic Panels in a rack mounting structure utilizing a Mirror Tracking apparatus for increasing electricity generation in a specific spatial point area The present apparatus invention is directed to an apparatus for generating electricity from a plurality of solar voltaic panels in a rack mounting structure utilizing a mirror tracking apparatus for increasing electricity generation in a specific spatial point area.

Issues with Traditional Crop Irrigation include:
1. Crop Irrigation Is Closely Tied to Groundwater Depletion.
2. Crop Irrigation Is responsible for taxing aquifers beyond their capacities.
3. Crop Irrigation Is Responsible for environmental impacts of irrigation relate to the changes in quantity and quality of soil and water.
4. Crop Irrigation contributes to altered hydro-logical conditions.
5. Crop Irrigation has immediate effects on the provision of moisture to the atmosphere, inducing atmospheric instabilities and increasing downwind rainfall, or in other cases modifies the atmospheric circulation, delivering rain to different downwind areas.

SUMMARY REGARDING THE CONSERVATION OF WATER AND LAND RESOURCES

One of the embodiment's of this invention is for the apparatus to be inexpensive for Aerial Solar Agricultural Irrigation Apparatus and Mechanism while generating electricity and at the same time have the ability to take up less organic open land space that can be used for agriculture, farming and growing food. Another embodiment of this apparatus invention is to provide the ability to protect agriculture from harsh sunlight in temperatures, and to be able to grow more food in a place that normally food is not grown in regular solar power plant installations. In still another embodiment of this apparatus and invention is the ability for the apparatus to be able to be adjustable so that square land can be irrigated without great expenses, and without utilizing a large footprint on the crops. The Aerial Solar Agricultural Irrigation Apparatus and Mechanism also can work with Atmospheric Water Generation Systems, and can be precisely controlled utilizing Programmable Computer controllers. This Aerial Solar Agricultural Irrigation Apparatus and Mechanism has a lower impact on the Environment, and works 24 hours a day utilizing Electricity Generation Apparatus.

BRIEF DESCRIPTION OF THE SEVERAL VIEWS OF THE DRAWINGS

FIG. 1 shows the Aerial Solar Agricultural Irrigation Apparatus and Mechanism presented here where the irrigation is handled from a main center pivot water tank, and quadracopter drones are used to lift and transport the water lines with nozzles to distribute the water evenly to the crops.

FIG. 1A shows that the Aerial Solar Agricultural Irrigation Apparatus can rotate clockwise or counter clockwise.

FIG. 1B shows a plurality of drones supporting the water irrigation lines in a field.

FIG. 1C further shows where the drones are powerful lifting drones with combined power can lift heavy weights.

FIG. 1D shows a special Aerial Solar Agricultural Irrigation Apparatus nozzle that has many water outlets.

FIG. 1E shows a plurality of water pipe nozzles with multiple outlets controlled by programmable computer controller to create balanced and ecological environmentally safe water saving irrigation.

FIG. 1F Shows the Aerial Solar Agricultural Irrigation Apparatus Pivot Water Tank. And further FIG. 1G shows how the apparatus utilizes Batteries for storage and gets electricity from Generators and Solar Panels.

FIG. 1H shows that water pumps are used to maintain pressures in the system which create lift and helps the Drones do their job. And it further shows that the Water Supply can come from Well and/or Atmospheric Water Generation apparatus.

FIG. 1I of the Aerial Solar Agricultural Irrigation Apparatus we see that electricity generation comes also from a non moving part Solar and magnetic Field Array Electricity Generation Apparatus. And in FIG. 1J we see where a Water sensing water filtration and nutrient replacement computer programmable controlled apparatus is used and implemented to maintain overall quality of hydration during irrigation of crops.

FIG. 2 shows the Aerial Solar Agricultural Irrigation Apparatus and Mechanism presented here showing the pivot water lines can go forward or backward, and that each drone communicates and gets electricity through a programmable Computer Controller Apparatus.

FIG. 2A we see where the Aerial Solar Agricultural Irrigation Apparatus Drones have electricity transferal and receiving Apparatus that can Receive wireless electricity Transferal utilizing infrared electricity transmission to each drone, if the Solar, and storage battery systems are damaged in case of emergencies.

FIG. 2B we see where the Aerial Solar Agricultural Irrigation Apparatus can rotate both ways on top of the center pivot water tower.

FIG. 2C we see where the Aerial Solar Agricultural Irrigation Apparatus Drones have electricity systems that override the batteries which are only used in emergency situations. Each drone has wireless command and control, and has a backup wired power system all along the flexible irrigation tubing.

FIG. 3. shows the Aerial Solar Agricultural Irrigation Apparatus and Mechanism presented here showing where water lines can extend or shrink to be able to water all crops of any shape by simple flying to the area that needs to be watered.

FIG. 3A we see where the Aerial Solar Agricultural Irrigation Apparatus is extended to full length and can irrigate 14 acres per solar Irrigation apparatus and mechanism.

FIG. 3B we see where the where the Aerial Solar Agricultural Irrigation Apparatus unlike rigid Center Pivot Irrigation Lines The Presented Apparatus here can Shorten or Extend Irrigation Lines controlled by the Programmable Computer Controller, and wireless or wired communication with Irrigation Drone mechanisms and apparatus.

FIG. 3C we see where the where the Aerial Solar Agricultural Irrigation Apparatus here can Shorten or Extend Irrigation Lines in different patterns like this shown below for whatever irrigation purposes are necessary managed by Programmable Computer controller Apparatus.

FIG. 4 further shows the Aerial Solar Agricultural Irrigation Apparatus and Mechanism presented here showing where electricity generation utilizing alternative apparatus can be used with the system, apparatus and mechanism.

FIG. 4A we see where the where the Aerial Solar Agricultural Irrigation Apparatus is powered By Solar Panel Array during the Daytime, and Flow Battery Storage Apparatus, Combined with Flywheel Apparatus and Non Moving Part Solar and Magnetic Field Array Electricity Generation Apparatus at Night for Uninterrupted Irrigation Management.

FIG. 4B we see the main water storage tank powered by a plurality of Solar Panels FIG. 4C. shows the apparatus Solar panels.

FIG. 4D shows where the where the Aerial Solar Agricultural Irrigation Apparatus gets additional electricity from the;

FIG. 4E Non Moving Part Solar and Magnetic Field Array "MFA" Electricity Generation Apparatus Utilizing;

FIG. 4F. Shown in the illustration where a plurality of electricity goes in opposite directions thereby creating a magnetic field for electricity generation.

FIG. 5. shows the Aerial Solar Agricultural Irrigation Apparatus and Mechanism presented here showing where a square acreage of land can be watered without wasting water or purchasing expensive extensions to center pivot traditional lines of irrigation.

FIG. 5A shows where the where the Aerial Solar Agricultural Irrigation Apparatus has a Full Area that Needs to be Irrigated.

FIG. 5B shows where the where the Aerial Solar Agricultural Irrigation Apparatus by using the Programmable Computer Controller can even irrigate small areas of crops that need more water than the other areas can be programmed to get extra or less water at any time.

FIG. 5C shows where the where the Aerial Solar Agricultural Irrigation Apparatus is better than center pivot systems that can only irrigate in circles with out adding expensive extensions.

FIG. 5D shows where the Aerial Solar Agricultural Irrigation Apparatus can even irrigate small areas.

FIG. 5E shows where there are Water Ground and Air Sensors components added to the Presented Apparatus that can detect Areas that need to be Irrigated and Using the Programmable Computer Controller can make adjustments in the frequency, amounts and duration of specific spatial point targeting of irrigation needs for the best crop yields.

FIG. 5F shows where the Aerial Solar Agricultural Irrigation Apparatus can water in precise squares and rectangles As the Computer controller can adjust the length of the watering hose lines Programmed by user.

FIG. 5G Prior Art shows Center Pivot Water Irrigation Systems Waste Water and are Not Programmable and Adjustable by Computer Controller.

FIG. 5H Prior Art shows Center Pivot Water Irrigation Systems only can water in circles with out expensive additions the presented invention here can water in precise squares and rectangles as the computer controller of the Aerial Solar Agricultural Irrigation Apparatus can adjust the length of the watering hose lines.

FIG. 6 shows the Aerial Solar Agricultural Irrigation Apparatus and Mechanism presented here showing additional sensing drone component of the Aerial Solar Agricultural Irrigation Apparatus and Mechanism.

FIG. 6A shows a component of the Aerial Solar Agricultural Irrigation Apparatus Computer Drone Irrigation Programmable Controller also controls WSAD.

FIG. 6B Shows where the Water Sensing Analysis Drones (WSAD) are Used to Maintain Overall Irrigation of Crops in the invention.

FIG. 6C Shows where Infrared and Imaging Software is Used to Determine how wet Fields and Crops are at all times in the invention.

FIG. 6D Shows the component called the Computer Drone Irrigation Programmable Controller in the invention.

FIG. 6E shows where in the Invention Crops that need More Water or less are determined and all data from the Water Soil Sensor Drones is immediately sent back to the main Computer controller for use in the Irrigation in Real Time.

FIG. 6F shows as part of the invention components utilizing Water Sensing Analysis Drones Utilize Temperature sensing, moisture sensing, and gaseous analysis to determine best practices for specific crop needs.

FIG. 6G shows where the sensing drone component of the presented invention senses if the ground needs to be watered or not.

FIG. 6H shows a close up of the ground the way the sensing water drone component sees the ground as part of the invention.

FIG. 7 of the apparatus shows splitting virtual currency mining payoff rewards with nonprofit, profit and poverty individuals through donations.

FIG. 7A shows ASIC mining apparatus processing SHA 256 hashing problems to mine new Bitcoin's.

FIG. 7B we see where the ASIC miner discovers a valid block added to block chain and gets a payoff of a coin amount (X) which is the amount of the block chain reward programmed into the crypto coin Genesis block for reward to miners when they discover a block of crypto virtual currency coins.

FIG. 7C we show where the (X) amount of awarded reward and pay off for discovering a block of the crypto coin is split into the (Y) amount of crypto virtual currency coins and the (Z) amount of crypto virtual currency coins.

FIG. 7C also shows that the split amount of one direction is the miner digital virtual currency coin storage wallet for block reward.

FIG. 7D shows that the split amount of the other direction is the nonprofit donation pool fund digital virtual currency coin storage wallet for block reward.

FIG. 7E shows where we have five split offs of the crypto coin from the nonprofit donation pool fund digital virtual currency coin storage wallet for block reward.

FIG. 7E the last wallet the (E) wallet is used for donations to actual poverty individuals for their contribution of proof of work utilizing a mobile app by the invention apparatus and processes presented here this invention.

FIG. 7F shows where each of the five different split offs proceed to go to four different donation wallets and one poverty individual donation digital virtual currency coin storage wallet.

FIG. 7G shows the programmable logic controller "PLC" that continuously monitors the state of input devices and makes decisions based upon a custom program to continue to state of output devices. The biggest benefit in using a PLC apparatus is the ability to change and replicate the operation or process while collecting and communicating vital information. This programmable logic controller handles the distribution of divided and split crypto currencies and coin to different wallet addresses.

FIG. 7H we see where the programmable logic controller and processes has delivered coins to wallets of individuals who are mining crypto currency coins.

In FIG. 7I we see where a large group of poverty recipients are having their coins delivered from the poverty individual donation digital virtual currency coin storage wallet E.

FIG. 7J and FIG. 7K shows the movement of crypto coin currency being moved into the appropriate wallets. And state where the more minors a virtual digital currency coins mine coins the more people in poverty and nonprofit foundations benefit from donations because of the invention, apparatus and process presented herein disclosed.

FIG. 8 of the presented invention, apparatus and process shows a different splitting of the block reward during the block peer-to-peer acceptance aspect of block chain virtual crypto currencies.

FIG. 8A shows where the minor discovers a valid block and gets the block added to the block chain after peer-to-peer approval and gets payoff of a certain amount of crypto virtual currency coins.

FIG. 8B shows discovering a block of the crypto coin is split into the (Y) amount of crypto virtual currency coins and the (Z) amount of crypto virtual currency coins. It also shows where the apparatus and process utilizing the "PLC" apparatus divides the original block reward into two or a plurality amount of crypto coins.

FIG. 8C and FIG. 8D deposits them into is to totally separate and totally separately owned crypto currency coin wallets one deposited in FIG. 8C which is the miners actual digital virtual currency coin storage wallet for block reward.

FIG. 8D shows an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture capital purposes.

FIG. 8E we show five different additional wallets that take the FIG. 8D venture investment pool fund digital virtual currency coin storage wallet for block reward. FIG. 8E we show where we divide the funds in that account electronic digital crypto coin wallet into a venture fund wallet, investment fund wallet, a small business investment fund wallet, an education and school fund wallet as well at the same time depositing a portion of the venture investment pool fund digital virtual currency coin storage wallet for block reward into the poverty individual donation digital virtual currency coin storage wallet for actual donations and payoffs for proof of work from poverty individuals around the world. As of the disclosure of this invention the amount of people living in poverty on the planet Earth was 3.5 billion people. Again we show where the more minors of virtual digital currency coins mine the crypto currency the more people in poverty and businesses benefit from donations or investment.

FIG. 8F shows how the apparatus splits the mined crypto currency to the selected A,B,C,D, and 8E crypto wallets that were directed from the 8E-8D venture investment pool fund digital virtual currency coin storage wallet split from A,B, C,D, and E fair share split.

FIG. 9 shows Apparatus for Splitting Virtual Currency Mining Payoff Rewards with Non Profit and Poverty Individuals Through Donations with key components, steps and functions.

FIG. 9A we show the same processes splitting the main block reward earned by miners into separate useful wallets for the purpose of creating funding sources for goodwill and to fund businesses and nonprofits.

FIG. 9B we show the same processes splitting the main block reward earned by miners into separate useful wallets for the purpose of creating funding sources for goodwill and to fund businesses and nonprofits.

FIG. 9C we see where teachers receive crypto coin currency that is useful in their wallets.

FIG. 9D we see where teachers receive crypto coin currency that is useful in their wallets.

FIG. 9E a we see where teachers receive crypto coin currency that is useful in their wallets.

FIG. 9F we see where poverty individuals or any individuals in the world receive crypto virtual currency coins in their wallets for proof of work in taking pictures and submitting them to the system.

FIG. 9G we see where poverty individuals or any individuals in the world receive crypto virtual currency coins in their wallets for proof of work in taking pictures and submitting them to the system.

FIG. 9H we see where poverty individuals or any individuals in the world receive crypto virtual currency coins in their wallets for proof of work in taking pictures and submitting them to the system. We also see people in poverty, people with mobile phones, or the general population being able to earn additional crypto currency coins from the fund wallet for making videos and uploading them to the system as proof of work.

FIG. 10 shows Apparatus for Splitting Virtual Currency Mining Payoff Rewards with Non Profit and Poverty Individuals Through Donations with key components, steps and functions.

FIG. 10A where an artist can have a wallet connected to the system or a series of artists can be funded by payouts from the investment pool fund digital virtual currency coin storage wallet for block reward in the splitting of payments in the system between different wallets;

FIG. 10B we show the same apparatuses and processes as FIG. 7B and we have shown In FIG. 10A and FIG. 10B we also show the same apparatuses and processes as FIG. 8B and we have shown FIG. 10A where an artist can have a wallet connected to the system or a series of artists can be funded by payouts from the investment pool fund digital virtual currency coin storage wallet for block reward in the splitting of payments in the system between different wallets.

FIG. 10C and FIG. 10D deposits them into is to totally separate and totally separately owned crypto currency coin wallets one deposited in FIG. 10C which is the miners actual digital virtual currency coin storage wallet for block reward;

FIG. 10D an actual deposit into a venture investment pool fund digital virtual currency coin storage wallet for block reward. The venture investment pool fund digital virtual currency coin storage wallet for block reward can be used for investments into small businesses, businesses corporations, venture capital funds, venture-capital purposes;

FIG. 10E we show five different additional wallets that take the FIG. 10D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 10F shows how the apparatus splits the mined crypto currency to the selected A, B, C, D, and E crypto wallets that were directed from the 10E-10D venture investment pool fund digital virtual currency coin storage wallet split from A, B, C, D, and E fair share split;

FIG. 10G we see where a woman from an unprivileged area, in poverty can use her computer, mobile phone to submit stories as proof of work to receive crypto virtual currency coins as payment for the proof of work. These crypto virtual currency coins can be traded on different exchanges for the needs to expand her health and prosperity in her life.

FIG. 10H we see a construction worker in undeveloped country having the ability to build things as a show of proof of work, and he can receive crypto virtual currency coins from the block rewards of minors in a split payment system where he can continue working and being paid from the pool fund digital virtual currency coin storage wallet for block reward wallet directly to his wallet after proof of work is demonstrated.

FIG. 11 shows Apparatus for Splitting Virtual Currency Mining Payoff Rewards with Non Profit and Poverty Individuals Through Donations with these key components, steps and functions;

FIG. 11A shows where donations from the apparatus represents doctors and clinics in undeveloped countries who can provide stories, images, videos, and services that will warrant proof of work for having crypto virtual currency coins delivered instantly to the doctor or the clinics digital currency crypto wallet for use in their systems, business, and goodwill work they do that can be traded on the exchanges for different currencies for the uses, medicines, food, water. And in FIGS. 11A and 11B we show the same apparatuses and processes as FIG. 8.

FIG. 11B shows the same apparatuses and processes as FIG. 7B.

FIG. 11C and FIG. 11D deposits them into is to totally separate and totally separately owned crypto currency coin wallets one deposited in FIG. 11C which is the miners actual digital virtual currency coin storage wallet for block reward;

FIG. 11D an actual deposit into a venture investment pool fund digital virtual currency coin storage wallet for block reward. The venture investment pool fund digital virtual currency coin storage wallet for block reward can be used for investments into small businesses, businesses corporations, venture capital funds, venture-capital purposes;

FIG. 11E we show five different additional wallets that take the FIG. 11D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 11F shows how the apparatus splits the mined crypto currency to the selected A, B, C, D, and E crypto wallets that were directed from the FIG. 11E-FIG. 11D venture investment pool fund digital virtual currency coin storage wallet split from A, B, C, D, and E fair share split.

FIG. 11G shows where money can be divided from the block rewards and mining crypto currency coins for use with educators, inventors, and innovators that need funding to keep going sent to their digital wallets for storage of crypto currency coins that they can use from exchanges at a later date, and additionally;

FIG. 11H shows where people to cook food for people in the Third World, undeveloped countries, and poverty areas can get benefits from digital currencies coins for their proof of work in cooking food and feeding people in need and in poverty around the world.

FIG. 12 shows Apparatus for Splitting Virtual Currency Mining Payoff Rewards with Non Profit Environment and Poverty Individuals Through Donations with these key components, steps and functions;

FIG. 12A can have benefits from another split wallet split off from the venture investment pool fund digital virtual currency coin storage wallet for block reward or nonprofit digital wallet, or the benefit wallet;

FIG. 12A, or the FIG. 12G environmental world wallet, or; water FIG. 12B shows the same apparatuses and processes as FIG. 7B where we have shown where;

FIG. 12C and FIG. 12D deposits them into is to totally separate and totally separately owned crypto currency coin wallets one deposited in FIG. 12C which is the miners actual digital virtual currency coin storage wallet for block reward;

FIG. 12D an actual deposit into a venture investment pool fund digital virtual currency coin storage wallet for block reward. The venture investment pool fund digital virtual currency coin storage wallet for block reward can be used for investments into small businesses, businesses corporations, venture capital funds, venture-capital purposes;

FIG. 12E we show five different additional wallets that take the FIG. 12D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 12F shows how the apparatus splits the mined crypto currency to the selected A, B, C, D, and E crypto wallets that were directed from the 12E-12D venture investment pool fund digital virtual currency coin storage wallet split from A, B, C, D, and E fair share split;

FIG. 12G environmental world wallet;

FIG. 12H the recycled solar energy fund wallet, or;

FIG. 12I showing the wallet where the crypto currency coins are being split off and sent to be distributed among undeveloped countries peoples who are doing work in things like;

FIG. 12J building houses that are energy-efficient and inexpensive, and as well as;

FIG. 12K having wallets of crypto currencies coins being delivered into; FIG. 12K wallet for use helping wildlife and environmental needs.

FIG. 13 shows a pump generator energy storage apparatus and system presented here managed by a plurality of autonomous or manual computer controllers that can be programmed for energy creation and water conservation. And also shows egg shape Hydro electric generator for structuring water with graphene water filtration system, and electricity generation through fluid turbine piping system.

FIG. 13A shows a lower egg shaped tank electricity generation apparatus component for storing water that can be filled from a well or any other water source and can continually create electricity as it structures the fluid or water.

FIG. 13A Further shows where water goes out to a lower area utilizing gravity to create additional force in a combined stepping, and pumping system and apparatus.

FIG. 13B shows a brush less water electricity generation device with fluid water Hydro turbine with the rotor turning inside of the pipe with an outside stater mounted over the magnetic Hydro water turbine with the positive and negative wire coming out of the AC generator going into the bridge rectifier for conversion to DC electricity which is part of the presented apparatus here.

FIG. 13C shows a booster pump that can pump water at any pressure controlled by the programmable computer controller in the presented apparatus here. FIG. 13C also shows the four fluid water turbines that the water has to pass through.

FIG. 13D shows where the water flow is moving upward from the egg shaped lower water tank and is pumped with pressure into for FIG. 13B brush less water electricity generation devices that have turbines that turn when water flows through them utilizing gravity before each electricity generation through the water turbine generators plus providing the added gravity force from the pump to push the water upward to the, next pump, the apparatus produces exponentially more electricity as it goes up the tubing system and through the water turbine generators until it reaches the top of the upper tank.

FIG. 13E shows the upper egg shaped fluid water structuring and electricity generation tank with its input and output port at the top.

FIG. 13F shows where AC electricity generated by the power pump generator energy storage apparatus, Hydro water fluid turbine generators is converted into DC electricity utilizing bridge rectifier with transformer and capacitor for smoothing the waveform. The presented apparatus can distribute AC electricity and also DC electricity. The bridge rectifier electronics located inside the programmable computer controller box with battery storage access. The programmable computer controller box has three separate functions, a liquid tank programmable computer controller and battery storage, a liquid pump programmable computer controller and battery storage, and a liquid turbine programmable computer controller battery storage plurality of apparatus, components, devices that work in the apparatus presented here in this invention.

FIG. 13G shows an on-off fluid water valve for redirecting water to drinking water, watering plants inside living structures, swimming pools, saunas, bathing, showers, and other useful freshwater uses.

FIG. 13H shows an on-off fluid water valve for redirecting water to the graphene filtration system tank for water filtration, reducing minerals, and then used for either freshwater source, or irrigation of agricultural fields and growing areas.

FIG. 13I shows multiple graphene filtration area inside storage tank.

FIG. 13J shows fluid or water being pumped for use inside facilities, homes, factory, business, private structure.

FIG. 13K shows fluid or water being pumped for use and agricultural fields, back to the aquifers, for growing plants, for pumping through piping in the ground to create cooling systems with the ground temperature between 40° F. and 50° F. all year round.

FIG. 13L shows a schematic utilizing the bridge rectifier in FIG. 13F adding a transformer to be able to increase to higher voltages as part of the apparatus presented here.

FIG. 13M additionally shows a schematic utilizing the bridge rectifier in FIG. 13F adding a transformer to be able to increase to higher voltages as part of the apparatus presented here.

FIG. 14 shows Hydro Electric Structured Water Apparatus.

FIG. 14A shows the one-way air pump at the top of the egg shaped fluid storage tank of the hydroelectric structured water electricity generator and water storage tank apparatus.

FIG. 14B shows the pump's system for pumping water from an aquifer, River, stream, Lake or other water source utilizing a water well, or piping system.

FIG. 14B also shows where the water is pumped into the egg shaped water tank of the presented invention.

FIG. 14C shows where groundwater from well can be pumped and redirected into the egg shaped water tank for storage or running the Hydro water turbine electrical generators while structuring the water the same time.

FIG. 14D shows the egg shaped water storage tank with the orange stators and the rotor Hydro turbine"s aspect of the three turbine generators that turn when water flows through the center of the egg storage tank rotating the water and structuring the water as it goes through the one-way valve out back into the tank.

FIG. 14E shows water flow inside the egg shaped water tank.

FIG. 14F shows water deflectors, a plate or other attachment for deflecting a flow of water to optimal points of the Rotor Hydro turbine for maximum currents creation to get maximum RPM of the Rotor Hydro turbine's.

FIG. 14G shows the outward movement of water for agricultural irrigation utilizing structured water which in scientific tests have shown to grow better stronger and healthier plants.

FIG. 14H shows the three Hydro turbine generators.

FIG. 14I shows where structured water is formed in a vortex. The water can store memory. Water has been shown to get proper structuring through using a vortex. The air created by the Vortex puts energy back into the water. And structured water grows stronger and better plants.

FIG. 14J shows a one-way valve that builds pressure in the egg shaped water storage tank aspect of the presented apparatus invention here. So that all water entering the bottom of the egg shaped tank moves strongly to the top of the egg shaped tank.

FIG. 14K shows a marked line showing the ground level.

FIG. 14L shows that piping systems included in the presented apparatus invention have an other energy electricity generation apparatus involving graphene coated pipe with a separator on top of magnesium metal where when water flows over the two electrodes the anode and the cathode electricity is created and harvested by the graphene coated pipe electrical flow generator.

FIG. 14M shows another pipe that utilizes the graphene flow electrical generation piping system as a component in the presented apparatus invention here.

FIG. 14N shows also where the output piping systems utilize the graphene flow electrical generation piping system as a component in the presented apparatus and invention here.

FIG. 15 shows Hydro Electric Structured Water Apparatus

FIG. 15A shows the one-way air pump at the top of the egg shaped fluid storage tank of the hydroelectric structured water electricity generator and water storage tank apparatus.

FIG. 15B shows the pump's system for pumping water from an aquifer, River, stream, Lake or other water source utilizing a water well, or piping system.

FIG. 15B also shows where the water is pumped into the egg shaped water tank of the presented invention.

FIG. 15C shows where groundwater from well can be pumped and redirected into the egg shaped water tank for storage or running the Hydro water turbine electrical generators while structuring the water the same time.

FIG. 15D shows the egg shaped water storage tank with the orange stators and the rotor Hydro turbine"s aspect of the three turbine generators that turn when water flows through the center of the egg storage tank rotating the water and structuring the water as it goes through the one-way valve out back into the tank.

FIG. 15E shows water flow inside the egg shaped water tank.

FIG. 15F shows water deflectors, a plate or other attachment for deflecting a flow of water to optimal points of the Rotor Hydro turbine for maximum currents creation to get maximum RPM of the Rotor Hydro turbine's.

FIG. 15G shows the outward movement of water for agricultural irrigation utilizing structured water which in scientific tests have shown to grow better stronger and healthier plants.

FIG. 15H shows the three Hydro turbine generators.

FIG. 15I shows where structured water is formed in a vortex. The water can store memory. Water has been shown to get proper structuring through using a vortex. The air created by the Vortex puts energy back into the water. And structured water grows stronger and better plants.

FIG. 15J shows a one-way valve that builds pressure in the egg shaped water storage tank aspect of the presented apparatus invention here. So that all water entering the bottom of the egg shaped tank moves strongly to the top of the egg shaped tank.

FIG. 15K shows a marked line showing the ground level.

FIG. 15L shows that piping systems included in the presented apparatus invention have an other energy electricity generation apparatus involving graphene coated pipe with a separator on top of magnesium metal where when water flows over the two electrodes the anode and the cathode electricity is created and harvested by the graphene coated pipe electrical flow generator.

FIG. 15M shows another pipe that utilizes the graphene flow electrical generation piping system as a component in the presented apparatus invention here.

FIG. 15N shows also where the output piping systems utilize the graphene flow electrical generation piping system as a component in the presented apparatus and invention here.

FIG. 16 Describes structural aspects functions and processes of the Alternative Energy Booster Apparatus Switching System for the individual Shutoff of Cells, the Modifying Polarity and the Switching of Circuits from Parallel to Series Connection with these key functions;

FIG. 16A The function of a plurality of computer controlled switching devices in each cell that can Switch Between a plurality of Rechargeable Storage Devices Super capacitors, Ultra capacitors or batteries.

FIG. 16B The function of a plurality of computer controlled switching devices in each cell that can Switch to Series or Parallel connections of Cells.

FIG. 16C The function where each Switch has the apparatus wiring and logic of a computer controller that can change the Polarity+−Connection of Cell and Storage devices such as batteries to Series or Parallel connections.

FIG. 16D The function where each Switch can Switch Off or Override each cell in Connection and Storage devices such as batteries.

FIG. 16E The function where a programmable controller can utilize the DC Mechanical Switch, Electrode Dipper, and Electrolyte Pump in the apparatus.

FIG. 17 Shows diagrams of the Alternative Energy Booster Apparatus Switching System for Shutoff and Programmable Software Controlled Management of Electricity Generation, Use and Storage Apparatus.

FIG. 17A shows Programmable Controller electricity generation apparatus management.

FIG. 17B shows On Off Switching System for Shutoff and Programmable Software Controlled Management of Electricity Generation, Use and Storage Apparatus;

FIG. 17C shows programmable controller controls a plurality of these components in;

FIG. 17D shows Inverter A C to DC and DC to AC.

FIG. 17E DC Electricity Storage Batteries, Super Capacitors, Ultra Capacitors; DC Electricity Generation Apparatus, Solar Panel, AC Grid Input/Output; Inverter.

FIG. 17F shows Programmable Controller; Direct D C Appliance, and wall jacks for USB Power delivery apparatus.

FIG. 17G the Controller also has a programmable function to be able to reroute appliances to available plurality of electricity generation apparatus and devices, and furthermore has programmable functions to recharge batteries, and redirect available electricity generation to and from the battery or other storage devices, and still further these conversion and switching functions; DC to AC conversion; AC to DC conversion; On/Off Switching Programmable Controller; USB-C PDAware Wall Plate and appliance connectors; Direct D C Appliance Use.

FIG. 17H the Controller has programmable function for adding electricity from generator to the inverter when the grid, solar panels, or generators stop working due to clouds, night time or grid generation failure.

FIG. 17I where the Alternative Energy Booster Apparatus Controller is programmed to continuously check voltages and currents and directs, switches on and off for the purpose of adding electricity to any device that has a low voltage or current, for the best efficiency and use, additionally the controller also has a programmable function to change polarity, switch between electricity storage devices, and manage appliance apparatus.

FIG. 18 Shows diagrams of the Alternative Energy Booster Apparatus and other DC Electricity Sources with the Plurality Layers Alternate Utility Grade Cell in Apparatus with these key functions;

FIG. 18A Shows Cell Case Cover;

FIG. 18B Shows Graphene Layered Anode Electrode Connected to Anode Connector;

FIG. 18C Shows Anode Connector;

FIG. 18D Shows Graphene Layer Connected to Anode Connector;

FIG. 18E Shows Leaf Chlorophyll Cellulose Separator;

FIG. 18F Shows Graphene Layer Connected to Anode Connector;

FIG. 18G Shows Leaf Chlorophyll Cellulose Separator;

FIG. 18H Shows Graphene Layer Connected to Anode Connector;

FIG. 18I Shows Multiple Cathode Connector;

FIG. 18J Shows Multiple Cathodes Embedded and encased In timer acrylic polymer Coatings that work with or with out the Switching Dipping Apparatus which increases the voltage, current and the life of The cell in the apparatus;

FIG. 18K Shows Multiple cathodes Continually Dipped in and out of the Electrolyte For increased And current Output Up and Down path in and out of the electrolyte;

FIG. 18L Shows Electrolyte inside+Anode case where all of the components are submerged partly in electrolyte;

FIG. 19 Shows diagrams of the Alternative Energy Booster Apparatus and other DC Electricity Sources with the Mobile Phone Payment System Connected to mechanically and electronically Shutting off of Cells, Modifying Polarity and reducing energy output of the Solar Panel Boost Apparatus with these key functions;

FIG. 19A Shows Mobile Phone Connected to the Internet;

FIG. 19B Shows Solar Panel (Alternative Energy) Boost Apparatus;

FIG. 19C Shows Mechanical Electrode Switching;

FIG. 19D Shows Electronic Electrode Switching;

FIG. 19E Shows Electronic controller;

FIG. 19F Shows Solar panel Electricity Generation;

FIG. 19G Shows Magnetic motor electricity generation;

FIG. 19H Shows Wireless Laser Electricity transferal;

FIG. 19I Shows Super Capacitor storage;

FIG. 19J Shows battery storage;

FIG. 19K Shows Mechanical Generators alternative energy apparatus components;

FIG. 19L Shows Wireless Electrical transferal apparatus;

FIG. 19M Shows switching apparatus used for payments;

FIG. 19N Shows dipping switching apparatus used in payments and the function where a programmable controller can utilize the DC Mechanical Switch, Electrode Dipper, and Electrolyte Pump in the apparatus to control payments.

FIG. 19O we show the Infrared Generator apparatus, that shows an infrared electricity generation apparatus, utilizing Anode cathode and graphene chlorophyll solution where the temperature increases generation with these key components, steps and functions.

FIG. 20 shows Apparatus for Multiple Cell Electricity Generation.

FIG. 20A shows the negative cathode in a graphene gel electrolytic connected in a parallel configuration.

FIG. 20B shows the positive anode in a graphene gel electrolytic connected in a parallel configuration.

FIG. 20C shows the positive anode connected to the positive anode of the blue gel polymer cell connecting the graphene gel cell in parallel to the blue gel cell.

FIG. 20D shows the graphene gel cell connected in parallel to the blue gel polymer cell and finally connected to the chlorophyll gel cell.

FIG. 20E shows the blue gel polymer cell connected to the graphene gel cell and also connected to the chlorophyll gel cell in parallel configuration.

FIG. 20F shows the chlorophyll gel cell connected to the blue gel polymer cell and also connected to the graphene gel cell in a parallel connection as a component in the apparatus for multiple cell electricity generation apparatus invention presented here.

FIG. 21 shows Apparatus for Air Heating and Cooling with Electricity Generation between a plurality of Solar PV Modules in an above ground and below ground System FIG. 21A shows a programmable computer controller for controlling pumps, switches, sensors, pump flow rate, electricity storage, electricity generation, temperature, of all components in the present invention.

FIG. 21B shows a solar panel mirror system and apparatus that reflects the solar light to the surface of the tubing above ground along with so light directly hitting the piping system above ground in the presented apparatus.

FIG. 21C shows the sun and position in the sky as related to use in the presented invention.

FIG. 21D shows temperature sensors that are connected to the programmable computer controller above ground.

FIG. 21E shows above ground lines of pipes for heating cooling from the sun reflected objects and at nighttime cooling in the presented invention.

FIG. 21F shows where all pipes in the system can have a graphene coating inside or outside or in both inside and outside of the piping systems for electricity generation in the present invention. The diagram also shows where the sun and above ground temperatures heat the pipes above ground in the red tone pipe and where the underground pipes are cooled to 40° F. to 50° F. in the blue diagram of the underground pipe. The diagram also shows the graphene inside the pip that is applied as an insert or as a thin layer coating of graphene anode since it's painted on to separator that is painted onto the cathode material inside the pipe.

FIG. 21G shows two pumps in the presented apparatus that can bring water from the cool ground for use above ground and at the same time bring water from the above ground surface warm area to other areas underground for use in heating and cooling of water for irrigation and agricultural purposes.

FIG. 21H shows the piping system stacked in a way in the presented apparatus where less space is needed for heating and cooling through the pipes.

FIG. 21I shows infrared Peltier effect plus Seebeck effect thermo electric electricity generation components placed between the hot and the cold below ground piping systems in the presented apparatus invention, in the apparatus presented here materials being used in the Thermo electricity generation system are graphene and magnesium.

FIG. 21J shows the underground stacked piping system in the presented apparatus.

FIG. 21K shows two pumps in the presented apparatus that can bring water from the cool ground for use above ground and at the same time bring water from the above ground surface water warm area to other areas underground for use in heating and cooling of water for irrigation and agricultural purposes.

FIG. 21L shows the ground level line to demonstrate above ground and below ground.

FIG. 21M shows an enlarged area of the electricity generating water flowing pipe with anode and cathode added in graphene.

FIG. 21N shows the anode in the apparatus system and invention presented here.

FIG. 21O shows the cathode in the apparatus system and invention presented here.

FIG. 21P shows where the water flows over the anode and cathode that is painted on the surface creating electrons that flow through the anode and cathode material for harvesting for use in the apparatus, or stored in batteries, or use outside of the apparatus.

FIG. 22 shows the presented invention apparatus for air heating and cooling with electricity generation between a plurality of solar photo voltaic modules in an above ground and below ground system.

FIG. 22A describes a storage tank for hot air pumped out of the middle of solar panels mounted back-to-back for creating hot air needed for electricity generation are to warm agriculture or systems in the presented invention.

FIG. 22B shows a pumping device to pump air out of the solar panels mounted back-to-back for cooling the solar panels to get higher electricity generation and to protect the solar panels from extreme heat.

FIG. 22C shows mirrors projecting light from the sun reflecting light onto the back panel of the back to back solar panel photo voltaic modules so that the back panel can have light to generate electricity and light to grow agriculture below the back solar panel and bounding array.

FIG. 22D shows a sensing device use to measure temperatures and amount of light in specific spatial points on the back solar panel for the purpose of management by programmable computer controller.

FIG. 22E shows the front solar panel of the back to back mounted solar panels in a sealed case with the back solar panel for managing heating and cooling systems in the presented invention.

FIG. 22F shows another sensor for thermal and light sensitivity mounted in a Spatial point area for sensing measurements sent back to the programmable computer controller.

FIG. 22G shows the sun reflecting on this surface of the front solar panel and reflecting on the mirror that reflects light to the back solar panel.

FIG. 22H shows another sensor mounted a spatial point for measurements sent back to the programmable computer controller.

FIG. 22I shows a mounting rack bar that controls the tilt of the back to back solar panel in a case system aspect of the presented invention.

FIG. 22J shows another sensor ascends thermal and light information and light sensitivity data to a programmable computer controller for positioning of the mirrors for the best optimum light and thermal management along with the programmable computer controller that controls pumps in storage of water in the system.

FIG. 22K shows input port for air from the outside that goes between the two back to back solar panels heating the air that is removed by FIG. 22B pump into container FIG. 22A for processing and use in the system controlled by a programmable computer controller.

FIG. 22L shows a storage tank for filtered water from groundwater aquifers that can be piped into a holding tank for being heated or cooled to be delivered through FIG. 22S irrigation system to crops and plants and agricultural aspect of the presented invention.

FIG. 22M shows the programmable computer controller that controls data coming from sensors related to thermal lighting temperatures and the identification of materials. The programmable computer controller also measures pump flow rates of all pumps, tank measurements of capacity and of air and water, and lasers angles on graphene pipes and sheets for cooling in heating at specific points in the presented invention. The computer controller also is programmed to control the tilts of back to back solar panels, and mirrors up and down left and right and skewed. The purpose for these movements is to produce more electricity, depending upon the angle of the sun and for cooling in heating the below ground agricultural systems.

FIG. 22N shows the pipe attached to the tank storing the filtered water for use and agricultural irrigation drinking water and heating cooling in the system.

FIG. 22O shows the output pipe for filtered water to be used in the system and outside the system.

FIG. 22P shows the bottom of the tank were groundwater from aquifers is stored with graphene filtration system built-in for filtered groundwater for use in humanitarian needs and by the system.

FIG. 22Q shows a pipe coming from a well being pumped from an aquifer for use in the system.

FIG. 22R shows where water from the ground in aquifers can be pumped into a series of metal pipes or other high thermal transfer piping systems for cooling water underground to 40° F. to 50° F. for cooling in the system.

FIG. 22S shows a graphene sheet for cooling and electricity generation converting light to energy and converting light to temperatures utilizing angles of laser input to the surface of the graphene.

FIG. 22T shows a plurality of low energy lasers controlled by the programmable computer controller for temperature adjustments and electricity generation in the presented invention.

FIG. 22U shows a storage tank for water that receives water from the ground filtered and unfiltered and that also sends water to agriculture in an irrigation system and that also heats and cools water from air transported to it from the back to back solar panels air heating and cooling apparatus in the presented invention.

FIG. 22V shows coils and stacks piping for water flow below the ground surface for the purpose of cooling water for use in air-conditioning and heating systems in refrigeration systems for agriculture or just general cooling in the system in the present invention.

FIG. 23 shows Apparatus for a Hugelkultur growing bed, below a plurality of Solar panels with square foot agricultural, drip irrigation growing cells FIG. 23. The purpose of the upper mirrors is to reflect light onto the plants as solar panel farms have issues with light not reaching the ground underneath the solar panels. Reflected light from the upper mirrors apparatus can also be reflected back into the backside solar panels in a dual back to back solar panel apparatus configuration. These upper mirrors systems can be track-able and movable mechanisms to always reflect the greatest amount of light for use in the apparatus and invention presented here.

FIG. 23A shows the upper mirrors apparatus that are mounted on the side of the solar panel mounting system so as not to block the racking system aligned behind the racking system and apparatus shown in this FIG. 23B shows the lower mirrors apparatus that are mounted on the side of the solar panel mounting system so as not to block the racking system aligned behind the racking system and apparatus shown in this FIG. 23. The purpose of the lower mirrors is to reflect light into the solar panels that have the back to back solar panels mounted in a dual apparatus configuration lower mirrors systems can be track-able and movable mechanisms to always reflect the greatest amount of light for use in the apparatus and invention presented here.

FIG. 23C shows apparatus for a Hugelkultur growing bed below a plurality of solar panels with square foot agricultural drip irrigation growing cells FIG. 23C shows the open racking system where agricultural workers can work under the solar panels. The racking system supports a plurality of solar panels and can be covered all sides in the winter for all year around growing.

FIG. 23D shows the abundance of growing plants in the large surface, and ground space below the solar panels.

FIG. 23D also shows the figure of a man to show the perspective of the height of the racking system for easy access to the growing areas by agricultural workers.

FIG. 23E shows the lower mirrors apparatus that are mounted on the side of the solar panel mounting system so as not to block the racking system aligned behind the racking system and apparatus shown in this FIG. 23. The purpose of the lower mirrors is to reflect light into the solar panels that have the back to back solar panels mounted in a dual apparatus configuration lower mirrors systems can be track-able and movable mechanisms to always reflect the greatest amount of light for use in the apparatus and invention presented here.

FIG. 23F shows the upper mirrors apparatus that are mounted on the side of the solar panel mounting system so as not to block the racking system aligned behind the racking system and apparatus shown in this FIG. 23. The purpose of the upper mirrors is to reflect light onto the plants as solar panel farms have issues with light not reaching the ground underneath the solar panels. Reflected light from the upper mirrors apparatus can also be reflected back into the backside solar panels in a dual back to back solar panel apparatus configuration. These upper mirrors systems can be track-able and movable mechanisms to always reflect the greatest amount of light for use in the apparatus and invention presented here.

FIG. 24 shows the Liquid Electrode Frequency Energy Generator where additional electricity can be generated efficiently combining the Solar Panel Booster apparatus, with liquid electrode flow battery systems for sustainability in undeveloped places, for people in Poverty, while protecting the animals, Wildlife and the environment.

FIG. 24A shows the positive+Liquid Electrode for pumping into the frequency generator unit.

FIG. 24B shows the negative−Liquid Electrode for pumping in to the counter rotating part of the frequency generator unit there by freeing electrons to flow through the system.

FIG. 24C shows the opposite north polar rotating electrode fluids generating free electrons.

FIG. 24D shows the opposite south polar rotating electrode fluids generating free electrons.

FIG. 24E shows the solar panel receiver unit for transferring communication and electricity to the unit.

FIG. 24F shows the center hollow magnetic generation unit with a solar panel mounted to the casing.

FIG. 24G shows the Solar panels powering the Apparatus through the Solar panel booster unit.

FIG. 24H shows the Solar Panel Boost unit.

FIG. 24I shows the Signal Generator unit.

FIG. 24J shows the Programmable Computer Controller.

FIG. 24K shows the Laser Switching Transmitter.

FIG. 24L shows the Programmable Computer controller for managing the transactions and autonomous fair share beneficiary block chain crypto payment system to people, and people in poverty, along with protecting Animals, Wildlife, and the environment.

FIG. 24M shows the Block Chain Payment Ledger Poverty Beneficiary Apparatus.

FIG. 24N shows the electron Permeable Separator for electrons to flow between the electrodes.

FIG. 24O shows the Flow Battery Storage apparatus with liquid+−electrodes.

FIG. 24P shows the electricity used for lighting, needed cooking and atmospheric water generation.

DETAILED DESCRIPTION OF THE INVENTION

What is described here in the presented apparatus and invention is the Aerial Solar Agricultural Irrigation Apparatus and Mechanism. An apparatus to assist Farmers in their agricultural needs, by helping them reduce their water needs, increase their crop yield, reduce vacant un-irrigated fields, and reduce damages to the environment.

FIG. 1A shows that the Aerial Solar Agricultural Irrigation Apparatus can rotate clockwise or counter clockwise. And FIG. 1B shows a plurality of drones supporting the water irrigation lines in a field. And FIG. 1C further shows where the drones are powerful lifting drones with combined power can lift heavy weights.

FIG. 1D shows a special Aerial Solar Agricultural Irrigation Apparatus nozzle that has many water outlets. And FIG. 1E shows a plurality of water pipe nozzles with multiple outlets controlled by programmable computer controller to create balanced and ecological environmentally safe water saving irrigation.

FIG. 1F Shows the Aerial Solar Agricultural Irrigation Apparatus Pivot Water Tank. And further FIG. 1G shows how the apparatus utilizes Batteries for storage and gets electricity from Generators and Solar Panels. And still further FIG. 1H shows that water pumps are used to maintain pressures in the system which create lift and helps the Drones do their job. And it further shows that the Water Supply can come from Well and/or Atmospheric Water Generation apparatus. In FIG. 1I of the Aerial Solar Agricultural Irrigation Apparatus we see that electricity generation comes also from a non moving part Solar and magnetic Field Array Electricity Generation Apparatus. And in FIG. 1J we see where a Water sensing water filtration and nutrient replacement computer programmable controlled apparatus is used and implemented to maintain overall quality of hydration during irrigation of crops. In FIG. 2A we see where the Aerial Solar Agricultural Irrigation Apparatus Drones have electricity transferal and receiving Apparatus that can Receive wireless electricity Transferal utilizing infrared electricity transmission to each drone, if the Solar, and storage battery systems are damaged in case of emergencies. And still further in FIG. 2B we see where the Aerial Solar Agricultural Irrigation Apparatus can rotate both ways on top of the center pivot water tower. And further in FIG. 2C we see where the Aerial Solar Agricultural Irrigation Apparatus Drones have electricity systems that override the batteries which are only used in emergency situations. Each drone has wireless command and control, and has a backup wired power system all along the flexible irrigation tubing. And in FIG. 3A we see where the Aerial Solar Agricultural Irrigation Apparatus is extended to full length and can irrigate 14 acres per solar Irrigation apparatus and mechanism. And in FIG. 3B we see where the where the Aerial Solar Agricultural Irrigation Apparatus unlike rigid Center Pivot Irrigation Lines The Presented Apparatus here can Shorten or Extend Irrigation Lines controlled by the Programmable Computer Controller, and wireless or wired communication with Irrigation Drone mechanisms and apparatus. And still further in FIG. 3C we see where the where the Aerial Solar Agricultural Irrigation Apparatus here can Shorten or Extend Irrigation Lines in different patterns like this shown below for whatever irrigation purposes are necessary managed by Programmable Computer controller Apparatus. In FIG. 4A we see where the where the Aerial Solar Agricultural Irrigation Apparatus is powered By Solar Panel Array during the Daytime, and Flow Battery Storage Apparatus, Combined with Flywheel Apparatus and Non Moving Part Solar and Magnetic Field Array Electricity Generation Apparatus at Night for Uninterrupted Irrigation Management. And we see the main water storage tank in FIG. 4B powered by a plurality of Solar Panels FIG. 4C. And still further FIG. 4D shows where the where the Aerial Solar Agricultural Irrigation Apparatus gets additional electricity from the Non Moving Part Solar and Magnetic Field Array MFA Electricity Generation Apparatus FIG. 4E and FIG. 4F.

In FIG. 5A shows where the where the Aerial Solar Agricultural Irrigation Apparatus has a Full Area that Needs to be Irrigated.

FIG. 5B shows where the where the Aerial Solar Agricultural Irrigation Apparatus by using the Programmable Computer Controller can even irrigate small areas of crops that need more water than the other areas can be programmed to get extra or less water at any time.

FIG. 5C shows where the where the Aerial Solar Agricultural Irrigation Apparatus is better than center pivot systems that can only irrigate in circles with out adding expensive extensions. And FIG. 5D shows where the Aerial Solar Agricultural Irrigation Apparatus can even irrigate small areas.

FIG. 5E shows where there are Water Ground and Air Sensors components added to the Presented Apparatus that can detect Areas that need to be Irrigated and Using the Programmable Computer Controller can make adjustments in the frequency, amounts and duration of specific spatial point targeting of irrigation needs for the best crop yields.

FIG. 5F shows where the Aerial Solar Agricultural Irrigation Apparatus can water in precise squares and rectangles As the Computer controller can adjust the length of the watering hose lines Programmed by user.

FIG. 5G Prior Art shows Center Pivot Water Irrigation Systems Waste Water and are Not Programmable and Adjustable by Computer Controller.

FIG. 5H Prior Art shows Center Pivot Water Irrigation Systems only can water in circles with out expensive additions the presented invention here can water in precise squares and rectangles as the computer controller of the Aerial Solar Agricultural Irrigation Apparatus can adjust the length of the watering hose lines.

FIG. 6A shows a component of the Aerial Solar Agricultural Irrigation Apparatus Computer Drone Irrigation Programmable Controller also controls WSAD.

FIG. 6B Shows where the Water Sensing Analysis Drones (WSAD) are Used to Maintain Overall Irrigation of Crops in the invention.

FIG. 6C Shows where Infrared and Imaging Software is Used to Determine how wet Fields and Crops are at all times in the invention.

FIG. 6D Shows the component called the Computer Drone Irrigation Programmable Controller in the invention.

FIG. 6E shows where in the Invention Crops that need More Water or less are determined and all data from the Water Soil Sensor Drones is immediately sent back to the main Computer controller for use in the Irrigation in Real Time.

FIG. 6F shows as part of the invention components utilizing Water Sensing Analysis Drones Utilize Temperature sensing, moisture sensing, and gaseous analysis to determine best practices for specific crop needs.

FIG. 6G shows where the sensing drone component of the presented invention senses if the ground needs to be watered or not.

FIG. 6H shows a close up of the ground the way the sensing water drone component sees the ground as part of the invention. All working with the following functions, components, processes and applications;

a KWH Kilowatt Hour Bank current energy commodity price evaluator; a plurality of RFIDs; a spatial point identification; a human key biometric security data access manager; and a Solar irrigation Apparatus and Mechanism comprising; a plurality Electric Quadra Copter Drones; a plurality of irrigation water nozzle sprayers; a plurality of batteries; a plurality of solar panels; a plurality of water pumps; a plurality of Atmospheric Water Generation Apparatus; a plurality of Magnetic Field Array Electricity Generators; a plurality of Water Sensing Filtration and Nutrient Replacement Apparatus; a plurality of Programmable Computer Controllers; a plurality of Water Pipe Nozzles where output is controlled by Programmable Controller; a plurality of Water pipe Lifting Drones; a plurality of Adjustable Length of Irrigation Water Pipe Apparatus; a plurality of Water moisture Sensing and Nutrient Evaluation Drone apparatus; a human key administrative access manager. wherein the plurality of infrared or visible light transmission devices are a laser transmitter cluster apparatus and a photo voltaic receiver apparatus for sending electricity wireless from solar panels to battery storage and other visible and non visible spatial point targets for use and storage.

In FIG. 7 of the apparatus for splitting virtual currency mining payoff rewards with nonprofit, profit and poverty individuals through donations we show with these key components, steps and functions;

In FIG. 7A an ASIC mining apparatus processing shot 256 hashing problems to mine new Bitcoin's;

FIG. 7B we see where the ASIC minor discovers a valid block added to block chain and gets a payoff of a coin amount (X) which is the amount of the block chain reward programmed into the crypto coin Genesis block for reward to minors when they discover a block of crypto virtual currency coins;

In FIG. 7C we show where the (X) amount of awarded reward and pay off for discovering a block of the crypto coin is split into the (Y) amount of crypto virtual currency coins and the (Z) amount of crypto virtual currency coins;

FIG. 7C shows that the split amount of one direction is the miner digital virtual currency coin storage wallet for block reward and; Then FIG. 7D shows that the split amount of the other direction is the nonprofit donation pool fund digital virtual currency coin storage wallet for block reward, then as the process continues in the invention and apparatus presented here we see where;

In FIG. 7E we have five split offs of the crypto coin from the nonprofit donation pool fund digital virtual currency coin storage wallet for block reward, each of these five different split offs proceed to go to four different donation wallets;

As seen in FIG. 7F, and one poverty individual donation digital virtual currency coin storage wallet E, the last wallet the E wallet is used for donations to actual poverty individuals for their contribution of proof of work utilizing a mobile app by the invention apparatus and processes presented here this invention;

FIG. 7G shows the programmable logic controller PLC that continuously monitors the state of input devices and makes decisions based upon a custom program to continue to state of output devices, the biggest benefit in using a PLC apparatus is the ability to change and replicate the operation or process while collecting and communicating vital information, this programmable logic controller handles the distribution of divided and split crypto currencies and coin to different wallet addresses;

In FIG. 7H we see where the programmable logic controller and processes has delivered coins to wallets of individuals who are mining crypto currency coins, and;

In FIG. 7I we see where a large group of poverty recipients are having their coins delivered from the poverty individual donation digital virtual currency coin storage wallet E;

FIG. 7J and FIG. 7K shows the movement of crypto coin currency being moved into the appropriate wallets, and state where the more minors a virtual digital currency coins mine coins the more people in poverty and nonprofit foundations benefit from donations because of the invention, apparatus and process presented herein disclosed.

FIG. 8 shows Apparatus for Splitting Virtual Currency Mining Payoff Rewards with Non Profit, For Profit and Poverty Individuals Through Donations with these key components, steps and functions;

FIG. 8A of the presented invention, apparatus and process shows a different splitting of the block reward during the block peer-to-peer acceptance aspect of block chain virtual crypto currencies;

FIG. 8B shows where the minor discovers a valid block and gets the block added to the block chain after peer-to-peer approval and gets payoff of a certain amount of crypto virtual currency coins, it also shows where the apparatus and process utilizing the PLC apparatus divides the original block reward into two or a plurality amount of crypto coins and then in;

FIG. 8C and FIG. 8D deposits them into is to totally separate and totally separately owned crypto currency coin wallets one deposited in FIG. 8C which is the minors actual digital virtual currency coin storage wallet for block reward;

FIG. 8D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 8E we show five different additional wallets that take the FIG. 8D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 8F shows how the apparatus splits the mined crypto currency to the selected A, B, C, D, and E crypto wallets that were directed from the 8E-8D venture investment pool fund digital virtual currency coin storage wallet split from A, B, C, D, and E fair share split.

FIG. 9 shows Apparatus for Splitting Virtual Currency Mining Payoff Rewards with Non Profit and Poverty Individuals Through Donations with these key components, steps and functions;

FIG. 9A we see where teachers receive crypto coin currency that is useful in their wallets;

FIG. 9B show the same processes splitting the main block reward earned by miners into separate useful wallets for the purpose of creating funding sources for goodwill and to fund businesses and nonprofits;

FIG. 9C and FIG. 9D deposits them into is to totally separate and totally separately owned crypto currency coin wallets one deposited in FIG. 9C which is the miners actual digital virtual currency coin storage wallet for block reward;

FIG. 9D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 9E we show five different additional wallets that take the FIG. 9D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 9F shows how the apparatus splits the mined crypto currency to the selected A, B, C, D, and E crypto wallets that were directed from the 9E-9D venture investment pool fund digital virtual currency coin storage wallet split from A, B, C, D, and E fair share split.

FIG. 9G we see where poverty individuals or any individuals in the world receive crypto virtual Currency coins in their wallets for proof of work in taking pictures and submitting them to the system;

FIG. 9H we see people in poverty, people with mobile phones, or the general population being able to earn additional crypto currency coins from the fund wallet for making videos and uploading them to the system as proof of work.

FIG. 10 shows Apparatus for Splitting Virtual Currency Mining Payoff Rewards with Non Profit and Poverty Individuals Through Donations with these key components, steps and functions;

FIG. 10A where an artist can have a wallet connected to the system or a series of artists can be funded by payouts from the investment pool fund digital virtual currency coin storage wallet for block reward in the splitting of payments in the system between different wallets;

FIG. 10B we show the same apparatuses and processes as FIG. 7B and we have shown;

FIG. 10C and FIG. 10D deposits them into is to totally separate and totally separately owned crypto currency coin wallets one deposited in FIG. 10C which is the miners actual digital virtual currency coin storage wallet for block reward;

FIG. 10D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 10E we show five different additional wallets that take the FIG. 10D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 10F shows how the apparatus splits the mined crypto currency to the selected A, B, C, D, and E crypto wallets that were directed from the 10E-10D venture investment pool fund digital virtual currency coin storage wallet split from A, B, C, D, and E fair share split;

FIG. 10G we see where a woman from an unprivileged area, in poverty can use her computer, mobile phone to submit stories as proof of work to receive crypto virtual currency coins as payment for the proof of work. These crypto virtual currency coins can be traded on different exchanges for the needs to expand her health and prosperity in her life;

FIG. 10H we see a construction worker in undeveloped country having the ability to build things as a show of proof of work, and he can receive crypto virtual currency coins from the block rewards of minors in a split payment system where he can continue working and being paid from the pool fund digital virtual currency coin storage wallet for block reward wallet directly to his wallet after proof of work is demonstrated.

FIG. 11 shows Apparatus for Splitting Virtual Currency Mining Payoff Rewards with Non Profit and Poverty Individuals Through Donations with these key components, steps and functions;

FIG. 11B shows the same apparatuses and processes as FIG. 7B we have shown where FIG. 11A represents doctors and clinics in undeveloped countries who can provide stories, images, videos, and services that will warrant proof of work for having crypto virtual currency coins delivered instantly to the doctor or the clinics digital currency crypto wallet for use in their systems, business, and goodwill work they do that can be traded on the exchanges for different currencies for the uses, medicines, food, water, and FIG. 11C and FIG. 11D deposits them into is to totally separate and totally separately owned crypto currency coin wallets one deposited in FIG. 11C which is the miners actual digital virtual currency coin storage wallet for block reward;

FIG. 11D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 11E we show five different additional wallets that take the FIG. 11D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 11F shows how the apparatus splits the mined crypto currency to the selected A, B, C, D, and E crypto wallets that were directed from the 11E-11D venture investment pool fund digital virtual currency coin storage wallet split from A, B, C, D, and E fair share split;

FIG. 11G shows where money can be divided from the block rewards and mining crypto currency coins for use with educators, inventors, and innovators that need funding to keep going sent to their digital wallets for storage of crypto currency coins that they can use from exchanges at a later date, and additionally;

FIG. 11H shows where people to cook food for people in the Third World, undeveloped countries, and poverty areas can get benefits from digital currencies coins for their proof of work in cooking food and feeding people in need and in poverty around the world.

FIG. 12 shows Apparatus for Splitting Virtual Currency Mining Payoff Rewards with Non Profit Environment and Poverty Individuals Through Donations with these key components, steps and functions;

FIG. 12B shows the same apparatuses and processes as FIG. 7B where we have shown where;

FIG. 12A can have benefits from another split wallet split off from the venture investment pool fund digital virtual currency coin storage wallet for block reward or nonprofit digital wallet, or the water benefit wallet;

FIG. 12A, or the FIG. 12G environmental world wallet, or;

FIG. 12C and FIG. 12D deposits them into is to totally separate and totally separately owned crypto currency coin wallets one deposited in FIG. 12C which is the miners actual digital virtual currency coin storage wallet for block reward;

FIG. 12D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 12E we show five different additional wallets that take the FIG. 12D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 12F shows how the apparatus splits the mined crypto currency to the selected A,B,C,D, and E crypto wallets that were directed from the 12E-12D venture investment pool fund digital virtual currency coin storage wallet split from A,B,C,D, and E fair share split;

FIG. 12G environmental world wallet;

FIG. 12H the recycled solar energy fund wallet, or;

FIG. 12I showing the wallet where the crypto currency coins are being split off and sent to to be distributed among undeveloped countries peoples who are doing work in things like;

FIG. 12J building houses that are energy-efficient and inexpensive, and as well as;

FIG. 12K having wallets of crypto currencies coins being delivered into;

FIG. 12K wallet for use helping wildlife and environmental needs.

In FIG. 12A and FIG. 12B we show the same apparatuses and processes as FIG. 8B where we have shown where FIG. 12A can have benefits from another split wallet split off from the venture investment pool fund digital virtual currency coin storage wallet for block reward or nonprofit digital wallet, or the water benefit wallet FIG. 12A, or the FIG. 12G environmental world wallet, or FIG. 12H the recycled solar energy fund wallet, or FIG. 12I showing the wallet where the crypto currency coins are being split off and sent to be distributed among undeveloped countries peoples who are doing work in things like FIG. 12J building houses that are energy efficient and inexpensive, and as well as FIG. 12K having wallets of crypto currencies coins being delivered into FIG. 12K wallet for use helping wildlife and environmental needs.

FIGS. 7-12 shows the process in the apparatus related to a programmed ASIC chip with registration to banking in transactions for making decisions autonomously which is made up in the current invention with these core key components, steps and functions; in a plurality of controller devices which are comprising: a biometric security human key light encrypted apparatus; a GPS spatial point object identification apparatus; a wireless encryption identification apparatus; a CODEFA encryption apparatus with timestamp blockchain, a human sense identification apparatus; and a server node identification apparatus; a Programmable Computer Controller Apparatus programmed with a series of controls in industrial production processes controlling operations and actions of a machine or device; a series of controls in measurement or test processes controlling the status and response of a measuring or testing device; and also comprises a series of technical processing of information or data for exchange or management of information or data external to a computer; and further comprises improvements to a computer system's internal performance for increased system running speed by setting or adjusting configurations and parameters; that comprises a process where they can be autonomously modified by a computer decision processor agent that uses semantic and sensor policies and rules in making decisions; and comprises a communication apparatus comprising a transmitter and a receiver; and further comprises a communication apparatus comprising a transceiver and a processor configured to cause the transceiver to perform transmitting and receiving steps; and still further comprises a communication apparatus comprising a processor configured to perform or cause the apparatus to perform transmitting and receiving steps; and also comprises a communication apparatus comprising a memory and a processor configured to enable transmitting and receiving steps to be performed by executing computer program codes stored in the memory; with a communication apparatus comprising means for transmitting and receiving is used for the process where a block chain block reward is given for processing and discovering available blocks that are validated by a peer network in block chain mining by a miner; that is equal to a specified plurality of crypto currency coins awarded to the miner in block chain mining; after inclusion in the block chain and validation by the peers; and further comprising a process where an equal amount of crypto currency coins is awarded to a specific designated crypto currency coin wallet utilizing an autonomous decision engine for fair sharing of beneficiary results; and still further comprising a process where the designated crypto currency coin wallet is a pool funding wallet for use in donations, as funding for specific and specified non-profit and profit organizations. and further comprising; a process programmed into the block chain in the apparatus for; dividing a specified amount of awarded crypto coins for successfully mining a block that is accepted by the crypto currency coin network of computer nodes; and further depositing the specified amount of awarded crypto coins for successfully mining a block that is accepted by the crypto currency coin network of computer nodes into a designated pool fund wallet; for the purpose of advertising, promotion, and nonprofit and profit fund raising as part of the presented apparatus and processes. and further comprising; a process utilizing a plurality of emails, electronic books, social network advertising bots; for encouraging participation in worthy online activities where; for every vote; for every submission of ideas to a contest; for every contest recommendation; for every Advertisement; for every placement in social networks; where players will receive an Air Drop of substantial FREE crypto coins; for their proof of work demonstrated; and further comprising the matching of the winning prizes of a contest; and still further comprising the doubling or plurality of doubling the prize, with an equal or larger amount of crypto coins awarded by the apparatus; utilizing emails; electronic books; file sharing; advertising; aggregation apparatus; for the purpose of advertising, promotion, non profit and profit fund raising as part of the presented apparatus and processes; and further comprising; a plurality of email, electronic book processes for; raising funding through nonprofits and profit businesses; for the publishing of all the entries in a contest or think tank event involving ideas submitted by participants in a contest; producing an after the contest book, for distribution in helping humanity, animals, and the environment, and education; that further will give credit to each individual who participated in a the contest or think tank event in the book; for the purpose of advertising, promotion, and fund raising as part of the presented apparatus and processes; and further comprising; a process and application for people in poverty to upload and show proof of work; through a single or plurality of electronic computer devices; a single or plurality of mobile phone devices; through the people's work of telling stories; taking and sending pictures and videos; analyzing world ideas; giving their opinions on issues; creating ideas; creating solutions to problems; asking for advice; asking for help; asking for funding; submitting questions for others to answer; submitting helpful advice; for the purpose of earning crypto coins; and further for the purpose of exchanging crypto coins for useful things; and still further for the purpose of exchanging crypto coins for fiat currencies; and even still further for the purpose of advertising, promotion, and fund raising as an integral part of the presented apparatus and processes; and further comprising; providing the option for the splitting up of the mining block discovery rewards into a plurality of digital wallets; and also comprising the option of splitting up of mining block rewards transaction fees into a plurality of digital wallets. and further comprising; an electronic apparatus combined with a software timer apparatus for consolidating long hashing block chain into a shorter hashing length; and further comprising a storage area on peer network nodes for storing old block chain; and further comprising reducing difficulty rate of mining related to timer consolidation events; and still further comprising where a percentage of a business where a portion of their mining block reward was invested from the split fund goes directly to the crypto miner who received the original block reward; and further comprising; comprising a crypto currency that is created with an unknown limit for mining; and further where the open mining community does not know how many blocks can ever be mined; and further comprising where a virtual crypto coin can have an infinite amount of coins mined only limited by the resources available for mining; and still further comprising where the older mined virtual crypto currency coins mined have a much higher value than the newer mined coins; and further comprising where the block chain can be used to define the dates of each created block of coins for valuation in a game or financial system for; Trading; Buying Selling; Holding; Payoffs; Bartering; Tangible Evaluations such as; Fair Value; Fair Deal; Fair Share; Fair Price; Fair Placement; and still further comprising where a choice in positioning of the first block discovered in mining of virtual block chain crypto coins can be moved by the creator/founder/organization of the coin to a different position in the block chain ledger for the purpose of; Strengthening the game play; Changing the game play at specific intervals in time; Enhancing the life span and quality of the payment system in game play; Changing the Value of the payments systems infrastructure; at any time, or specified dates and times; all part of the presented apparatus and invention; and further comprising; using a Computer Object De-Encryption Encryption File Algorithm (CODEFA) mechanism server for validation and proof of ownership of crypto coins; and further comprising using a Human Key for validation and proof of ownership of Virtual Currency crypto block chain ledger coins; and further comprising; Mobile KWH Bank Battery Storage with block chain proof of ownership; and further comprising; Low Energy Wall Panel Apparatus connected to Wireless Electricity transferal with block chain proof of ownership; and further comprising a Wall Paneling Construction Smart Apparatus and System comprising; a stationary electrical access wall outlet panel apparatus; a plurality of low energy multiple color lasers; a plurality of solar photo voltaic cells; a plurality of solar concentrator apparatus; a plurality of graphene super capacitor apparatus; a plurality of organic battery storage units; a single or plurality of data storage devices; a plurality of USB, and USB Power Delivery energy connector apparatus; a plurality of USB communication ports; a plurality of electricity generator apparatus; a plurality of thermal electricity generating layers apparatus; a plurality of aqueous delivery apparatus; a plurality of cameras; a plurality of microphones; a plurality of speakers; a spatial point sound and light measurement controller apparatus; a wireless controller board; an LCD touchscreen display; a plurality of electricity converted to light transmitting apparatus; a plurality of light converted to electricity receiving apparatus; a plurality of graphene layered EMP protection apparatus; a Human Key USB processor port for identification of authorized users; a Human Key controller board; a main CPU controller board; an energy and battery controller board; a plurality of computer processors; a plurality of 3D Solar panel with light intensity tracking apparatus; a plurality of multi layered graphene solar cell apparatus; and further comprising; an apparatus and process for executing a series of instructions on a computer system, the method comprising; registering a user and property account in a computer system; creating and attaching human identification keys to the registered users account; creating and attaching object identification keys to the registered users property account; creating and attaching bank accounts to the registered users account; creating aggregated data, and media from stored databases, or real time life events utilizing a module; creating a website search software application either from tables on the server, from aggregated data or by the entry of a search item utilizing a module; creating a Fractional opportunity, utilizing a Fractional Request Module; providing taking a real or intangible property and dividing it into a plurality of pieces for the purpose of monetizing, creating liquidity, collaborating, sharing and making payments; providing the ability to create a divisible, divided second property from a real or intangible first property, for the purpose of creating liquidity, monetizing it, or creating greater value for the piece or pieces; providing the ability to create an assembled second property from real or intangible first property, or a plurality of first properties for the purpose of creating liquidity, monetizing it, or creating greater value for a piece or pieces; creating Publicity for created or re-purposed properties utilizing a Self Publishing Publicity module; sharing a Fractional opportunity with users in a network; creating a Fair Value utilizing an autonomous module; that calculates the amount of money that something is worth, the price or cost of something, in a fair way to all users; creating a Fair Share opportunity utilizing a module, that calculates a portion belonging to, due to, or contributed by an individual or group; creating a Fair Deal utilizing a module, that calculates how to give (something or an amount of something) to someone, to buy and sell as a business, and additionally to reach or try to reach a state of acceptance or reconciled agreement from users in a network about real tangible or intangible object transactions; creating a Fair Price utilizing a module, that calculates the amount of money that you pay for something or that something costs, and calculates the thing that is lost, damaged, or given up in order to get or do something, and additionally calculates the amount of money needed to persuade users in a network to do something, and additionally calculates the quantity of one thing that is exchanged or demanded in barter or sale for another thing, and additionally calculates the amount of money given or set as consideration for the sale of a specified thing all in a fair way to the users in the network; creating a Fair Placement utilizing a module, that calculates putting something in a particular place, and finding an appropriate place for someone to live, work, or learn, or placing an object, advertisement, or website in a strategic location for best possible results, in a fair way to users in a network; creating a Micro Share Request utilizing a module, that calculates small shares of things, objects, real or intangible properties and makes an offer for a user in a network, for a fraction of the original item; creating a Fractional Request utilizing a module, that calculates separating components of a transaction, real or intangible property, or object through differences, determined by using modules in the system to create potential and actual deals, suggestions, motivations, or incentive to play, and potential and actual transactions; creating requests utilizing a module asking for collaborations related to the dividing of properties in a network for the benefit of the individual users in a network; providing the ability to create a new property by transforming other properties utilizing modules; providing the ability to take an original property and transforming it into a new property utilizing a module; providing the ability to transform Fractional Objects divided pieces of real or intangible properties and original properties into a currency, or currencies utilizing a module; utilizing modules that work within software, a computer processor, or System on Chip integrated circuit, in a virtual world network, and/or non virtual network; and further comprising; providing a distributed block chain to independently verify the chain of ownership of any shared piece created from real or intangible properties transformed into a fraction of the original property; providing a distributed block chain live tracking to independently verify the transactions of buying, selling, trading, bartering, with fair value or market value amounts set of any shared piece created from real or intangible properties transformed into a fraction of the original property in the network system; providing a distributed block chain recording of any activities related to changing, transforming, altering valuations, or destruction of any shared piece created from real or intangible properties transformed into a fraction of the original property in a system network; providing a shared fractional payment platform, providing a digital semantic agent for creating; color band currencies from divided pieces; a rating attached to divided pieces; the conversion of pieces into currencies at time of registration; color band requests for participation; monetary values attached to requests at the time of dividing pieces; providing a negotiation digital semantic agent for autonomous negotiations on requested newly created properties.

FIG. 13 shows a pump generator energy storage apparatus and system presented here managed by a plurality of autonomous or manual computer controllers that can be programmed for energy creation and water conservation, and also shows egg shape Hydro electric generator for structuring water with graphene water filtration system, and electricity generation through fluid turbine piping system with these key components and functions:

FIG. 13A shows a lower egg shaped tank electricity generation apparatus component for the means of storing water that can be filled from a well or any other water source and can continually create electricity as it structures the fluid or water with the following steps;

FIG. 13A shows where water goes out to a lower area utilizing gravity to create additional force in a combined stepping, and pumping system and apparatus;

FIG. 13B shows a brush less water electricity generation device with fluid water Hydro turbine with the rotor turning inside of the pipe with an outside stater mounted over the magnetic Hydro water turbine with the positive and negative wire coming out of the AC generator going into the bridge rectifier for conversion to DC electricity which is part of the presented apparatus here;

FIG. 13C shows a booster pump that can pump water at any pressure controlled by the programmable computer controller in the presented apparatus here;

FIG. 13C shows the four fluid water turbines that the water has to pass through;

FIG. 13D shows where the water flow is moving upward from the egg shaped lower water tank and is pumped with pressure into for;

FIG. 13B shows brush less water electricity generation devices that have turbines that turn when water flows through them utilizing gravity before each electricity generation through the water turbine generators plus providing the added gravity force from the pump to push the water upward to the next pump, the apparatus produces exponentially more electricity as it goes up the tubing system and through the water turbine generators until it reaches the top of the upper tank;

FIG. 13E shows the upper egg shaped fluid water structuring and electricity generation tank with its input and output port at the top;

FIG. 13F shows where AC electricity generated by the power pump generator energy storage apparatus, hydro water fluid turbine generators is converted into DC electricity utilizing bridge rectifier with transformer and capacitor for smoothing the waveform; The presented apparatus can distribute AC electricity and also DC electricity; The bridge rectifier electronics located inside the programmable computer controller box with battery storage access;

The programmable computer controller box has three separate functions;
  liquid tank programmable computer controller and battery storage;
  a liquid pump programmable computer controller and battery storage;
  and a liquid turbine programmable computer controller battery storage plurality of apparatus, components, devices that work in the apparatus presented here in this invention;

FIG. 13F adding a transformer to be able to increase to higher voltages as part of the apparatus presented here;

FIG. 13G shows an on-off fluid water valve for redirecting water to drinking water, watering plants inside living structures, swimming pools, saunas, bathing, showers, and other useful freshwater uses;

FIG. 13H shows an on-off fluid water valve for redirecting water to the graphene filtration system tank for water filtration, reducing minerals, and then used for either freshwater source, or irrigation of agricultural fields and growing areas;

FIG. 13I shows multiple graphene filtration area inside storage tank;

FIG. 13J shows fluid or water being pumped for use inside facilities, homes, factory, business, private structure;

FIG. 13K shows fluid or water being pumped for use and agricultural fields, back to the aquifers, for growing plants, for pumping through piping in the ground to create cooling systems with the ground temperature between 40° F. and 50° F. all year round;

FIG. 13L shows a schematic utilizing the bridge rectifier in; FIG. 13M shows

FIG. 14 shows the pump generator energy storage apparatus with the programmable computer controllers, water storage tanks, water pumps, brush less water turbine electricity generators, and the flow of water with these key components, steps and functions;

FIG. 14A shows a liquid tank programmable computer controller with battery storage that controls the egg shaped lower water tank and receives electricity generated from the graphene anode and cathode liquid fluid flowing over the materials on the inside or outside of the pipes;

FIG. 14A also shows where the positive and negative wires going from the electricity generation piping system that are positive and negative DC wires;

FIG. 14B shows a brush less water turbine a liquid turbine generator apparatus that is a core component of the apparatus and system presented here, that fits in the piping system that goes from the egg shaped lower water tank to the egg shaped upper water tank and then from the egg shaped upper water tank to the egg shaped lower water tank along the way generating electricity with multiple water turbine electricity generation. The liquid turbine generator apparatus component comprises where the positive and negative electricity wiring and Stator is located outside of the wet water area of the pipe component for protection from water damage and the Rotor is made up of a fan blade connected to a magnetic rotor structure inside the water area of the pipe;

FIG. 14C shows the flow of the water from the bottom of the egg shaped upper water tank to the top of the lower tank;

FIG. 14D shows the liquid pump programmable computer controller with battery storage that controls the pressures of water flow through the liquid turbine generator apparatus, and that controls the egg shaped upper water tank and receives electricity generated from the graphene anode and cathode liquid fluid flowing over the materials on the inside or outside of the pipes;

FIG. 14E shows the egg shaped upper water tank used in the pump generator energy storage apparatus;

FIG. 14F shows the piping system that has a plurality of liquid turbine generator apparatus that water flows through and plurality of liquid pump apparatus for keeping the pressure of the water through the liquid turbine generator apparatus at an optimal level for electricity generation in the presented pump generator energy storage apparatus, the pipes where the liquid fluid actually flows through are made up of plain liquid fluid piping components, PVC, plastic, metal or graphene coated in a layered anode and cathode with separator electricity generation apparatus component in the apparatus presented through flowing liquid fluid in the pipes;

FIG. 14F also shows positive and negative DC wires going to the liquid pump programmable computer controller battery storage device;

FIG. 14G shows the brush less electric motor liquid pumping apparatus that uses low amounts of electricity 12 V DC to pump liquid water through all the piping systems of the presented apparatus invention that comprise the positive and negative electricity wiring outside of the wet water area of the component for protection from water damage;

FIG. 14H shows the liquid turbine generator apparatus which Is a core component of the pump generator energy storage apparatus that has a plurality of brush less motor liquid water turbine generators built into a pipe module that can be easily connected to pipes here defined as PVC pipes and non-toxic water drinking pipes that comprise the positive and negative electricity wiring outside of the wet water area of the component for protection from water damage;

FIG. 14I shows where the apparatus presented here is a liquid turbine for fluids programmable computer controller and battery storage device for managing electricity generated from the fluid liquid turbine generator apparatus is in the system and apparatus;

FIG. 14I also shows the battery systems inside the controller box for storing electricity from both the graphene anode cathode layered piping system, and liquid fluid turbine generator apparatus;

FIG. 14I also shows where the plurality of liquid turbine generator apparatus and devices have positive and negative DC current and voltage going into charging the batteries managed by a charge controlling system built into the liquid turbine computer controller battery storage device that is programmable;

FIG. 14J shows where the apparatus presented as a liquid tank programmable computer controller and battery storage apparatus and device with batteries as seen in the diagram and plus and minus wiring DC voltage coming from the graphene layered anode and cathode electricity generation piping system, the liquid tank programmable computer controllers use sensors to determine tank levels, pressures, temperatures, flow rates, weight and control functions for maintaining gravity fed functions in the apparatus presented here;

FIG. 14K shows where the flow from the egg shaped lower water tank goes to the top of the egg shaped upper water tank to fill the tank utilizing steps of gravity and low-voltage electronic pumping systems for producing the amount of electricity needed to move fluids from the bottom of the egg shaped lower water tank to the top of the upper tank, the egg shaped bottom water tank can be placed in the cooler underground area with temperatures of 40° F. to 50° F. in the egg shaped upper water tank can be placed above ground with temperature variations of −10° or lower to 100° F. or higher, this temperature range is very useful in generating electricity, heating, cooling, and controlling the flow rates throughout the apparatus presented here;

FIG. 14L shows the egg shaped bottom water tank is part of the pump generator energy storage apparatus that is pumping water utilizing gravity into the piping system first going downward then going upward due to gravity into the liquid pump apparatus device which didn't pumps the water downward again into a plurality of liquid turbine generator apparatus devices and then the water flows back into another pumping device at a higher level until it reaches the top of the egg shaped upper water tank, FIG. 3M for beginning the process utilizing gravity going back down into the lower pump;

FIG. 14L also shows plus and minus DC wiring for current and DC voltage that is generated in the graphene piping system with anodes and cathodes for electricity generation caused by the flowing of fluids over the surface of the anode and cathode to be stored and managed in the liquid turbine computer controller and battery storage unit FIG. 31;

FIG. 14M shows the egg shaped upper water tank that receives the water from the egg shaped lower water tank and also receives electricity from the graphene piping system device and apparatus that has anodes and electrodes and cathodes with separator that generates electricity as the fluids flow over the anodes and cathodes in the presented system and apparatus;

FIG. 14M also shows wires from the graphene piping system device presented in this invention going to the FIG. 15J liquid tank computer controller battery storage unit to transfer electricity for charging batteries and use outside of the system;

FIG. 14N shows the liquid turbine generator apparatus in the vertical position is demonstrated in the flow FIG. 14K of the fluids upward from the egg shaped lower water tank to the egg shaped upper water tank showing where the water or fluid is forced by gravity downward for forcing the fluid into the pumping system to force the water downward combined with gravity and every step to reduce the amount of electricity needed to pump water or fluid from a lower level to a higher level for the best economy in the apparatus presented here.

The invention also has multiple components, functions, steps and apparatus for the means of reducing electricity and water consumption, with generation components including:

a Plurality of Electricity On Off, Water Limiting, Block Chain Apparatus Switching Accessing a Programmable Block chain as an additional Security or Payment Apparatus; a hydro electric water generator apparatus and system managed by a plurality of autonomous decision engines or manual computer controllers comprising; a plurality of magnetic motor generator apparatus; a plurality of computer controlled and accessed thermal and pressure sensors; a water vortex creating and water structuring apparatus; a graphene filtration apparatus and system; a graphene water movement electricity generation apparatus and system; a water refill apparatus and system; a plurality of air and water pressure valves, moving material in a plurality of multiple directions and one way directions; a plurality of computer controlled deflector apparatus for controller material flow; a plurality of output irrigation ports out of the apparatus presented here connected to pipes with computer controlled pressure, temperature, and filtration apparatus; a plurality of input irrigation ports into the apparatus presented here connected to pipes with computer controlled pressure, temperature, and filtration apparatus; a plurality of input ground water and water tank ports into the apparatus presented here connected to pipes with computer controlled pressure, temperature, and filtration apparatus; a plurality of output ground water and water tank ports out of the apparatus presented here connected to pipes with computer controlled pressure, temperature, and filtration apparatus; an organic graphene battery storage apparatus and system; a plurality of Graphene anodes inside a piping system; a plurality of Magnesium cathodes inside a piping system; a programmable computer charging controller; a plurality of infrared receiver diodes on a mounting material; a plurality of infrared absorbing materials between layers of infrared receiver diodes on a mounting material; a plurality of programmable computer controlled temperature, voltage, current and watt sensors; a plurality of block chain security and pay apparatus; a plurality of electricity measuring sensors; a plurality of video cameras; connected to a plurality of programmable computer controller; a plurality of egg shaped water storage apparatus; a plurality of water structuring apparatus; a plurality of programmable computer controllers utilizing sensors for managing water flow, pressure, electricity generation and testing of structured water produced; a plurality of egg shaped water storage apparatus; a plurality of water structuring apparatus; a plurality of programmable computer controllers utilizing sensors for managing water flow, pressure, electricity generation and testing of structured water produced; a plurality of egg shaped water storage apparatus; a plurality of water structuring apparatus; a plurality of programmable computer controllers utilizing sensors for managing water flow, pressure, electricity generation and testing of structured water produced. all connected wired and wireless to programmable computer controllers;

a plurality of cells with varying conductivity apparatus; a plurality of cells with varying current collector apparatus; a plurality of organic electrodes and electrolyte; a parallel electric circuit that can be switched to a series circuit utilizing a controller autonomously or manually; an apparatus managed by a computer controller for switching on and off a plurality of individual cells; an apparatus managed by a computer controller for switching connections between a plurality of individual cells; a sensor apparatus managed by computer controller, utilizing voltage and current measurements autonomously or manually for determining cell levels, for replenishment of fresh electrolyte in the system; a plurality of gel and liquid electrolyte pumping apparatus and systems managed by a programmable computer controller; a plurality of programmable computer controllers; a plurality of frequency measuring oscilloscope sensors; a plurality of thermal sensors; a plurality of voltage and current sensors; a heating and cooling apparatus and electricity generation and storage system comprising; a plurality of air pumping components; a plurality of water pumping components; a rack mounting covering device; a plurality of manual and autonomous venting devices; a plurality of heat exchanger devices; a plurality of Peltier air and Seebeck effect devices; a plurality of graphene layers used for electricity generation; a plurality of heating and cooling graphene layers being cooled by lasers or heated by lasers; a plurality of piping systems cold and hot for generating electricity; a plurality of piping systems cold and hot for temperature control inside and outside of the apparatus; a plurality of above ground and below ground pumping systems; a plurality of hot and cold piping systems with graphene coatings inside for the electricity generation; a plurality of graphene and magnesium electrodes running on the inside of pipes; a plurality of graphene and magnesium cathodes and anodes embedded into pipes that transport fluids such as water; a plurality of sensors for monitoring temperature and electricity generation; a plurality of mirrors for heating areas and pipes; a programmable computer controller for control of all components; a plurality of infrared receiving LED component layers with infrared radiation absorbing materials layered between the component in the apparatus; a plurality of infrared receiving LED component modules embedded in above ground and below ground infrared receiving areas; a plurality of graphene filters for filtration of minerals and salt out of water in a water storage tank; a plurality of laser components for cooling pipes by passing light through the graphene; a plurality of airtight casing for multiple solar panels to be mounted back to back; a plurality of programmable computer controllers; a plurality of sensors connected wired or wireless to the programmable computer controllers; a block chain payment apparatus connected to all programmable computer controllers; a KWH measurement apparatus and controller connected to programmable computer controllers; a wireless electricity transferal apparatus; a Hybrid Apparatus and system for air heating and cooling with included additional electricity generation and structured water conditioning components with temperature controlled heating and cooling created from plurality of solar photo voltaic modules, above ground and underground piping system for water, and programmable computer controller utilizing data from sensing devices for managing the performance of the apparatus; an agricultural apparatus and system comprising; a lower rack connected to a solar photo voltaic panel mounting rack; and further comprising an in ground growing container apparatus and system; a plurality of multiple cell container apparatus for growing plants; a layering apparatus and system for decomposition of materials; a hydration piping apparatus and system connected to a micro controller for managing plant hydration; a plurality of square foot plant growing container apparatus; a covering apparatus and system for protecting and growing plants and implement weather; a manual and autonomous covering apparatus for localized and remote management applications; a plurality of programmable computer controllers; an in ground piping system connected to a programmable computer controller; a plurality of hydro temperature sensors; a plurality of water sensors; a plurality of graphene electricity generators; a plurality valves and pumping apparatus; a plurality of apparatus for managing hydration; temperature; and decomposition; manually; and autonomously; a plurality of mirror apparatus for concentrated and targeted to spatial point solar electricity generation; a plurality of reporting apparatus utilizing sensors; a plurality of programmable computer controllers for agriculture; a plurality of programmable computer controllers for electricity management; a plurality of programmable computer controllers for planting seed mechanisms; apparatus for increasing energy created from Photo Voltaic module in spatial point area, the apparatus comprising; a container for a plurality of Solar PV modules; a base container rack assembly; a plurality of parallel legs, each leg being connected at one end to the container and at the other end to the base to support the container for oscillating movement with respect to the base; a means for oscillating the container on the legs to move mirrors up and down; and left and right; and further comprising light and position sensors, and actuator controlled by integrated circuit for best, lighting transmission and receiving; and still further comprising a rack mounting apparatus and system comprising; a plurality of solar PV panels; a plurality of mirror reflectors; a plurality of programmable computer controllers; a plurality of actuator tracking mechanisms; a plurality of infrared laser sensor apparatus; a utility airspace below rack; a removable and semi removable cover for covering the airspace below the Solar PV rack mounting apparatus; an agricultural growing area; a solar controller; a hybrid organic battery; a micro inverter; an air transferal apparatus for moving water though the system; a heating and cooling apparatus; an alternative electricity generation apparatus; a water transferal apparatus for moving water though the system; a brush less motor micro inverter; a graphene cooling system; a plurality of movable mirrors controlled by a programmable computer controller; a plurality of water pumps controlled by a programmable computer controller; a plurality of Solar Panel Booster layers; a plurality of magnetic AC brush less motor generators; a Programmable Computer Controller Apparatus with Processes for Crypto Currency, Virtual Currency, and Block Chain Coin Mining with a Distribution of Tangible and Intangible Assets Mined apparatus for the sharing of percentages for autonomous distribution to beneficiaries for every transaction as related to a policy of rules to assist people in poverty, protecting animals, wildlife and the environment.

FIG. 15 shows Hydro Electric Structured Water Apparatus with these key components and functions;

FIG. 15A shows the one-way air pump at the top of the egg shaped fluid storage tank of the hydroelectric structured water electricity generator and water storage tank apparatus;

FIG. 15B shows the pump's system for pumping water from an aquifer, River, stream, Lake or other water source utilizing a water well, or piping system;

FIG. 15B also shows where the water is pumped into the egg shaped water tank of the presented invention;

FIG. 15C shows where groundwater from well can be pumped and redirected into the egg shaped water tank for storage or running the Hydro water turbine electrical generators while structuring the water the same time;

FIG. 15D shows the egg shaped water storage tank with the orange stators which are the stationary or rotating part of a rotary system, found in an electric generator where energy flows through a stator to or from the rotating component of the system, and the rotor Hydro turbine"s aspect of the three turbine generators that turn when water flows through the center of the egg storage tank rotating the water and structuring the water as it goes through the one-way valve out back into the tank;

FIG. 15E shows water flow inside the egg shaped water tank;

FIG. 15F shows water deflectors, a plate or other attachment for deflecting a flow of water to optimal points of the Rotor Hydro turbine for maximum currents creation to get maximum RPM of the Rotor Hydro turbine's;

FIG. 15G shows the outward movement of water for agricultural irrigation utilizing structured water which in scientific tests have shown to grow better stronger and healthier plants;

FIG. 15H shows the three Hydro turbine generators;

FIG. 15I shows where structured water is formed in a vortex where the water can store magnetic memory, water has been shown to get proper structuring through using a vortex, the air created by the vortex puts energy back into the water, and structured water grows stronger and better plants;

FIG. 15J shows a one-way valve that builds pressure in the egg shaped water storage tank aspect of the presented apparatus invention here, so that all water entering the bottom of the egg shaped tank moves strongly to the top of the egg shaped tank;

FIG. 15K shows a marked line showing the ground-level.

FIG. 15L shows that piping systems included in the presented apparatus invention have an other energy electricity generation apparatus involving graphene coated pipe with a separator on top of magnesium metal where when water flows over the two electrodes the anode and the cathode electricity is created and harvested by the graphene coated pipe electrical flow generator;

FIG. 15M shows another pipe that utilizes the graphene flow electrical generation piping system as a component in the presented apparatus invention here;

FIG. 15N shows also where the output piping systems utilize the graphene flow electrical generation piping system as a component in the presented apparatus and invention here.

FIG. 16 Describes structural aspects functions and processes of the Alternative Energy Booster Apparatus Switching System for the individual Shutoff of Cells, the Modifying Polarity and the Switching of Circuits from Parallel to Series Connection with these key components and functions;

FIG. 16A The function of a plurality of computer controlled switching devices in each cell that can Switch Between a plurality of Rechargeable Storage Devices Super capacitors, Ultra capacitors or batteries;

FIG. 16B The function of a plurality of computer controlled switching devices in each cell that can Switch to Series or Parallel connections of Cells;

FIG. 16C The function where each Switch has the apparatus wiring and logic of a computer controller that can change the Polarity+−Connection of Cell and Storage devices such as batteries to Series or Parallel connections;

FIG. 16D The function where each Switch can Switch Off or Override each cell in Connection and Storage devices such as batteries;

FIG. 16E The function where a programmable controller can utilize the DC Mechanical Switch, Electrode Dipper, and Electrolyte Pump in the apparatus;

FIG. 17 Shows diagrams of the Alternative Energy Booster Apparatus Switching System for Shutoff and Programmable Software Controlled Management of Electricity Generation, Use and Storage Apparatus with these key components, steps and functions;

FIG. 17B On Off Switching System for Shutoff and Programmable Software Controlled Management of Electricity Generation, Use and Storage Apparatus;

FIG. 17C programmable controller controls a plurality of these components in;

FIG. 17A-17F Programmable Controller; Direct D C Appliance Use; Direct AC Appliance Use;

FIG. 17E DC Electricity Storage Batteries, Super Capacitors, Ultra Capacitors; DC Electricity Generation Apparatus, Solar Panel, AC Grid Input/Output; Inverter;

FIG. 17G-17I where the Alternative Energy Booster Apparatus Controller is programmed to continuously check voltages and currents and directs, switches on and off for the purpose of adding electricity to any device that has a low voltage or current, for the best efficiency and use, additionally the controller also has a programmable function to change polarity, switch between electricity storage devices, and manage appliance apparatus FIG. 17H the Controller has programmable function for adding electricity from generator to the inverter when the grid, solar panels, or generators stop working due to clouds, night time or grid generation failure;

FIG. 17G the Controller also has a programmable function to be able to reroute appliances to available plurality of electricity generation apparatus and devices, and furthermore has programmable functions to recharge batteries, and redirect available electricity generation to and from the battery or other storage devices, and still further these conversion and switching functions;
DC to AC conversion; AC to DC conversion;
On/Off Switching Programmable Controller;
USB-C PDAware Wall Plate and appliance connectors;
Direct D C Appliance Use.
FIG. 18 Shows diagrams of the Alternative Energy Booster Apparatus and other DC Electricity Sources with the Plurality Layers Alternate Utility Grade Cell in Apparatus with these key components, steps and functions;
FIG. 18A Shows Cell Case Cover;
FIG. 18B Shows Graphene Layered Anode Electrode Connected to Anode Connector;
FIG. 18C Shows Anode Connector;
FIG. 18D Shows Graphene Layer Connected to Anode Connector;
FIG. 18E Shows Leaf Chlorophyll Cellulose Separator;
FIG. 18F Shows Graphene Layer Connected to Anode Connector;
FIG. 18G Shows Leaf Chlorophyll Cellulose Separator;
FIG. 18H Shows Graphene Layer Connected to Anode Connector;
FIG. 18I Shows Multiple Cathode Connector;
FIG. 18J Shows Multiple Cathodes Embedded and encased in timer acrylic polymer Coatings that work with or with out the Switching Dipping Apparatus which increases the voltage, current and the life of The cell in the apparatus;
FIG. 18K Shows Multiple cathodes Continually Dipped in and out of the Electrolyte For increased And current Output Up and Down path in and out of the electrolyte;
FIG. 18L Shows Electrolyte inside+Anode case where all of the components are submerged partly in electrolyte.
FIG. 19 Shows diagrams of the Alternative Energy Booster Apparatus and other DC Electricity Sources with the Mobile Phone Payment System Connected to mechanically and electronically Shutting off of Cells, Modifying Polarity and reducing energy output of the Solar Panel Boost Apparatus with these key components, steps and functions;
FIG. 19A Shows Mobile Phone Connected to the Internet;
FIG. 19B Shows Solar Panel (Alternative Energy) Boost Apparatus;
FIG. 19C Shows Mechanical Electrode Switching;
FIG. 19D Shows Electronic Electrode Switching;
FIG. 19E Shows Electronic controller;
FIG. 19F Shows Solar panel Electricity Generation;
FIG. 19G Shows Magnetic motor electricity generation;
FIG. 19H Shows Wireless Laser Electricity transferal;
FIG. 19I Shows Super Capacitor storage;
FIG. 19J Shows battery storage;
FIG. 19K Shows Mechanical Generators alternative energy apparatus components;
FIG. 19L Shows Wireless Electrical transferal apparatus;
FIG. 19M Shows switching apparatus used for payments;
FIG. 19N Shows dipping switching apparatus used in payments and the function where a programmable controller can utilize the DC Mechanical Switch, Electrode Dipper, and Electrolyte Pump in the apparatus to control payments;
FIG. 19O Shows infrared electricity generation apparatus, utilizing Anode cathode and graphene chlorophyll solution where the temperature increases generation with these key components, steps and functions;
an Alternative Energy Booster Apparatus; a plurality of graphene anode cathode capacitor electricity storage and transfer devices; a plurality of data storage devices; a plurality of light transmitting and data receiving devices; a plurality of near field electricity transmitters and receivers; a capacitor mobile battery pack with wireless and wired connector to provide connection to KWH bank ATM machine for deposit of electricity for instant payment transaction; a plurality of biodegradable electricity capacitor batteries; a plurality micro grid of mini sized batteries receiving electricity from solar wind server nodes; a smart solid state transformer electricity router; a plurality of electricity over flow "full" battery router devices; a high capacity main battery bank of capacitor batteries; a plurality of infrared battery electricity transfer devices; a plurality of controller devices for detection, and identification of electricity owner for electricity transmitting and receiving, with security, certification, tracking and KWH Bank integration; a plurality of devices for the purpose of determining highest intensity of energy target from the sun's position in space, and detecting wind patterns; a plurality of infrared or visible light transmission devices for transmitting light to a receiver for the purpose of transforming electricity to light and transmitting to a receiver that transforms light back into electricity; a plurality of infrared or visible light transmission devices for transmitting light to a receiver for the purpose of transforming data to light and transmitting to a receiver that transforms light back into data.
FIG. 20 shows Apparatus for Multiple Cell Electricity Generation with these key components, steps and functions;
FIG. 20A shows the negative cathode in a graphene gel electrolytic connected in a parallel configuration;
FIG. 20B shows the positive anode in a graphene gel electrolytic connected in a parallel configuration;
FIG. 20C shows the positive anode connected to the positive anode of the blue gel polymer cell connecting the graphene gel cell in parallel to the blue gel cell;
FIG. 20D shows the graphene gel cell connected in parallel to the blue gel polymer cell and finally connected to the chlorophyll gel cell;
FIG. 20E shows the blue gel polymer cell connected to the graphene gel cell and also connected to the chlorophyll gel cell in parallel configuration;
FIG. 20F shows the chlorophyll gel cell connected to the blue gel polymer cell and also connected to the graphene gel cell in a parallel connection as a component in the apparatus for multiple cell electricity generation apparatus invention presented here.
FIG. 21 shows Apparatus for Air Heating and Cooling with Electricity Generation between a plurality of Solar PV Modules in an above ground and below ground System with these key components, steps and functions;
FIG. 21A shows a programmable computer controller for controlling pumps, switches, sensors, pump flow rate, electricity storage, electricity generation, temperature, of all components in the present invention;

FIG. 21B shows a solar panel mirror system and apparatus that reflects the solar light to the surface of the tubing above ground along with so light directly hitting the piping system above ground in the presented apparatus;

FIG. 21C shows the sun and position in the sky as related to use in the presented invention.

FIG. 21D shows temperature sensors that are connected to the programmable computer controller above ground;

FIG. 21E shows above ground lines of pipes for heating cooling from the sun reflected objects and at nighttime cooling in the presented invention;

FIG. 21F shows where all pipes in the system can have a graphene coating inside or outside or in both inside and outside of the piping systems for electricity generation in the present invention. The diagram also shows where the sun and above ground temperatures heat the pipes above ground in the red tone pipe and where the underground pipes are cooled to 40° F. to 50° F. in the blue diagram of the underground pipe. The diagram also shows the graphene inside the pipe that is applied as an insert or as a thin layer coating of graphene anode since it's painted on to separator that is painted onto the cathode material inside the pipe;

FIG. 21G shows two pumps in the presented apparatus that can bring water from the cool ground for use above ground and at the same time bring water from the above ground surface warm area to other areas underground for use in heating and cooling of water for irrigation and agricultural purposes;

FIG. 21H shows the piping system stacked in a way in the presented apparatus where less space is needed for heating and cooling through the pipes;

FIG. 21I shows infrared Peltier effect plus Seebeck effect thermo electric electricity generation components placed between the hot and the cold below ground piping systems in the presented apparatus invention, in the apparatus presented here materials being used in the thermo electricity generation system are graphene and magnesium;

FIG. 21J shows the underground stacked piping system in the presented apparatus.

FIG. 21K shows two pumps in the presented apparatus that can bring water from the cool ground for use above ground and at the same time bring water from the above ground surface water warm area to other areas underground for use in heating and cooling of water for irrigation and agricultural purposes;

FIG. 21L shows the ground-level line to demonstrate above ground and below ground.

FIG. 21M shows an enlarged area of the electricity generating water flowing pipe with anode and cathode added in graphene;

FIG. 21N shows the anode in the apparatus system and invention presented here.

FIG. 21O shows the cathode in the apparatus system and invention presented here;

FIG. 21P shows where the water flows over the anode and cathode that is painted on the surface creating electrons that flow through the anode and cathode material for harvesting for use in the apparatus, or stored in batteries, or use outside of the apparatus.

FIG. 22 shows the presented invention apparatus for air heating and cooling with electricity generation between a plurality of solar photo voltaic modules in an above ground and below ground system;

FIG. 22A describes a storage tank for hot air pumped out of the middle of solar panels mounted back-to-back for creating hot air needed for electricity generation are to warm agriculture or systems in the presented invention;

FIG. 22B shows a pumping device to pump air out of the solar panels mounted back-to-back for cooling the solar panels to get higher electricity generation and to protect the solar panels from extreme heat;

FIG. 22C shows mirrors projecting light from the sun reflecting light onto the back panel of the back to back solar panel photo voltaic modules so that the back panel can have light to generate electricity and light to grow agriculture below the back solar panel and bounding array;

FIG. 22D shows a sensing device use to measure temperatures and amount of light in specific spatial points on the back solar panel for the purpose of management by programmable computer controller;

FIG. 22E shows the front solar panel of the back to back mounted solar panels in a sealed case with the back solar panel for managing heating and cooling systems in the presented invention;

FIG. 22F shows another sensor for thermal and light sensitivity mounted in a Spatial point area for sensing measurements sent back to the programmable computer controller;

FIG. 22G shows the sun reflecting on this surface of the front solar panel and reflecting on the mirror that reflects light to the back solar panel;

FIG. 22H shows another sensor mounted a spatial point for measurements sent back to the programmable computer controller;

FIG. 22I shows a mounting rack bar that controls the tilt of the back to back solar panel in a case system aspect of the presented invention;

FIG. 22J shows another sensor ascends thermal and light information and light sensitivity data to a programmable computer controller for positioning of the mirrors for the best optimum light and thermal management along with the programmable computer controller that controls pumps in storage of water in the system;

FIG. 22K shows input port for air from the outside that goes between the two back to back solar panels heating the air that is removed by FIG. 2B pump into container FIG. 59A for processing and use in the system controlled by a programmable computer controller;

FIG. 22L shows a storage tank for filtered water from groundwater aquifers that can be piped into a holding tank for being heated or cooled to be delivered through FIG. 59S irrigation system to crops and plants and agricultural aspect of the presented invention;

FIG. 22M shows the programmable computer controller that controls data coming from sensors related to thermal lighting temperatures and the identification of materials. The programmable computer controller also measures pump flow rates of all pumps, tank measurements of capacity and of air and water, and lasers angles on graphene pipes and sheets for cooling in heating at specific points in the presented invention. The computer controller also is programmed to control the tilts of back to back solar panels, and mirrors up and down left and right and skewed. The purpose for these movements is to produce more electricity, depending upon the angle of the sun and for cooling in heating the below ground agricultural systems;

FIG. 22N shows the pipe attached to the tank storing the filtered water for use and agricultural irrigation drinking water and heating cooling in the system;

FIG. 22O shows the output pipe for filtered water to be used in the system and outside the system;

FIG. 22P shows the bottom of the tank were groundwater from aquifers is stored with graphene filtration system built-in for filtered groundwater for use in humanitarian needs and by the system;

FIG. 22Q shows a pipe coming from a well being pumped from an aquifer for use in the system;

FIG. 22R shows where water from the ground in aquifers can be pumped into a series of metal pipes or other high thermal transfer piping systems for cooling water underground to 40° F. to 50° F. for cooling in the system;

FIG. 22S shows a graphene sheet for cooling and electricity generation converting light to energy and converting light to temperatures utilizing angles of laser input to the surface of the graphene;

FIG. 22T shows a plurality of low energy lasers controlled by the programmable computer controller for temperature adjustments and electricity generation in the presented invention;

FIG. 22U shows a storage tank for water that receives water from the ground filtered and unfiltered and that also sends water to agriculture in an irrigation system and that also heats and cools water from air transported to it from the back to back solar panels air heating and cooling apparatus in the presented invention;

FIG. 22V shows coils and stacks piping for water flow below the ground surface for the purpose of cooling water for use in air-conditioning and heating systems in refrigeration systems for agriculture or just general cooling in the system in the present invention.

FIG. 23 shows Apparatus for a Hugelkultur growing bed, below a plurality of Solar panels with square foot agricultural, drip irrigation growing cells with these key components, steps and functions;

FIG. 23 The purpose of the upper mirrors is to reflect light onto the plants as solar panel farms have issues with light not reaching the ground underneath the solar panels. Reflected light from the upper mirrors apparatus can also be reflected back into the backside solar panels in a dual back to back solar panel apparatus configuration. These upper mirrors systems can be track-able and movable mechanisms to always reflect the greatest amount of light for use in the apparatus and invention presented here;

FIG. 23A shows the upper mirrors apparatus that are mounted on the side of the solar panel mounting system so as not to block the racking system aligned behind the racking system and apparatus shown in;

FIG. 23B shows the lower mirrors apparatus that are mounted on the side of the solar panel mounting system so as not to block the racking system aligned behind the racking system and apparatus shown in FIG. 23. The purpose of the lower mirrors is to reflect light into the solar panels that have the back to back solar panels mounted in a dual apparatus configuration lower mirrors systems can be track-able and movable mechanisms to always reflect the greatest amount of light for use in the apparatus and invention presented here;

FIG. 23C shows apparatus for a Hugelkultur growing bed below a plurality of solar panels with square foot agricultural drip irrigation growing cells FIG. 23C shows the open racking system where agricultural workers can work under the solar panels. The racking system supports a plurality of solar panels and can be covered all sides in the winter for all year around growing;

FIG. 23D shows the abundance of growing plants in the large surface, and ground space below the solar panels. FIG. 23D also shows the figure of a man to show the perspective of the height of the racking system for easy access to the growing areas by agricultural workers;

FIG. 23E shows the lower mirrors apparatus that are mounted on the side of the solar panel mounting system so as not to block the racking system aligned behind the racking system and apparatus shown in this FIG. 23. The purpose of the lower mirrors is to reflect light into the solar panels that have the back to back solar panels mounted in an apparatus configuration lower mirrors systems can be track-able and movable mechanisms to always reflect the greatest amount of light for use in the apparatus and invention presented here;

FIG. 23F shows the upper mirrors apparatus that are mounted on the side of the solar panel mounting system so as not to block the racking system aligned behind the racking system and apparatus shown in this FIG. 23. The purpose of the upper mirrors is to reflect light onto the plants as solar panel farms have issues with light not reaching the ground underneath the solar panels. Reflected light from the upper mirrors apparatus can also be reflected back into the backside solar panels in a dual back to back solar panel apparatus configuration. These upper mirrors systems can be track-able and movable mechanisms to always reflect the greatest amount of light for use in the apparatus and invention presented here.

FIG. 24 shows the Liquid Electrode Frequency Energy Generator where additional electricity can be generated efficiently combining the Solar Panel Booster apparatus, with liquid electrode flow battery systems for sustainability in undeveloped places, for people in Poverty, while protecting the animals, Wildlife and the environment.

FIG. 24A shows the positive+Liquid Electrode for pumping into the frequency generator unit.

FIG. 24B shows the negative−Liquid Electrode for pumping in to the counter rotating part of the frequency generator unit there by freeing electrons to flow through the system.

FIG. 24C shows the opposite north polar rotating electrode fluids generating free electrons.

FIG. 24D shows the opposite south polar rotating electrode fluids generating free electrons.

FIG. 24E shows the solar panel receiver unit for transferring communication and electricity to the unit.

FIG. 24F shows the center hollow magnetic generation unit with a solar panel mounted to the casing.

FIG. 24G shows the Solar panels powering the Apparatus through the Solar panel booster unit.

FIG. 24H shows the Solar Panel Boost unit.

FIG. 24I shows the Signal Generator unit.

FIG. 24J shows the Programmable Computer Controller.

FIG. 24K shows the Laser Switching Transmitter.

FIG. 24L shows the Programmable Computer controller for managing the transactions and autonomous fair share beneficiary block chain crypto payment system to people, and people in poverty, along with protecting Animals, Wildlife, and the environment.

FIG. 24M shows the Block Chain Payment Ledger Poverty Beneficiary Apparatus.

FIG. 24N shows the electron Permeable Separator for electrons to flow between the electrodes. FIG. 24O shows the Flow Battery Storage apparatus with liquid+−electrodes.

FIG. 24P shows the electricity used for lighting, needed cooking and atmospheric water generation.

The invention also utilizes a plurality of devices for the purpose of determining highest intensity of energy target from the sun's position in space, and detecting wind patterns includes: an intensity of light sensor; a light sensor; a wind sensor; a light spatial point intensity calculator; and a server node identification apparatus. further comprising: a mobile, hand held manager; and an "off the grid" integrated circuit security switch device for hardware mobile phone and hand held integration for switching from grid services to off grid services. further comprising a plurality battery storage transmission and receiving apparatus consisting of: a capacitor battery pack with a plurality of capacitor cells; an infrared or other color bands light receiver; an infrared or other color bands light transmitter; a wifi radio transmitter; a wifi radio receiver; a plurality of cells made up of graphene gel electrolyte; a plurality of anodes made of graphene; and a plurality of diodes made of graphene. further comprising a plurality of solar concentrator system robotic mechanisms consisting of: a surface solar panel light intensity transparent grid cover with a plurality of spatial point mapped sensors; a surface solar panel thermal temperature transparent grid cover with a plurality of spatial point mapped sensors; a servo for left to right movement; a servo for up and down movement; a servo for retraction to storage of the solar concentrator; and a plurality of curved or flat mirrors for reflecting targeted solar concentration of light to spatial point targets on the surface of a solar panel, or PV Photo Voltaic Solar Collector; and further comprising an infrared or visible light laser diode distance evaluator device; an infrared or visible light laser diode energy transmitter; and an infrared or visible light laser diode energy receiver; a Solar Irrigation Apparatus and Mechanism laser transmitter and receiver, further comprising a plurality of wind turbines within the system consisting of; a plurality of robotic mechanisms for retraction and expansion; a plurality of generators; a magnetic revolution stabilizer; an electric motor stabilizer; a plurality of graphene photo voltaic smart wind turbine blades that generate electricity from light; a plurality of light sensors; and a plurality of wind speed sensors; further comprising a value decision mechanism as an integral part of the KWH Banking system consisting of; a request transmitter and receiver; a WiFi wireless transmitter and receiver; a data storage; a VOiP connection; a capacitor electricity storage evaluator; a solar and wind server network capacity for evaluation of nearest surplus energy, communication or data; a laser communicator; a laser energy transfer device; a near field energy transfer device; a human key security and identification device; and an electricity identification of owner, and routing transformer device. further comprising an KWH Bank energy management, storage, and transaction device for connecting to banking ATM machines, or as a standalone ATM machine as an integral part of the KWH Banking system, wherein the KWH Banking system is further comprised of; a plurality of spatial point corner mounting pole robotic devices that can adjust electronically up and down; a spatial point, wireless theft detection device; an electricity deposit storage device; an electricity deposit measurement device; an electricity deposit identification of owner device; an electricity deposit manager calculator for current KWH Hour electricity rates; an electricity deposit manager banking payment transaction system; a plurality of capacitor rapid charging and de-charging electricity storage unit devices; an electricity withdrawal manager and KWH banking payment device; an electricity withdrawal capacitor mobile battery device; an electricity withdrawal connector for vehicles, mobile batteries, and internal energy needs; an electricity deposit and withdrawal donation, investment, and loan device; and an electricity KWH Bank collaboration device for transactions with groups of buyer, and sellers; further comprising a modular installation kit as an integral part of the solar panel wind turbine communication server network apparatus for retrofitting already installed photo voltaic solar panels connecting to a Solar Irrigation Apparatus and Mechanism. wherein the modular installation kit is further comprised of: a plurality of specially designed brackets; a plurality of connectors, for evaluations of efficiencies of previously installed photo voltaic solar panels; a human key attachment of identity to integration of previously installed photo voltaic solar panels; a management device for calculating different areas of the surface of the solar panels efficiency device; and a transparent surface mountable sensor cover and sensor for temperature and light intensity evaluations. further comprising a graphene photo voltaic device as an integral part of the solar panel wind turbine communication server network, consisting of: a graphene layer; a first polymer gel electrolyte graphene layer; a second graphene layer synchronized with the first graphene layer; and a mirror for reflecting light back through the graphene array of layers for secondary photo electricity creation. further comprising a plurality of graphene photo voltaic devices as an integral part of the solar panel wind turbine communication server network connecting to a plurality of Solar Irrigation Apparatus and Mechanism. wherein the graphene photo voltaic devices as an integral part of the Solar Panel Wind Turbine Communication Server Network Apparatus are comprised of: a software development kit for devices integrated with system; a hardware device kit for developers of devices integrated with the system; and a human key attached to hardware device kit. further comprising a mobile version of the solar panel wind turbine communication server network apparatus. further comprising: a plurality of sensing devices aggregating data back to the main box; a synchronized hardware manager communicating with the main box; and a hardware digital semantic agent for making decisions with the main box; a Block Chain Connected Payment System and Apparatus.

The invention claimed is:

1. A solar panel wind turbine communication server network apparatus in
   combination with a computer server, comprising in combination with Solar Irrigation Apparatus and Mechanism as a means for reducing energy use, and conserving fresh water utilizing;
   an Alternative Energy Booster Apparatus as a means for increasing electricity;
   a plurality of graphene anode cathode capacitor electricity storage and transfer devices as a means for increasing the electricity generation and protecting the cathodes from corrosion;
   a plurality of data storage devices as a means for autonomous decision making;
   a plurality of light transmitting and data receiving devices as a means for communication and electricity transferal;
   a plurality of near field electricity transmitters and receivers as a means for sending and receiving electricity;

a capacitor mobile battery pack with wireless and wired connector to provide connection to KWH bank ATM machine for deposit of electricity as a means for instant payment transaction;

a plurality of biodegradable electricity capacitor batteries as a means for storage of electricity;

a plurality micro grid of mini sized batteries receiving electricity from solar wind server nodes as a means for storage of electricity;

a smart solid state transformer electricity router as a means for sending and receiving electricity;

a plurality of electricity over flow "full" battery router devices as a means for storage of electricity;

a high capacity main battery bank of capacitor batteries as a means for rapid storage of electricity;

a plurality of infrared battery electricity transfer devices as a means for sending and receiving electricity;

a plurality of controller devices for detection, and identification of electricity owner for electricity transmitting and receiving, with security, certification, tracking and KWH Bank integration as a means for sending and receiving electricity and making and receiving payments;

a plurality of devices for the purpose of determining highest intensity of energy target from the sun's position in space, and detecting wind patterns as a means for generating maximum electricity;

a plurality of infrared or visible light transmission devices for transmitting light to a receiver as for a means for the purpose of transforming electricity to light and transmitting to a receiver that transforms transforms light back into electricity as a means for sending and receiving electricity;

a plurality of infrared or visible light transmission devices for transmitting light to a receiver as a means for the purpose of transforming data to light and transmitting to a receiver that transforms light back into data as a means for sending and receiving electricity;

a KWH Kilowatt Hour Bank current energy commodity price evaluator as a means for sending and receiving electricity and making, receiving and storing payments securely;

a plurality of RFIDs as a means for tracking electrical banking components;

a spatial point identification as a means for positioning, tracking, and certifying the sending and receiving electricity and making and receiving payments;

a human key data access manager as a means for identifying the rightful owner; and a Solar Irrigation Apparatus and Mechanism comprising;

a plurality Electric Quadra Copter Drones as means for lifting objects to spatial point targets;

a plurality of irrigation water nozzle sprayers as a means for spreading water over surfaces;

a Solar Irrigation Apparatus and Mechanism comprising;

a plurality of batteries as means for electricity storage and backup electricity;

a plurality of solar panels as a means for generation of electricity;

a plurality of water pumps as a means for increasing pressure in irrigation and increasing generation of electricity;

a plurality of Atmospheric Water Generation Apparatus as means for generating additional water in arid areas, and as means for generating cooling;

a plurality of Magnetic Field Array Electricity Generators as a means for generating electricity;

a plurality of Water Sensing Filtration and Nutrient Replacement Apparatus as a means for improving the nutritional value of water for the purpose of better crop yields and fresh water needs:

a plurality of Programmable Computer Controllers as means for autonomous management a plurality of Water Pipe Nozzles where output is controlled by Programmable Controller as means for controlling pressure and dispersal of water over and at the base of crops;

a plurality of Water pipe Lifting Drones as means for transporting irrigation to crops;

a plurality of Adjustable Length of Irrigation Water Pipe Apparatus as means for transporting irrigation to crops;

a plurality of Water moisture Sensing and Nutrient Evaluation Drone apparatus as a means for measuring and conserving water;

a human key administrative access manager as means for identifying the rightful owner of electricity, water, and other assets in the apparatus.

2. The apparatus of claim 1, wherein a plurality of controller devices are comprising: a human key light encrypted apparatus as means for identifying rightful owners;

a spatial point object identification apparatus as means for identifying objects for decision making;

a wireless encryption identification apparatus as a means for security and communications in the system;

a CODEFA encryption apparatus with timestamp blockchain as a means for creating security in the apparatus;

a human sense identification apparatus as a means for aggregating data for autonomous decision making in the apparatus; and a server node identification apparatus as a means for identifying individual server locations and rightful owners;

a Programmable Computer Controller Apparatus programmed with a series of controls in industrial production processes as a means for controlling operations and actions of a machine or device;

or device;

a series of controls in measurement or test processes as a means for controlling the status and response of a response of a measuring or testing device;

and also comprises a series of technical processing of information or data for exchange or management of information or data external to a computer as means for use of data in the apparatus in making decisions;

and further comprises for the means of creating improvements to a computer system's internal-performance for increased system running speed by setting or adjusting configurations and parameters;

that comprises a process where they can be autonomously modified by a computer decision processor agent that uses semantic and sensor policies and as a means for processing rules in making decisions;

and comprises a communication apparatus comprising a transmitter and a receiver;

and further comprises a communication apparatus comprising a transceiver and a processor configured to cause the transceiver to perform transmitting and receiving steps;

and still further comprises a communication apparatus comprising a processor configured to perform or cause the apparatus to perform transmitting and receiving steps;
and also comprises a communication apparatus comprising a memory and a processor configured to enable transmitting and receiving steps to be performed by executing computer program codes stored in the memory;
with a communication apparatus comprising a means for transmitting and receiving data which is used for is used for the process where a block chain block reward is given for processing and discovering available discovering available blocks that are validated by a peer network in block chain mining by a-miner;
that is equal to a specified plurality of crypto currency coins awarded to the miner in block chain mining as a means for incentives in the apparatus and system;
after inclusion in the block chain and validation by the peers;
and further comprising a process where an equal amount of crypto currency coins is awarded to a specific designated crypto currency coin wallet utilizing an autonomous decision engine for fair sharing of beneficiary results as a means for incentives in the apparatus and system;
and still further comprising a process where the designated crypto currency coin wallet is a pool funding wallet for use in donations, as funding for specific and specified non-profit and profit organizations as a means for incentives in the apparatus and system;
and further comprising;
a process programmed into the block chain in the apparatus for;
dividing a specified amount of awarded crypto coins for successfully mining a block that is accepted by the crypto currency coin network of computer nodes as a means for incentives, security and stabilizing valuations in the apparatus and system;
and further depositing the specified amount of awarded crypto coins for successfully mining a block that is accepted by the crypto currency coin network of computer nodes into a designated pool fund wallet as a means for incentives, security and stabilizing valuations;
for the purpose of advertising, promotion, and nonprofit and profit fund raising as part of the presented apparatus and processes as a means for incentives, security and stabilizing valuations;
and further comprising;
a process utilizing a plurality of emails, electronic books, social network advertising bots;
for encouraging participation in worthy online activities where;
for every vote;
for every submission of ideas to a contest;
for every contest recommendation;
for every Advertisement;
for every placement in social networks;
where players will receive an Air Drop of a plurality of FREE crypto coins;
for their proof of work demonstrated as a means for incentives, security and stabilizing valuations;
and further comprising the matching of the winning prizes of a contest;
and still further comprising the doubling or plurality of doubling the prize, with an equal or larger amount of crypto coins awarded by the apparatus as a means for incentives, security and stabilizing valuations;
utilizing emails;
electronic books;
file sharing;
advertising;
aggregation apparatus;
for the purpose of advertising, promotion, non profit and profit fund raising as part of the part of the presented apparatus and processes;
and further comprising;
a plurality of email, electronic book processes for; raising funding through raising funding through nonprofits and profit businesses;
for the publishing of all the entries in a contest or think tank event involving ideas submitted by participants in a contest;
producing an after the contest book, for distribution in helping humanity, animals, and the environment, and education;
environment, and education;
that further will give credit to each individual who participated in a the contest or think tank event in the book;
for the purpose of advertising, promotion, and fund raising as part of the presented apparatus and processes;
processes;
and further comprising;
a process and application for people in poverty to upload and show proof of work;
through a single or plurality of electronic computer devices;
a single or plurality of mobile phone devices;
through the people's work of;
telling stories;
taking and sending pictures and videos;
analyzing world ideas;
giving their opinions on issues; creating ideas;
creating solutions to problems; asking for advice;
asking for help; asking for funding;
submitting questions for others to answer; submitting helpful advice;
for the purpose of earning crypto coins;
and further for the purpose of exchanging crypto coins for tangible and intangible property;
and still further for the purpose of exchanging crypto coins for fiat currencies as a means for incentives, security and stabilizing valuations;
and even still further for the purpose of advertising, promotion, and fund raising as an integral part of the presented apparatus and processes;
and further comprising;
providing the option for the splitting up of the mining block discovery rewards into a plurality of into a plurality of digital wallets;
and also comprising the option of splitting up of mining block rewards transaction fees into a into a plurality of digital wallets;
and further comprising;
an electronic apparatus combined with a software timer apparatus for consolidating long hashing block chain into a shorter hashing length as means for speeding up transactions and reducing electricity usage in the apparatus;
and further comprising a storage area on peer network nodes for storing old block chain as means for speeding up transactions and reducing electricity usage in the apparatus;

and further comprising reducing difficulty rate of mining related to timer consolidation events as means for speeding up transactions and reducing electricity usage in the apparatus;

and still further comprising where a percentage of a business where a portion of their mining block reward was invested from the split fund goes directly to the crypto miner who received the original block reward as means of incentive, security and valuation in the apparatus;

and further comprising;
  comprising a crypto currency that is created with an unknown limit for mining; and
  further where the open mining community does not know how many blocks can ever be mined as means of incentive, security and valuation in the apparatus; and further comprising where a virtual crypto coin can have an infinite amount of coins mined only limited by the resources available for mining as means of incentive, security and valuation in the apparatus;

and further comprising;
and still further comprising where the older mined virtual crypto currency coins mined have a and still further comprising where the older mined virtual crypto currency coins mined have a much higher valuation than the newer mined coins similar to antiquity valuations;
and further comprising where the block chain can be used to define the dates of each created block of coins for valuation in a game or financial system for as means of incentive, security and valuation in the apparatus;
Trading;
Tangible Evaluations that comprise the 5 following factor;
  Fair Value;
  Fair Deal;
  Fair Share;
  Fair Price;
  Fair Placement;
and still further comprising where a choice in positioning of the first block discovered in mining of virtual block chain crypto coins can be moved by the creator/founder/organization of the coin to a different position in the block chain ledger for the purpose as means of incentive, security and valuation in the apparatus;
Strengthening the game play as means of incentive, security and valuation in the apparatus;
Changing the game play at specific intervals in time as means of incentive, security and valuation in the apparatus;
Enhancing the life span and quality of the payment system in game play as means of incentive, security and valuation in the apparatus;
Changing the Value of the payments systems infrastructure as means of incentive, security and valuation in the apparatus;
at any time, or specified dates and times as means of incentive, security and valuation in the apparatus;
all part of the presented apparatus and invention;
and further comprising;
  using a Computer Object De-Encryption Encryption File Algorithm (CODEFA) mechanism server as a means for validation and proof of ownership of crypto coins;

and further comprising using a Human Key as a means for validation and proof of ownership of Virtual Currency crypto block chain ledger coins; and further comprising;
  Mobile KWH Bank Battery Storage with block chain as a means for proof of ownership;
and further comprising;
  Low Energy Wall Panel Apparatus connected to Wireless Electricity transferal with block chain proof of ownership as a means for lowering energy costs in the apparatus and system;
and further comprising a Wall Paneling Construction Smart Apparatus and System comprising;
  comprising; a stationary electrical access wall outlet panel apparatus;
a plurality of low energy multiple color lasers;
a plurality of solar photo voltaic cells;
a plurality of solar concentrator apparatus;
a plurality of graphene super capacitor apparatus;
a plurality of organic battery storage units;
a single or plurality of data storage devices;
a plurality of USB, and USB Power Delivery energy connector apparatus;
a plurality of USB communication ports as a means for data transferal in the apparatus;
a plurality of electricity generator apparatus;
a plurality of thermal electricity generating layers apparatus as a means for additional electricity generation;
a plurality of aqueous delivery apparatus as a means for fluid delivery to spatial point targets;
a plurality of cameras microphones;
a plurality of microphones;
a plurality of speakers;
a spatial point sound and light measurement controller apparatus;
a wireless controller board;
an LCD touchscreen display;
a plurality of electricity converted to light transmitting apparatus;
a plurality of light converted to electricity receiving apparatus;
a plurality of graphene layered EMP protection apparatus as a means for protecting the apparatus from EMP damages;
a Human Key USB processor port for identification of authorized users;
a Human Key controller board;
a main CPU controller board;
an energy and battery controller board; a plurality of computer processors;
a plurality of 3D Solar panel with light intensity tracking apparatus; a plurality of multi layered graphene solar cell apparatus;
and further comprising;
an apparatus and process for executing a series of instructions on a computer system, the the method comprising;
  registering a user and property account in a computer system;
  creating and attaching human identification keys to the registered users account;
  creating and attaching object identification keys to the registered users property account;
  creating and attaching bank accounts to the registered users account;
  creating aggregated data, and media from stored databases, or real time life events utilizing a module;

utilizing a module;
creating a website search software application either from tables on the server, from aggregated data or by the entry of a search item utilizing a module;
creating a Fractional opportunity, utilizing a Fractional Request Module;
providing taking a real or intangible property and dividing it into a plurality of pieces for the purpose of monetizing, creating liquidity, collaborating, sharing and making payments;
providing the ability to create a divisible, divided second property from a real or intangible first providing the ability to create a divisible, divided second property from a real or intangible first property, for the purpose of creating liquidity, monetizing it, or creating greater value for the piece or pieces;
providing the ability to create an assembled second property from real or intangible first property, or a plurality of first properties for the purpose of creating liquidity, monetizing it, or creating greater value for a piece or pieces;
creating Publicity for created or re-purposed properties utilizing a Self Publishing Publicity module;
sharing a Fractional opportunity with users in a network;
creating a Fair Value utilizing an autonomous module; that calculates the amount of money that something is worth, the price or cost of something, in a fair way to all users;
creating a Fair Share opportunity utilizing a module, that calculates a portion belonging to, due to, or contributed by an individual or group;
creating a Fair Deal utilizing a module, that calculates how to give (something or an amount of something) to someone, to buy and sell as a business, and additionally to reach or try to reach a state of acceptance or reconciled agreement from users in a network about real tangible or intangible object transactions;
creating a Fair Price utilizing a module, that calculates the amount of money that you pay for something or that something costs, and calculates the thing that is lost, damaged, or given up in order to get or do something, and additionally calculates the amount of money needed to persuade users in a network to do something, and additionally calculates the quantity of one thing that is exchanged or demanded in barter or sale for another thing, and additionally calculates the amount of money given or set as consideration for the sale of a specified thing all in a fair way to the users in the network;
creating a Fair Placement utilizing a module, that calculates putting something in a particular place, and finding an appropriate place for someone to live, work, or learn, or placing an object, advertisement, or website in a strategic location for best possible results, in a fair way to users in a network;
advertisement, or website in a strategic location for best possible results, in a fair way to users in a network;
creating a Micro Share Request utilizing a module, that calculates small shares of things, objects, objects, real or intangible properties and makes an offer for a user in a network, for a fraction of the original item;
creating a Fractional Request utilizing a module, that calculates separating components of a creating a Fractional Request utilizing a module, that calculates separating components of a transaction, real or intangible property, or object through differences, determined by using modules in the system to create potential and actual deals, suggestions, motivations, or incentive to play, and potential and actual transactions;
creating requests utilizing a module asking for collaborations related to the dividing of properties creating requests utilizing a module asking for collaborations related to the dividing of properties in a network for the benefit of the individual users in a network;
providing the ability to create a new property by transforming other properties utilizing modules;
providing the ability to take an original property and transforming it into a new property utilizing a module;
providing the ability to transform Fractional Objects divided pieces of real or intangible properties and original properties into a currency, or currencies utilizing a module;
utilizing modules that work within software, a computer processor, or System on Chip integrated circuit, in a virtual world network, and/or non virtual network;
and further comprising;
providing a distributed block chain to independently verify the chain of ownership of any shared piece created from real or intangible properties transformed into a fraction of the original property;
providing a distributed block chain live tracking to independently verify the transactions of buying, selling, trading, bartering, with fair value or market value amounts set of any shared piece created from real or intangible properties transformed into a fraction of the original property in the network system;
providing a distributed block chain recording of any activities related to changing, transforming, altering valuations, or destruction of any shared piece created from real or intangible properties transformed into a fraction of the original property in a system network;
providing a shared fractional payment platform;
providing a digital semantic agent for creating;
color band currencies from divided pieces;
a rating attached to divided pieces;
the conversion of pieces into currencies at time of registration;
color band requests for participation;
monetary values attached to requests at the time of dividing pieces;
providing a negotiation digital semantic agent for negotiations on requested newly created properties.

3. The apparatus of claim 1, wherein the plurality of infrared or visible light transmission devices are a laser transmitter cluster apparatus and a photo voltaic receiver apparatus for sending electricity wireless from solar panels to battery storage and other visible and non visible spatial point targets for use and storage.

4. The apparatus of claim 1, wherein the plurality of devices for the purpose of determining highest intensity of energy target from the sun's position in space, and detecting wind patterns includes:
an intensity of light sensor;
a light sensor;
a wind sensor, a light spatial point intensity calculator; and
and a server node identification apparatus.

5. The apparatus of claim 1, further comprising:
further comprising:
a mobile, hand held manager;
and an "off the grid" integrated circuit security switch device for hardware mobile phone and and hand held integration for switching from grid services to off grid services.

6. The apparatus of claim 1, further comprising a plurality battery storage transmission and receiving apparatus consisting of:
  transmission and receiving apparatus consisting of:
    a capacitor battery pack with a plurality of capacitor cells;
    an infrared or other color bands light receiver;
    an infrared or other color bands light transmitter;
    a wifi radio transmitter;
    a wifi radio receiver;
  a plurality of cells made up of graphene gel electrolyte; a plurality of anodes made of graphene:
    and a plurality of diodes made of graphene.

7. The apparatus of claim 1, further comprising a plurality of solar concentration system robotic mechanisms consisting of:
  a surface solar panel light intensity transparent grid cover with a plurality of spatial point mapped sensors as a means for generating maximum electricity;
  a surface solar panel thermal temperature transparent grid cover with a plurality of spatial point mapped sensors as a means for generating maximum electricity;
  a servo for left to right movement as a means for generating maximum electricity;
  a servo for up and down movement as a means for generating maximum electricity;
  a servo for retraction to storage of the solar concentrator as a means for generating maximum electricity; and
  a plurality of curved or flat mirrors for reflecting targeted solar concentration of light to spatial light to spatial point targets on the surface of a solar panel, or PV Photo Voltaic Solar Collector as a means for generating maximum electricity.

8. The apparatus of claim 7, further comprising
  an infrared or visible light laser diode distance evaluator device as a means for generating maximum electricity;
  an infrared or visible light laser diode energy transmitter as a means for generating maximum electricity; and
  an infrared or visible light laser diode energy receiver as a means for generating maximum electricity;
  a Solar Irrigation Apparatus and Mechanism laser transmitter and receiver as a means for generating maximum electricity.

9. The apparatus of claim 1, further comprising a plurality of wind turbines within the system consisting of;
  a plurality of robotic mechanisms for retraction and expansion;
  a plurality of generators as a means for generating maximum electricity; a magnetic revolution stabilizer;
  an electric motor stabilizer;
  a plurality of graphene photo voltaic smart wind turbine blades that generate electricity from light as a means for generating maximum electricity;
  a plurality of light sensors as a means for generating maximum electricity; and
  a plurality of wind speed sensors as a means for calculating the generating of maximum electricity.

10. The apparatus of claim 1, further comprising a value decision mechanism as an integral part of the KWH Banking system consisting of;
  a request transmitter and receiver;
  a WiFi wireless transmitter and receiver;
  a data storage;
  a VOIP connection;
  a capacitor electricity storage evaluator;
  a solar and wind server network capacity for evaluation of nearest surplus energy, communication or data;
  communication or data;
  a laser communicator;
  a laser energy transfer device;
  a near field energy transfer device;
    a human key security and identification device; and
  a human key security and identification device; and
  an electricity identification of owner, and routing transformer device.

11. The apparatus of claim 10, further comprising an KWH Bank energy management, storage, and transaction device for connecting to banking ATM machines, or as a standalone ATM machine as an integral part of the KWH Banking system as means for management and exchanging electricity as an asset.

12. The apparatus of claim 11, wherein the KWH Banking system is further comprised of;
  a plurality of spatial point corner mounting pole robotic devices that can adjust electronically up electronically up and down;
  a spatial point, wireless theft detection device;
  an electricity deposit storage device;
  an electricity deposit measurement device;
  an electricity deposit identification of owner device;
  an electricity deposit manager calculator for current KWH Hour electricity rates;
  an electricity deposit manager banking payment transaction system;
  a plurality of capacitor rapid charging and de-charging electricity storage unit devices;
  an electricity withdrawal manager and KWH banking payment device;
  an electricity withdrawal capacitor mobile battery device;
  an electricity withdrawal connector for vehicles, mobile batteries, and internal energy needs;
  an electricity deposit and withdrawal donation, investment, and loan device; and
  and an electricity KWH Bank collaboration device as a means for processing transactions with groups of buyer, and sellers in the apparatus and system.

13. The apparatus of claim 1, further comprising a modular installation kit as an integral part of the solar panel wind turbine communication server network apparatus for retrofitting already installed photo voltaic solar panels connecting to a Solar Irrigation Apparatus and Mechanism as a means to increase electricity and water distribution and generation in the apparatus and system.

14. The apparatus of claim 13, wherein the modular installation kit is further comprised of:
  a plurality of specially designed brackets;
  a plurality of connectors, for evaluations of efficiencies of previously installed photo voltaic solar panels;
  voltaic solar panels;
  a human key attachment of identity to integration of previously installed photo voltaic solar panels;
  a management device for calculating different areas of the surface of the solar panels efficiency device; and
  efficiency device; and
  a transparent surface mountable sensor cover and sensor for temperature and light intensity evaluations as a means for evaluating maintenance needed in the apparatus and system.

15. The apparatus of claim 1, further comprising a graphene photo voltaic device as an integral part of the solar panel wind turbine communication server network, consisting of:
  a graphene layer;
  a first polymer gel electrolyte graphene layer;

a second graphene layer synchronized with the first graphene layer; and
a mirror for reflecting light back through the graphene array of layers as a means for secondary photo electricity creation.

16. The apparatus of claim 15, further comprising a plurality of graphene photo voltaic devices as an integral part of the solar panel wind turbine communication server network connecting to a plurality of Solar Irrigation Apparatus and Mechanism as a means for powering the apparatus components in the system and apparatus.

17. The apparatus of claim 16, wherein the graphene photo voltaic devices as an integral part of the Solar Panel Wind Turbine Communication Server Network Apparatus are comprised of:
a software development kit for devices integrated with system;
a hardware device kit for developers of devices integrated with the system; and
a human key attached to hardware device kit as a means for promotions and collaborations with the apparatus and system.

18. The apparatus of claim 1, further comprising a mobile version of the solar panel wind turbine communication server network apparatus as means for mobile phone access to the apparatus for statistics and management of the apparatus and system.

19. The apparatus of claim 18, further comprising:
a plurality of sensing devices aggregating data back to the main box;
a synchronized hardware manager communicating with the main box; and
and a hardware digital semantic agent for making decisions with the main box;
a Block Chain Connected Payment System and Apparatus as a means for decisions on payments, transactions, and maintenance of the apparatus and system.

20. The apparatus of claim 1, further comprising:
a plurality of sensing devices aggregating data back to the main box;
a synchronized hardware manager communicating with the main box;
and a hardware digital semantic agent for making decisions with the main box, a Plurality of Electricity On Off, Water Limiting, Block Chain Apparatus Switching Accessing a Electricity On Off, Water Limiting, Block Chain Apparatus Switching Accessing a Programmable Block chain as an additional Security or Payment Apparatus;
a hydro electric water generator apparatus and system managed by a plurality of autonomous by a plurality of autonomous decision engines or manual computer controllers comprising; a plurality of magnetic motor
a plurality of magnetic motor generator apparatus;
a plurality of computer controlled and accessed thermal and pressure sensors;
a water vortex creating and water structuring apparatus as means for increasing crop yields,
conserving water, and increasing water flow in generating electricity and structuring water in the apparatus and system;
a graphene filtration apparatus and system as a means for desalination and reducing bacteria;
a graphene water movement electricity generation apparatus and system as a means for generating electricity;
a water refill apparatus and system;
a plurality of air and water pressure valves, moving material in a plurality of multiple directions and one way directions:
a plurality of computer controlled deflector apparatus for controller material flow;
a plurality of output input irrigation ports out of into the apparatus presented here connected to pipes with computer controlled pressure, temperature, and filtration apparatus;
a plurality of input irrigation ports into the apparatus presented here connected to pipes with connected to pipes with computer controlled pressure, temperature, and filtration apparatus;
a plurality of input output ground water and water tank ports into out of the apparatus presented here connected to pipes with computer controlled pressure, temperature, and filtration apparatus;
a plurality of output ground water and water tank ports out of the apparatus presented here connected to pipes with computer controlled pressure, temperature, and filtration apparatus;
apparatus;
an organic graphene battery storage apparatus and system;
a plurality of Graphene anodes inside a piping system as a means for increasing the electricity generation;
a plurality of Magnesium cathodes inside a piping system;
a programmable computer charging controller;
a plurality of infrared receiver diodes on a mounting material; a plurality of infrared absorbing
a plurality of infrared absorbing materials between layers of infrared receiver diodes on a mounting material;
a plurality of programmable computer controlled temperature, voltage, current and watt sensors;
a plurality of block chain security and pay apparatus;
a plurality of electricity measuring sensors;
a plurality of video cameras as a means for security and maintenance evaluation; connected to a plurality of programmable computer controller;
a plurality of egg shaped water storage apparatus; a plurality of water structuring apparatus;
a plurality of programmable computer controllers utilizing sensors for managing water flow, pressure, electricity generation and testing of structured water produced;
pressure, electricity generation and testing of structured water produced; a plurality of egg shaped water storage apparatus;
a plurality of water structuring apparatus;
a plurality of programmable computer controllers utilizing sensors for managing water flow, pressure, electricity generation and testing of structured water produced;
pressure, electricity generation and testing of structured water produced; a plurality of egg shaped water storage apparatus;
a plurality of water structuring apparatus;
a plurality of programmable computer controllers utilizing sensors for managing water flow, pressure, electricity generation and testing of structured water produced; all connected wired and wireless to programmable computer controllers;
a plurality of cells with varying conductivity apparatus as a means for generating electricity with reversing polarity;
a plurality of cells with varying current collector apparatus; a plurality of organic electrodes and electrolyte;

a parallel electric circuit that can be switched to a series circuit utilizing a controller autonomously or manually; autonomously or manually;

an apparatus managed by a computer controller for switching on and off a plurality of individual cells; cells;

an apparatus managed by a computer controller for switching connections between a plurality of individual cells;

individual cells;

a sensor apparatus managed by computer controller, utilizing voltage and current measurements autonomously or manually for determining cell levels, for replenishment of fresh electrolyte in the system;

a plurality of gel and liquid electrolyte pumping apparatus and systems managed by a programmable computer controller as a means to regenerate batteries in the apparatus and system;

a plurality of gel and liquid electrolyte pumping apparatus and systems managed by a programmable computer controller;

a plurality of programmable computer controllers;

a plurality of frequency measuring oscilloscope sensors as a means to generating electricity;

a plurality of thermal sensors;

a plurality of voltage and current sensors;

a heating and cooling apparatus and electricity generation and storage system comprising;

a plurality of air pumping components;

a plurality of water pumping components; a rack mounting covering device;

a plurality of manual and autonomous venting devices;

a plurality of heat ex-changer devices;

a plurality of Peltier air and Seebeck effect devices;

a plurality of graphene layers used for electricity generation;

a plurality of heating and cooling graphene layers being cooled by lasers or heated by lasers;

a plurality of piping systems cold and hot for generating electricity;

a plurality of piping systems cold and hot for temperature control inside and outside of the apparatus;

a plurality of above ground and below ground pumping systems;

a plurality of hot and cold piping systems with graphene coatings inside for the electricity generation;

a plurality of graphene and magnesium electrodes running on the inside of pipes;

a plurality of graphene and magnesium cathodes and anodes embedded into pipes that transport water and other electron carrying fluids;

a plurality of sensors for monitoring temperature and electricity generation;

a plurality of mirrors for heating areas and pipes as a means to generating crops and electricity a plurality of sensors for monitoring temperature and electricity generation;

in the same spatial point space;

a programmable computer controller for control of all components;

a plurality of infrared receiving LED component layers with infrared radiation absorbing materials layered between the component in the apparatus;

a plurality of infrared receiving LED component modules embedded in above ground and below ground infrared receiving areas as a means to generating crops and electricity in the same spatial point space;

a plurality of graphene filters for filtration of minerals and salt out of water in a water storage tank;

a plurality of laser components for cooling pipes by passing light through the graphene as a means of thermal control in the apparatus and system;

a plurality of airtight casing for multiple solar panels to be mounted back to back as a means to generating crops and electricity in the same spatial point space;

a plurality of programmable computer controllers;

a plurality of sensors connected wired or wireless to the programmable computer controllers;

a block chain payment apparatus connected to all programmable computer controllers;

a KWH measurement apparatus and controller connected to programmable computer controllers;

a wireless electricity transferal apparatus;

a Hybrid Apparatus and system for air heating and cooling with included additional electricity electricity generation and structured water conditioning components with temperature controlled heating and cooling created from plurality of solar photo voltaic modules, above ground and underground piping system for water, and programmable computer controller utilizing data from sensing devices for managing the performance of the apparatus as a means to generating crops and electricity in the same spatial point space;

an agricultural apparatus and system comprising;

a lower rack connected to a solar photo voltaic panel mounting rack;

and further comprising an in ground growing container apparatus and system; a plurality of a plurality of multiple cell container apparatus for growing plants;

a layering apparatus and system for decomposition of materials as a means to generating crops and electricity in the same spatial point space;

a hydration piping apparatus and system connected to a micro controller for managing plant hydration;

hydration;

a plurality of square foot plant growing container apparatus;

a covering apparatus and system for protecting and growing plants and inclement weather as a means to generating crops and electricity in the same spatial point space; a manual and autonomous covering apparatus for localized and remote management applications;

a plurality of programmable computer controllers;

an in ground piping system connected to a programmable computer controller; a plurality of hydro temperature sensors;

a plurality of water sensors;

a plurality of graphene electricity generators as a means to generating crops and electricity in the same spatial point space;

a plurality valves and pumping apparatus;

a plurality of apparatus for managing hydration;

temperature;

and decomposition;

manually;

and autonomously;

a plurality of mirror apparatus for concentrated and targeted to spatial point solar electricity generation as a means to generating crops and electricity in the same spatial point space; a plurality of reporting apparatus utilizing sensors;

a plurality of programmable computer controllers for agriculture as a means to generating crops and electricity in the same spatial point space;

a plurality of programmable computer controllers for electricity management;

a plurality of programmable computer controllers for planting seed mechanisms as a means to generating crops and electricity in the same spatial point space;

apparatus for increasing energy created from Photo Voltaic module in spatial point area, the apparatus comprising;

a container for a plurality of Solar PV modules; a base container rack assembly;

a base container rack assembly;

a plurality of parallel legs, each leg being connected at one end to the container and at the other other end to the base to support the container for oscillating movement with respect to the base as a means to generating crops and electricity in the same spatial point space;

a means for oscillating the container up and down, and left and right with servos, on the legs independently working together to move mirrors up and down; and left and right;

and further comprising light and position sensors, and actuator controlled by integrated circuit for best, lighting transmission and receiving as a means to generating crops and electricity in the same spatial point space;

and still further comprising a rack mounting apparatus and system comprising as a means to generating crops and electricity in the same spatial point space; a plurality of solar PV panels mirror reflectors;

a plurality of mirror reflectors;

a plurality of programmable computer controllers; a plurality of actuator tracking mechanisms;

a plurality of infrared laser sensor apparatus;

a utility airspace below rack;

a removable and semi removable cover for covering the airspace below the Solar PV rack mounting apparatus as a means to generating crops and electricity in the same spatial point space;

an agricultural growing area;

a solar controller;

a hybrid organic battery; a micro inverter;

an air transferal apparatus for moving water though the system; a heating and cooling apparatus;

an alternative electricity generation apparatus;

a water transferal apparatus for moving water though the system; a brush less motor micro a brush less motor micro inverter;

a graphene cooling system;

a plurality of movable mirrors controlled by a programmable computer controller as a means to generating crops and electricity in the same spatial point space;

a plurality of water pumps controlled by a programmable computer controller;

a plurality of Solar Panel Booster layers;

a plurality of magnetic AC brush less motor generators as a means to generating crops and electricity in the same spatial point space;

a Programmable Computer Controller Apparatus with Processes for Crypto Currency, Virtual Currency, and Block Chain Coin Mining with a Distribution of Tangible and Intangible Assets Mined apparatus for the sharing of percentages for autonomous distribution to beneficiaries for Mined apparatus for the sharing of percentages for autonomous distribution to beneficiaries for every transaction as related to a policy of rules to assist people in poverty, protecting animals, wildlife and the environment.

\* \* \* \* \*